United States Patent
Ohta

(10) Patent No.: US 9,146,527 B2
(45) Date of Patent: Sep. 29, 2015

(54) APPARATUS COOPERATION SYSTEM, IMAGE FORMING APPARATUS, AND FUNCTION PROVIDING METHOD

(75) Inventor: Shingo Ohta, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 44 days.

(21) Appl. No.: 13/605,394

(22) Filed: Sep. 6, 2012

(65) Prior Publication Data
US 2013/0057918 A1 Mar. 7, 2013

(30) Foreign Application Priority Data

Sep. 7, 2011 (JP) .................................. 2011-194975

(51) Int. Cl.
G06F 15/00 (2006.01)
G03G 21/02 (2006.01)
G06F 3/12 (2006.01)

(52) U.S. Cl.
CPC .............. *G03G 21/02* (2013.01); *G06F 3/1205* (2013.01); *G06F 3/1239* (2013.01); *G06F 3/1291* (2013.01); *G03G 2215/00109* (2013.01); *G03G 2215/00113* (2013.01); *Y02B 60/1271* (2013.01)

(58) Field of Classification Search
None
See application file for complete search history.

(56) References Cited

U.S. PATENT DOCUMENTS

| 7,400,423 | B2* | 7/2008 | Hara ............................. 358/1.15 |
| 2008/0123130 | A1* | 5/2008 | Matsumoto et al. ......... 358/1.15 |
| 2009/0030837 | A1* | 1/2009 | Knodt ............................ 705/40 |
| 2009/0225355 | A1* | 9/2009 | Kazume et al. ............. 358/1.15 |
| 2010/0315680 | A1* | 12/2010 | Ishikake ...................... 358/1.15 |
| 2011/0019821 | A1* | 1/2011 | Kino ............................ 380/255 |
| 2011/0164270 | A1* | 7/2011 | Lee et al. .................... 358/1.14 |
| 2011/0292413 | A1* | 12/2011 | Crean ............................ 358/1.9 |

FOREIGN PATENT DOCUMENTS

| JP | H10-111626 | 4/1998 |
| JP | H10-285314 | 10/1998 |
| JP | 2004-126607 | 4/2004 |
| JP | 2010-072760 | 4/2010 |
| JP | 2010-074431 | 4/2010 |

* cited by examiner

*Primary Examiner* — Helen Q Zong
(74) *Attorney, Agent, or Firm* — Harness, Dickey & Pierce P.L.C.

(57) ABSTRACT

An apparatus cooperation system including first and second apparatuses connected via a network to share a function, the first apparatus including a first counting unit counting a number of the output objects output by the first output unit based on a first counting rule, the second apparatus including a second counting unit counting a number of the output objects output by the second output unit based on a second counting rule. Further, when an output condition to output the image data by the first apparatus and the second apparatus is accepted, the first counting unit counts a total number of the output objects output by the first output unit and the second output unit based on the first counting rule.

15 Claims, 43 Drawing Sheets

TONER KIT METHOD

COUNTER METHOD

FIG.4

COPY APPLICATION (a)

| DRAFT READING USING SCANNER | IMAGE PROCESSING | PRINTING | POST PROCESSING |
|---|---|---|---|
| MFP1 | — | MFP2 | BY MFP PRINTED |
| MFP1 | — | MFP1, MFP2 | ″ |
| MFP1 | MFP1 | MFP2 | ″ |
| MFP1 | MFP2 | MFP2 | ″ |
| MFP1 | MFP1 | MFP1, MFP2 | ″ |
| MFP1 | MFP2 | MFP1, MFP2 | ″ |

SCANNER APPLICATION (b)

| DRAFT READING USING SCANNER | IMAGE PROCESSING | TRANSMISSION |
|---|---|---|
| MFP1 | — | MFP2 TRANSMITS E-MAIL TO FOLDER |
| MFP1 | MFP1 | MFP2 TRANSMITS E-MAIL TO FOLDER |
| MFP1 | MFP2 | MFP2 TRANSMITS E-MAIL TO FOLDER |
| MFP1 | MFP2 | MFP1 TRANSMITS E-MAIL TO FOLDER |

TRANSMISSION APPLICATION (c)

| DRAFT READING USING SCANNER | IMAGE PROCESSING | FAX TRANSMISSION |
|---|---|---|
| MFP1 | — | MFP2 TRANSMITS FAX |
| MFP1 | MFP1 | MFP2 TRANSMITS FAX |
| MFP1 | MFP2 | MFP2 TRANSMITS FAX |
| MFP1 | MFP2 | MFP1 TRANSMITS FAX |

(NONE)

(d)

| STORING MFP | IMAGE PROCESSING | READ |
|---|---|---|
| MFP2 | — | MFP1 READ AND PRINT AND THE LIKE |
| MFP2 | MFP1or2 | MFP1 READ AND PRINT AND THE LIKE |

FIG.8

| USER NAME | USER Q | | | | | |
|---|---|---|---|---|---|---|
| USER ID | 123456 | | | | | |
| LOG-IN NAME | q_xxxx | | | | | |
| PASSWORD | q_yyyy | | | | | |
| | COPY | | FAX | PRINT | | |
| UPPER LIMIT USE AMOUNT | COLOR | 50 | 100 | COLOR | 50 | |
| | MONOCHROME | 100 | | MONOCHROME | 100 | |
| USE AMOUNT | COLOR | 10 | 22 | COLOR | 32 | |
| | MONOCHROME | 32 | | MONOCHROME | 54 | |
| USABLE AMOUNT | COLOR | 40 | 78 | COLOR | 18 | |
| | MONOCHROME | 68 | | MONOCHROME | 46 | |

FIG. 9

| | FUNCTIONS | |
|---|---|---|
| SCAN | COLOR/MONOCHROME/TWO-COLOR/SINGLE-COLOR | |
| | CHARACTER/PICTURE/CHARACTER·PICTURE | |
| | RESOLUTION 100-600 dpi | |
| EDIT | AGGREGATION 2in1/4in1/8in1 | |
| | STAMP PRINTING | |
| | COPY GUARD | |
| | VARIABLE MAGNIFICATION 25-200% | |
| | OCR | |
| | PDF CONVERSION | |
| OUTPUT | FAX | ACCUMULATION TRANSMISSION |
| | PRINT | PRINTING SPEED 60/MIN. |
| | | COLOR/MONOCHROME/TWO-COLOR/SINGLE-COLOR |
| | | SHEET SIZE AUTO/A4/B4/A3 |
| | | ENERGY CONSUMPTION<br>MONOCHROME 10W/h<br>COLOR 40W/h<br>STARTING UP 1000W/h |
| | | STAPLE |
| | | PUNCHING |
| | | Z FOLDING |

| APPARATUS COOPERATIVE MFP |
|---|
| 192.168.11.100 (MFP2) |
| 192.168.11.101 (MFP3) |
| 192.168.11.102 (SERVER 1) |
| 192.168.12.100 (MFP4) |
| 192.168.12.101 (SERVER 2) |

FIG.11A

| COMMUNICABLE APPARATUS |
|---|
| 192.168.11.100 (MFP2) |
| 192.168.11.101 (MFP3) |
| 192.168.11.102 (SERVER 1) |
| — |
| 192.168.12.101 (SERVER 2) |

FIG.11B

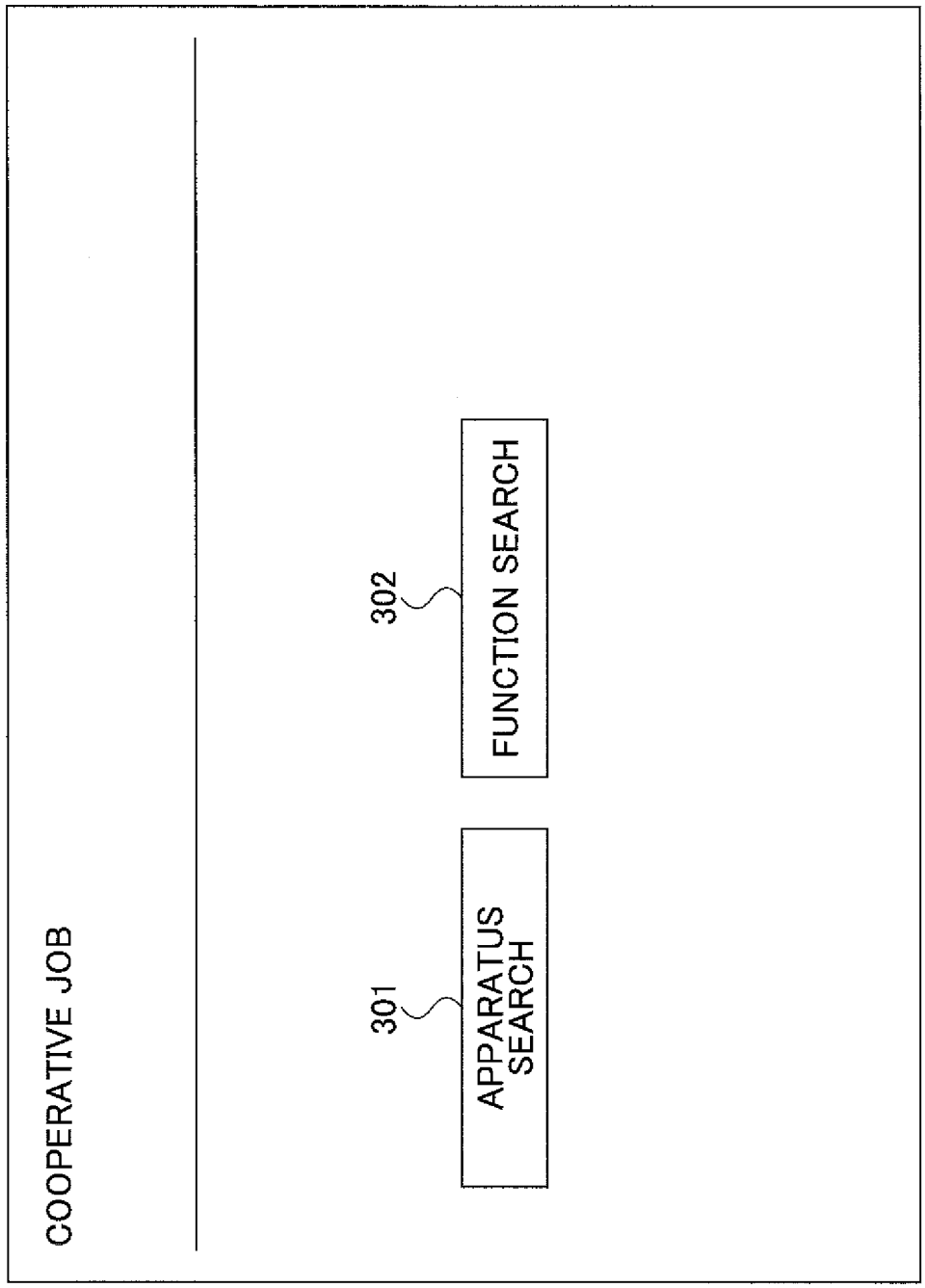

FIG.13B

COOPERATIVE JOB – APPARATUS LIST

| APPARATUS NAME | IP ADDRESS |
|---|---|
| IMAGICS | 192.168.1.0 |
| IPUX | 192.168.1.1 |

CONDITION SET ～311

FIG.15A

| | APPARATUS IN CHARGE | INPUT·EDIT·OUTPUT CONDITIONS | | | |
|---|---|---|---|---|---|
| 1 INPUT | MFP1 | ONE-SIDED READING | CHARACTERS | 300dpi | MONOCHROME |
| 2 EDIT | MFP2 | 4in1 | | | |
| 3 OUTPUT | MFP1 | MONOCHROME | 5 COPIES | A4 | PUNCHING |

FIG.15B

| | APPARATUS IN CHARGE | INPUT·EDIT·OUTPUT CONDITIONS | | | |
|---|---|---|---|---|---|
| 1 INPUT | MFP1 | ONE-SIDED READING | CHARACTERS | 300dpi | MONOCHROME |
| 2 EDIT | MFP2 | 4in1 | | | |
| 3 OUTPUT | MFP1, MFP2 | MONOCHROME | 5 COPIES | A4 | PUNCHING |

FIG.15C

| | APPARATUS IN CHARGE | INPUT·EDIT·OUTPUT CONDITIONS | | | |
|---|---|---|---|---|---|
| 1 INPUT | MFP1 | ONE-SIDED READING | CHARACTERS | 300dpi | MONOCHROME |
| 2 EDIT | MFP2 | 4in1 | | | |
| 3 OUTPUT | MFP1 | MONOCHROME | 3 COPIES | A4 | PUNCHING |
| 3 OUTPUT | MFP2 | MONOCHROME | 2 COPIES | A4 | PUNCHING |

FIG.15D

| | | APPARATUS IN CHARGE | INPUT·EDIT·OUTPUT CONDITIONS | | | |
|---|---|---|---|---|---|---|
| 1 | INPUT | MFP1 | ONE-SIDED READING | CHARACTERS | 300dpi | MONOCHROME |
| 2 | EDIT | MFP1 | 120% | | | |
| 3 | OUTPUT | MFP1, MFP2 | 03-1234-5678<br>03-1234-5679 | | | |

FIG.15E

| | | APPARATUS IN CHARGE | INPUT·EDIT·OUTPUT CONDITIONS | | | |
|---|---|---|---|---|---|---|
| 1 | INPUT | MFP1 | ONE-SIDED READING | CHARACTERS | 300dpi | MONOCHROME |
| 2 | EDIT | MFP1 | 120% | | | |
| 3 | OUTPUT | MFP1 | 03-1234-5678 | | | |
| 3 | OUTPUT | MFP2 | 03-1234-5679 | | | |

A. COUNTING METHOD

| BILLING SYSTEM | | TONER KIT METHOD | | | |
|---|---|---|---|---|---|
| | | COUNTER METHOD | | | |
| | | 1 | 2 | 3 | 4 |
| COUNTING RULE | COLOR | COLOR/MONOCHROME | MONOCHROME | COLOR/MONOCHROME/TWO-COLOR/SINGLE-COLOR | COLOR/MONOCHROME/SINGLE-COLOR |
| | SHEET SIZE | NO CLASSIFICATION | A3 OR LARGER/LESS THAN A3 | A3 OR LARGER/A4/LESS THAN B4 | A3 OR LARGER/A4/B4/LESS THAN A5 |
| | PRINTING SURFACE | ONE PAGE ON ONE-SIDED PAGE BASIS | ONE PAGE ON EITHER ONE-SIDED OR DOUBLE-SIDED PAGE BASIS | | |
| | TONER USE BASIS | COVERAGE 6% OR MORE/ LESS THAN 6% | COVERAGE 5% OR MORE/ LESS THAN 5% | | |

B. CONTRACTED UNIT PRICE

| CONTRACTED UNIT PRICE INFORMATION | A. CONSTANT: COLOR 30YEN/SHEET MONOCHROME 8YEN/SHEET<br>B. BASIC FEE 4000YEN FOR 0 TO N1 SHEETS, COLOR 30YEN/SHEET MONOCHROME 8YEN/SHEET FOR N1-N2 SHEETS<br>... |
|---|---|
| SPEED INFORMATION | HIGHER SPEED LAYER<br>MIDDLE SPEED LAYER<br>LOWER SPEED LAYER |

| APPARATUS COOPERATIVE JOB | | | |
|---|---|---|---|
| COVERAGE 6% OR MORE | COLOR | A3 OR LARGER a′(a1, a2···)PAGES | LESS THAN A3 b′(b1, b2···)PAGES |
| | MONOCHROME | A3 OR LARGER c′(c1, c2···)PAGES | LESS THAN A3 d′(d1, d2···)PAGES |
| COVERAGE LESS THAN 6% | COLOR | A3 OR LARGER e′(e1, e2···)PAGES | LESS THAN A3 f′(f1, f2···)PAGES |
| | MONOCHROME | A3 OR LARGER g′(g1, g2···)PAGES | LESS THAN A3 h′(h1, h2···)PAGES |

FIG.22A

APPARATUS COOPERATIVE JOB MFP1 (IN CASE OF SAME BILLING INFORMATION)

| | | A3 OR LARGER | LESS THAN A3 |
|---|---|---|---|
| COVERAGE 6% OR MORE | COLOR | a´(a1, 0)PAGES | b´(b1, 0)PAGES |
| | MONOCHROME | c´(c1, 0)PAGES | d´(d1, 0)PAGES |
| COVERAGE LESS THAN 6% | COLOR | e´(e1, 0)PAGES | f´(f1, 0)PAGES |
| | MONOCHROME | g´(g1, 0)PAGES | h´(h1, 0)PAGES |

FIG.22B

APPARATUS COOPERATIVE JOB MFP2 (IN CASE OF SAME BILLING INFORMATION)

| | | A3 OR LARGER | LESS THAN A3 |
|---|---|---|---|
| COVERAGE 6% OR MORE | COLOR | a2 PAGES | b2 PAGES |
| | MONOCHROME | c2 PAGES | d2 PAGES |
| COVERAGE LESS THAN 6% | COLOR | e2 PAGES | f2 PAGES |
| | MONOCHROME | g2 PAGES | h2 PAGES |

FIG.22C

| APPARATUS COOPERATIVE JOB (IN CASE OF DIFFERENT BILLING INFORMATION) | | | | |
|---|---|---|---|---|
| COVERAGE 6% OR MORE | COLOR | A3 OR LARGER | a´(a1, a2) PAGES | LESS THAN A3 | b´(b1, b2) PAGES |
| | MONOCHROME | A3 OR LARGER | c´(c1, c2) PAGES | LESS THAN A3 | d´(d1, d2) PAGES |
| COVERAGE LESS THAN 6% | COLOR | A3 OR LARGER | e´(e1, e2) PAGES | LESS THAN A3 | f´(f1, f2) PAGES |
| | MONOCHROME | A3 OR LARGER | g´(g1, g2) PAGES | LESS THAN A3 | h´(h1, h2) PAGES |

FIG.25A

| APPARATUS COOPERATIVE JOB MFP1 (WHEN MFP1 IS SELECTED) | | |
|---|---|---|
| COVERAGE 6% OR MORE | COLOR | a′+b′ (a1+b1, a2+b2) PAGES COMMON TO SHEET SIZES |
| | MONOCHROME | c′+d′ (c1+d1, c2+d2) PAGES COMMON TO SHEET SIZES |
| COVERAGE LESS THAN 6% | COLOR | e′+f′ (e1+f1, e2+f2) PAGES COMMON TO SHEET SIZES |
| | MONOCHROME | g′+h′ (g1+h1, g2+h2) PAGES COMMON TO SHEET SIZES |

FIG.25B

APPARATUS COOPERATIVE JOB MFP2 (WHEN MFP2 IS SELECTED)

| | | | |
|---|---|---|---|
| COVERAGE 6% OR MORE | COLOR | A3 OR LARGER | LESS THAN A3 |
| | | a´(a1, a2) PAGES | b´(b1, b2) PAGES |
| | MONOCHROME | A3 OR LARGER | LESS THAN A3 |
| | | c´(c1, c2) PAGES | d´(d1, d2) PAGES |
| COVERAGE LESS THAN 6% | COLOR | A3 OR LARGER | LESS THAN A3 |
| | | e´(e1, e2) PAGES | f´(f1, f2) PAGES |
| | MONOCHROME | A3 OR LARGER | LESS THAN A3 |
| | | g´(g1, g2) PAGES | h´(h1, h2) PAGES |

APPARATUS COOPERATION SYSTEM, IMAGE FORMING APPARATUS, AND FUNCTION PROVIDING METHOD

CROSS-REFERENCE TO RELATED APPLICATIONS

The present application claims priority under 35 U.S.C §119 to Japanese Patent Application No. 2011-194975 filed Sep. 7, 2011, the entire contents of which are hereby incorporated herein by reference.

BACKGROUND OF THE INVENTION

1. Field of the Invention

The present invention generally relates to a apparatus cooperation system where plural apparatuses connected to each other via a network share and provide functions of the apparatuses among the apparatuses.

2. Description of the Related Art

The apparatuses such as copiers are generally provided to many businesses as clients on lease or rental basis. This is because those apparatuses generally require maintenance services. In this case, for example, the client pays not only a lease charge but also the other charge in accordance with the lease contract to a leasing company. To determine the other charge, there have been used a counter method and a toner kit method.

In the counter method, for example, the client pays an amount corresponding to a basic charge and a charge determined by the product of the number of printed pages by contracted unit price as a monthly charge.

Further, in the counter method, the client may usually have to pay a cost for consumable supplies (e.g., toner and other parts) and a maintenance and inspection charge including the costs of exchanging parts and adjustment of the apparatus.

On the other hand, in the toner kit method, the client purchases a toner kit. By doing this, the leasing company provides the maintenance service. In this method, the client may use the apparatus until the toner is empty by paying a fixed charge of the toner kit.

It is not possible to determine which of the methods is advantageous because it depends on the frequency of use of the client. However, if the apparatus is not used very frequently, the toner kit method may be recommended.

In the counter method, the charge depends on the (printed) pages. Therefore, it is necessary for the apparatus using the counter to count the number of the printed pages. Further, it is usually unknown whether the client makes a contract based on the counter method or the toner kit method when the apparatus is shipped from the factory. Therefore, almost all MFPs (apparatuses) include a function for counting the printed pages.

FIG. 1 schematically illustrates examples of billings when a user Q uses an apparatus (MFP 1) employing the toner kit method and an apparatus (MFP 2) employing the counter method. Namely, the MFP 1 is used under a billing contract based on the toner kit method, and the MFP 2 is used under a billing contract based on the counter method.

In case the user uses the MFP 1 to print, for example, 10 pages, due to the toner kit method, the MFP 1 does not have to count the number of printed pages. On the other hand, in case the user uses the MFP 2 to print 10 pages, due to the counter method, the MFP 2 counts the number of printed pages and the counted value is stored in the MFP 2.

On the other hand, there has been known a processing scheme in which plural apparatuses connected to each other via a network cooperate each other to perform a job (see, for example, Japanese Laid-open Patent Publication No. 2010-074431). This processing scheme may be called "apparatus cooperation".

The "apparatus cooperation" herein refers to a scheme is which, for example, plural apparatus cooperate with each other by sharing and providing a function necessary for (executing) a job including a series of processes from input to output.

FIG. 2 illustrates an example how a job is executed in the processing scheme called "apparatus cooperation". In FIG. 2, the MFP 1 and the MFP 2 are the same as those in FIG. 1. The user 2 is intended to print plural copies of image data. To that end, the user Q may use the MFP 1 only.

However, if the user Q uses not only the MFP 1 but also MFP 2 so that the print job is shared by the MFP 1 and the MFP 2, the user Q may finish printing faster. So as to print by sharing between the MFP 1 and the MFP 2, the user Q may operate the MFP 1 to scan the draft by the scanner of the MFP 1 and send the scanned image data along with the printing conditions to the MFP 2.

SUMMARY OF THE INVENTION

According to an aspect of the present invention, an apparatus cooperation system includes plural apparatuses connected via a network to share a function among the plural apparatuses. The apparatus cooperation system includes a first apparatus and a second apparatus.

The first apparatus includes an acquisition unit acquiring image data to be output; an output condition acceptance unit configured to accept an output condition to be applied when the first apparatus and the second apparatus output the image data, a first operation control unit controlling an output operation of the first apparatus based on the output condition and transmitting an output request to the second apparatus to output, a first output unit outputting one or more output objects, a first counting unit counting a number of the output objects output by the first output unit based on a first counting rule, and a data communication unit transmitting the image data and the output condition to the second apparatus.

The second apparatus includes a second operation control unit receiving the output request from the first apparatus and controlling an output operation of the second apparatus, a second output unit outputting one or more output objects, a second counting unit counting a number of the output objects output by the second output unit based on a second counting rule.

Further, when the output condition acceptance unit accepts an output condition to output the image data by the first apparatus and the second apparatus, the first counting unit counts a total number of the output objects output by the first output unit and the second output unit based on the first counting rule.

BRIEF DESCRIPTION OF THE DRAWINGS

Other objects, features, and advantages of the present invention will become more apparent from the following description when read in conjunction with the accompanying drawings, in which:

FIG. 4 is a drawing of tables illustrating example processing schemes of the apparatus cooperation between the MFP 1 and the MFP 2;

FIG. 8 is a drawing illustrating an example of use limit information items;

FIG. 9 is a drawing illustrating an example of apparatus management information items;

FIGS. 11A and 11B are drawings illustrating example lists of apparatus cooperative MFPs and communicable apparatuses;

FIGS. 13A through 13D are drawings illustrating example screens of an apparatus cooperative job displayed on a display section;

FIGS. 15A through 15E are drawings illustrating an example of job information items;

FIG. 16 is a drawing illustrating an example of billing information items;

FIG. 18 is a table illustrating an example counting result of the number of billing pages;

FIGS. 22A through 22C are drawings of tables illustrating example counting results of the number of billing pages;

FIGS. 25A and 25B are drawings of tables illustrating another example counting results of the number of billing pages.

DETAILED DESCRIPTION OF THE PREFERRED EMBODIMENTS

In a case where plural apparatuses (e.g. MFP (Multi Functional Peripheral) 1 and MFP 2) employing different billing systems (billing schemes) from each other cooperate with each other to perform a job, if the MFP 1 does not count the number of printed pages and only MFP 2 counts, the number of the pages printed in the job may differ from the counted number in the plural apparatuses.

Further, even when both the MFP 1 and the MTP 2 count the number of printed pages, there may a case where the counting rule employed in the MFP 1 differs from that in the MFP 2. Namely, in such a case, the counting result of the MFP 1 may differ from that of the MFP 2.

As described above, conventionally, for example, sufficient study has not been done on how the number of the printed pages counted by the plural apparatuses (e.g., the MFP 1 and the MFP 2) are to be treated.

The present invention is made in light of the above problem, and may provide an apparatus cooperation system including plural apparatuses having different billing systems, the apparatuses being capable of performing (executing) a job by cooperating together.

According to an embodiment, there is provided an apparatus cooperation system including plural apparatuses having different billing systems, the apparatuses being capable of performing (executing) a job by cooperating together.

In the following, embodiments of the present invention are described with reference to the accompanying drawings.

Embodiment 1

Figure 3:
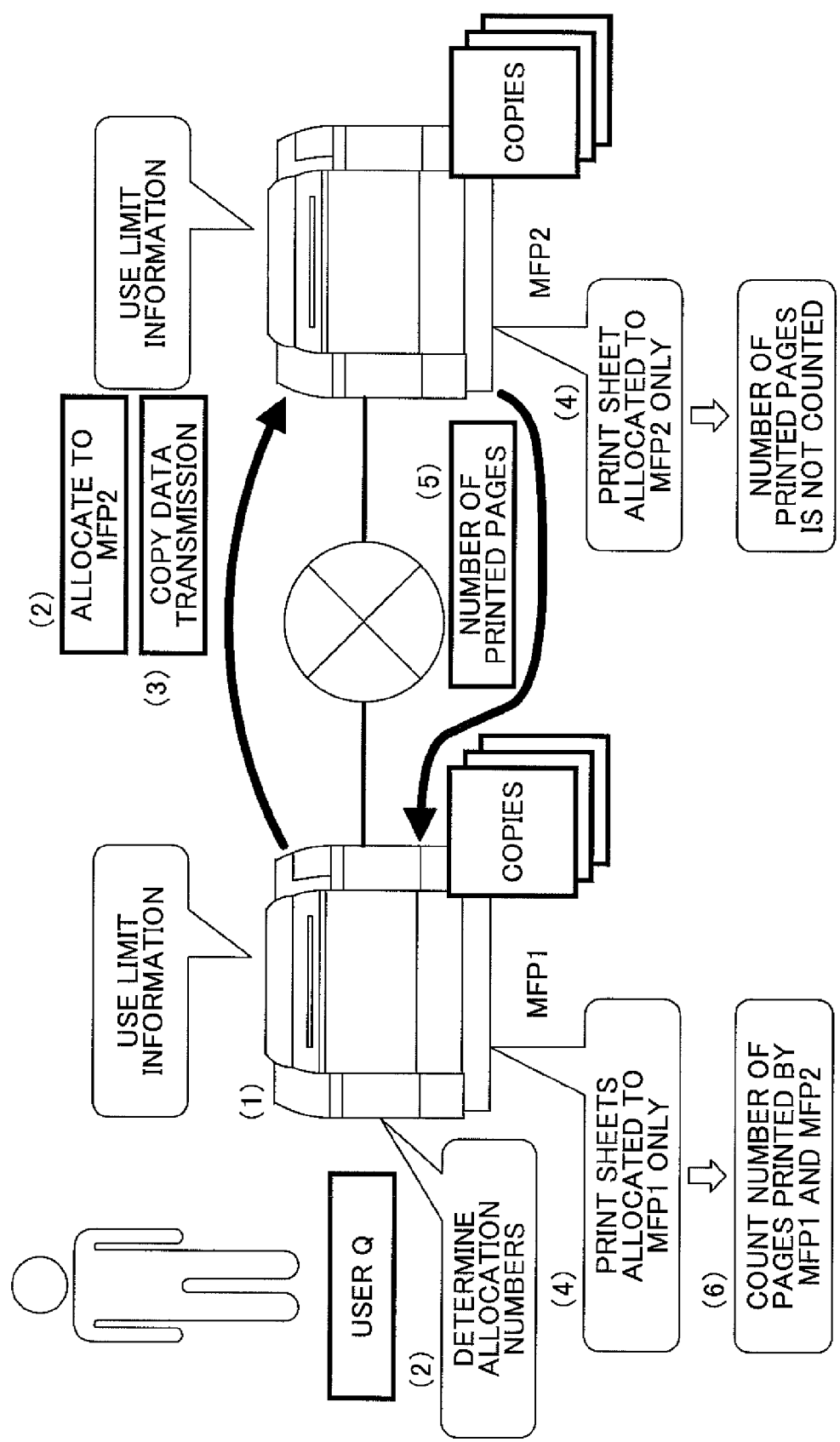
FIG. 3 is a drawing schematically illustrating a part of a billing scheme when two MFPs execute a job in the apparatus cooperation.

FIG. 3 schematically illustrates a part of a billing system when the MFPs according to an embodiment perform a job in apparatus cooperation. The "apparatus cooperation" herein refers to a scheme in which, for example, plural apparatus cooperate with each other by sharing and providing a function necessary for (executing) a job including a series of processes from input to output.

The billing system employed in the MFP (Multi Functional Peripheral) 1 and the MFP 2 (hereinafter may be referred to as "MFP 100" when not necessary to distinguish one from another) is either the toner kit method or the counter method.

In the counter method, for example, the client pays an amount corresponding to a basic charge and a charge determined by the product of the number of printed pages by contracted unit price as a monthly charge. Further, in the counter method, the client may usually have to pay a cost for consumable supplies (e.g., toner and other parts) and a maintenance and inspection charge including the costs of exchanging parts and adjustment of the apparatus.

On the other hand, in the toner kit method, the client purchases a toner kit. By doing this, the leasing company provides the maintenance service. In this method, the client may use the apparatus until the toner is empty by paying a fixed charge of the toner kit.

The MFP 1 and the MFP 2 may cooperate together to perform (execute) a job. Here, the system where plural apparatuses mutually provide a function (s) is called an apparatus cooperation system 200. Further, a job to be executed by cooperating together by two or more apparatuses is called an "apparatus cooperative job".

(1) In FIG. 3, a user Q operates the MFP 1 and sets execution conditions of the apparatus cooperative job to print using both the MFP1 and the MFP 2

(2) When both MFP 1 and the MFP 2 execute the apparatus cooperative job to print, the MFP 1 allocates the respective numbers of pages to be printed to (between) the MFP 1 and the MFP 2. Hereinafter, the allocated number may be called an "allocated page number". When determining the allocated page number of the MFP 2, the MFP 1 uses apparatus management information items of the MFP 2 and determines the allocated page number of the MFP 2 in a manner that the printing time period is minimized or that it is advantageous for the energy (power) consumption.

(3) The MFP 1 sends image data (copy data) to the MFP 2.
(4) Both the MFP 1 and the MFP 2 print the respective allocated page numbers. In this case, both the MFP 1 and the MFP 2 count the respective numbers of the printed pages.
(5) The MFP 2 sends the counted number of the printed pages to the MFP 1 without storing the counted number in the MFP 2.
(6) The MFP 1 stores both the counted number of the printed pages by the MFP 1 and the counted number of the printed pages sent from the MFP 2.

Therefore, it becomes possible to inevitably store the counted numbers of the printed pages in one of the MFPs in the executed apparatus cooperative job.

For example, when at least one of the MFP 1 and the MFP 2 is charged based on the toner kit method, all the number of the printed pages are counted. Namely, there is no printed pages that are not counted. Further, even in a case where both the MFP 1 and the MFP 2 employ the counter method, since the counting method and/or the contracted unit price (per printed page) may differ between the MFP 1 and the MFP 2, the method of counting the number of the printed pages may be unified.

Further, in this embodiment, regardless of the number of the MFPs involved in the job execution, the entire process from the input to the output is herein called a (one) job. Further, one page regardless of whether aggregation printing of a single-sided image data is set and regardless of toner consumption is called a (one) sheet. Further, the minimum unit of a sheet material such as a sheet regardless of whether the single-sided surface or the double-sided surfaces are printed is also called a (one) sheet.

Apparatus Cooperation

The Apparatus cooperation is described. The "apparatus cooperation" herein refers to a scheme in which, for example, plural apparatus cooperate with each other by sharing and providing a function necessary for (executing) a job including a series of processes from input to output. Namely, for example, the apparatus cooperation includes all states where one MFP uses a function (s) of the opposing MFP. Therefore, the apparatus cooperation may be called (performed) even when a job is not executed or when no application is executed.

However, generally, the MFP 1 and the MFP 2 perform based on applications. Therefore, in the following, for explanatory purposes, cases are described assuming that an application is operated. More specifically, for explanatory purposes, it is assumed that the apparatus that a user Q operates is the MFP 1.

The application herein specifies (selects) one input unit from among plural input units of the MFP and one output unit from among plural output units of the MFP as a combination of the input unit and the output unit. Further, the application performs control of the apparatus and provides a function(s) based on the specified combination.

FIG. 4 illustrates states (modes) in the apparatus cooperation between the MFP 1 and the MFP 2. FIG. 4 exemplarily illustrates the cases of a copy application, a scanner application, and a transmission application. However, it should be noted that any other application may also be achieved by mutually providing functions between the MFP 1 and the MFP 2.

In the copy application, a singe job (one job) includes various processes such as a reading process of reading a draft by a scanner, an imaging process, a printing process, and a post (finishing) process. The imaging process includes, for example, an OCR (Optical Character Recognition) process, a secure printing and the like. The post process includes, for example, punching, stapling and the like. Those process may be frequently used.

In the scanner application, a singe job (one job) includes various processes such as the reading process of reading a draft by the scanner, the imaging process, and a transmission process. In the imaging process includes, for example, the OCR process, a PDF file generation process, and an encryption process. Those process may also be used frequently. The transmission process includes e-mail based transmission and a process of transmitting to a folder of the user Q.

In the transmission application, a single job (one job) includes various processes such as the reading process of reading a draft by the scanner, the imaging process, and a FAX transmission process. The imaging process includes, for example, the OCR process, a secure printing and the like, and may be used frequently. The FAX transmission process includes the FAX transmission via a telephone network and an if network.

Further, as described above, the apparatus cooperation may be performed without executing any apparatus cooperative job. In this case, the user Q may execute the reading process of reading image data stored in the MFP 2 by operating the MFP 1.

The process includes not only printing, transmitting using e-mail, and FAX transmission but also deleting and reviewing the image data in the MFP 2 from the MFP 1. As described above, without executing any apparatus cooperative job, the apparatus cooperation may be performed as one state (mode) of the apparatus cooperation.

Further, in the above description, a case is described where the number of the MFPs is two However, it is also possible to perform the apparatus cooperation among three or more MFPs. When three or more MFPs performs the apparatus cooperation, the number of the combinations of the MFPs that are in charge of editing and outputting is accordingly increased.

Example Configuration

Figure 1:
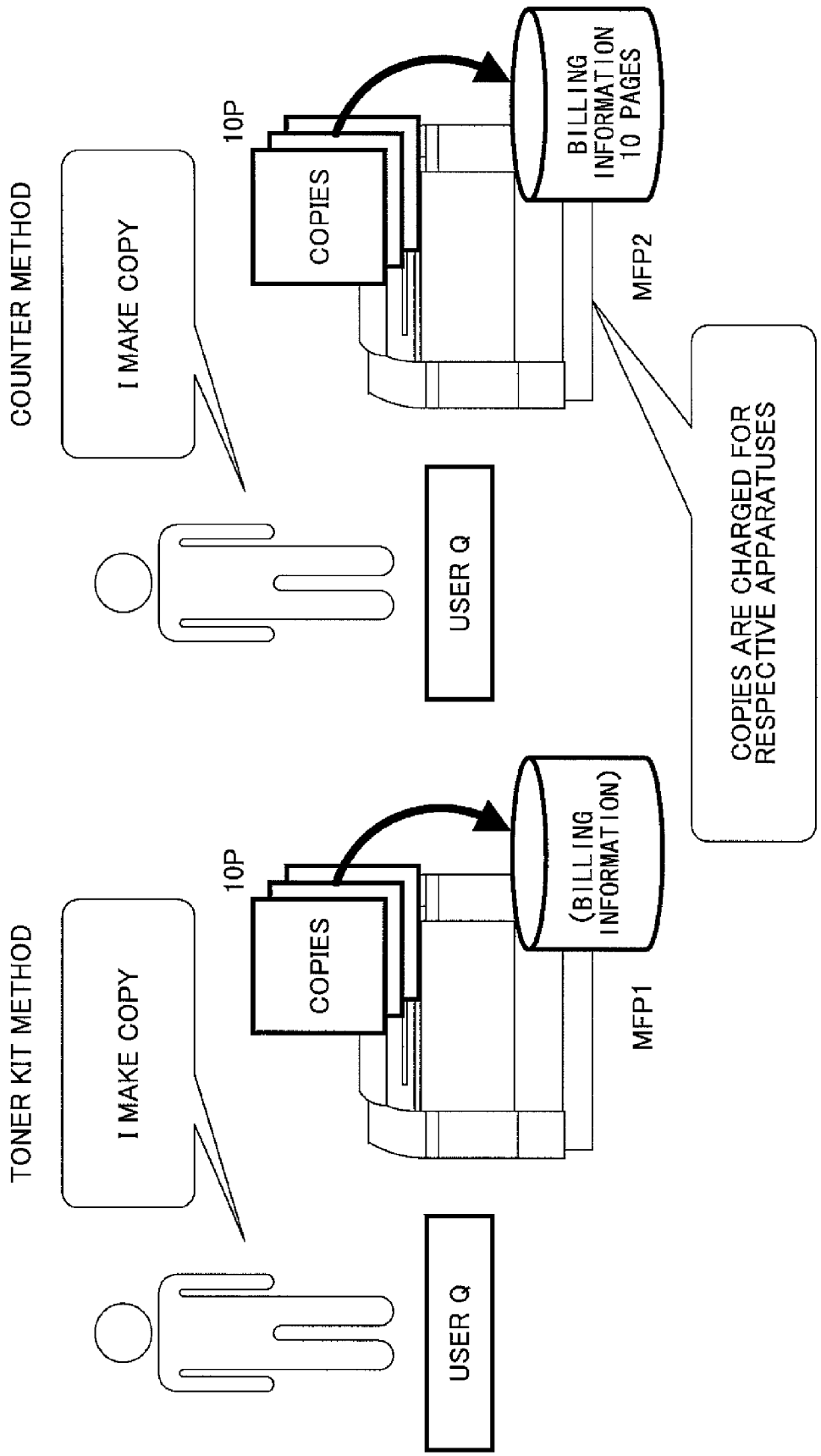
FIG. 1 is a drawing schematically illustrating billing systems where a user uses an apparatus employing a toner kit method and an apparatus employing a counter method.
Figure 2:
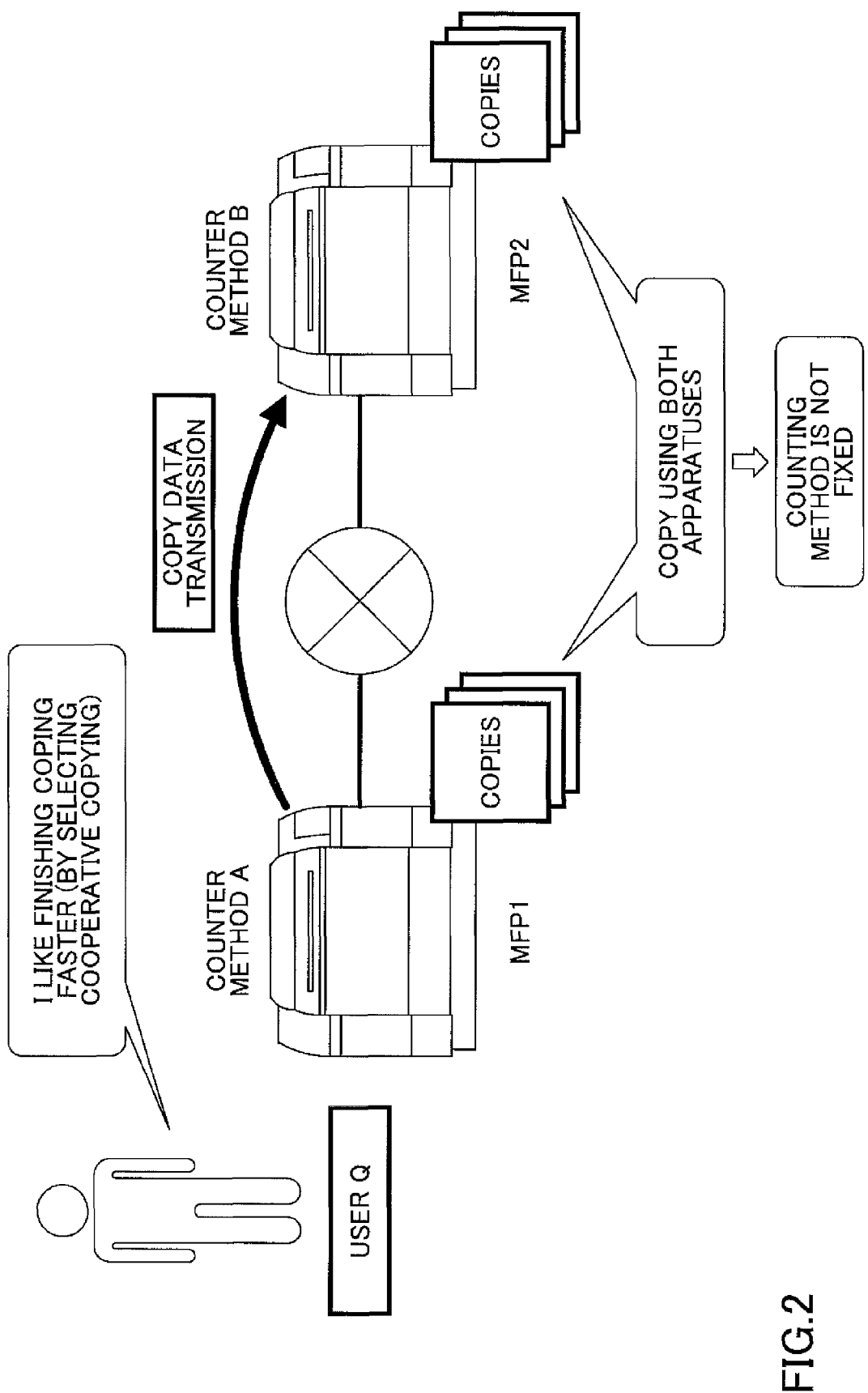
FIG. 2 is a drawing schematically illustrating an example how a job is executed in a processing scheme called "apparatus cooperation"
Figure 5:
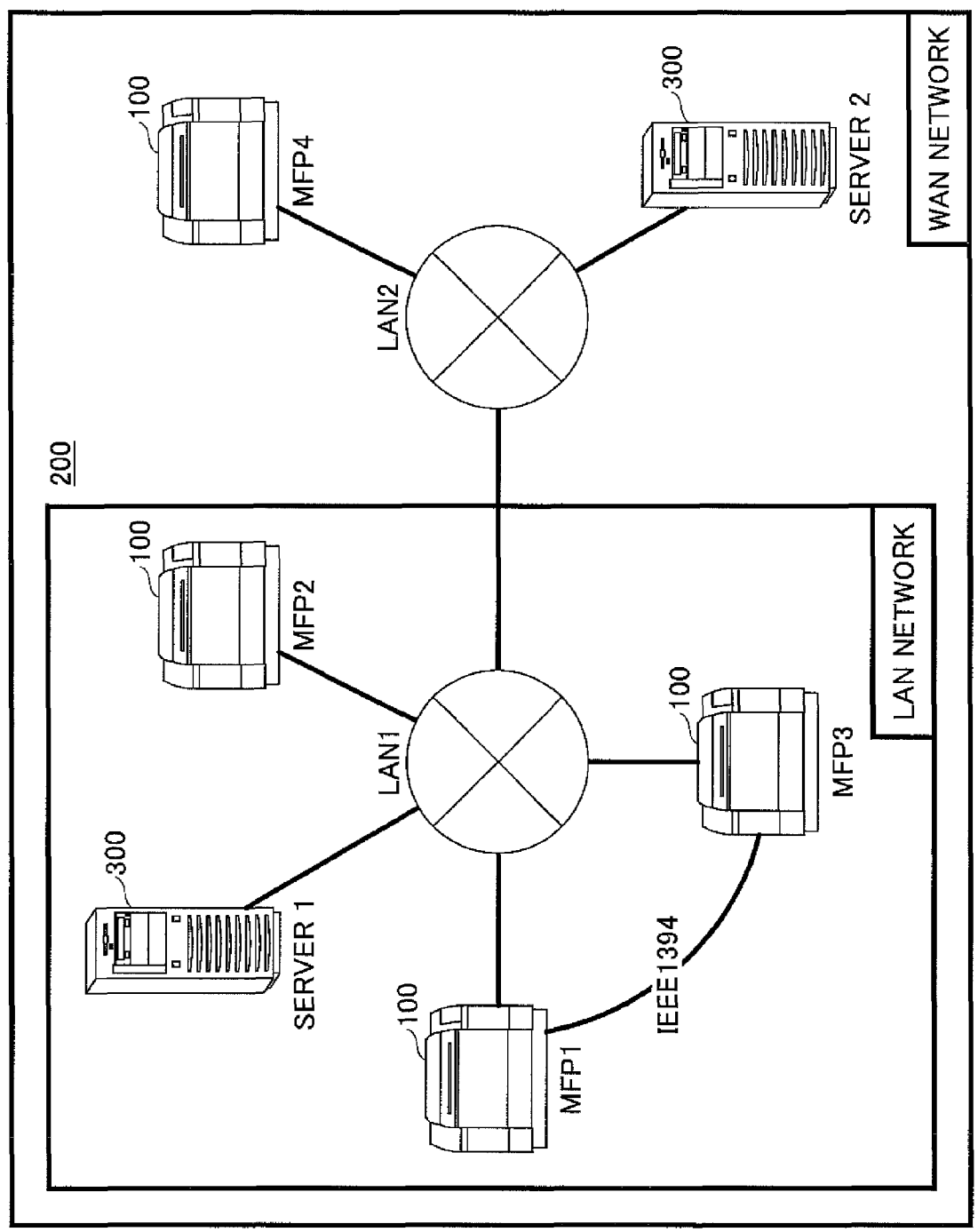
FIG. 5 is a drawing illustrating an example configuration of an apparatus cooperation system.

FIG. 5 illustrates an example configuration of the apparatus cooperation system 200. In the example configuration of FIG. 2, a WAN (Wide Area Network) is formed of a LAN (Local Area Network) 1 and a LAN 2. The LAN 1 is connected to the LAN 2 using an L3 switch or a router (not shown).

It should be noted that the apparatus cooperation may also be achieved even when the number of the LANs is one or more than two. In the configuration, the communications among the MFP 1 through 4, between server 1 and 2, and between MFP 1 through 4 and server 300 (hereinafter referred to as servers 1 and 2 when necessary to distinguish one from another) may be achieved by wired or wireless connections.

In LAN 1, three MFPs 1 through 3 and the server 1 are connected to each other. In LAN 2, the MFP 4 and the server 2 are connected to each other. The MFPs 1 through 4 includes at least one of a copy function, a scanner function, a FAX function, and a printing function. Further, it is not necessary for any two MFPs to have the same function. On the other hand, it is allowed for any two MFPs to have the same function. Further, it is also allowed that any of the MFPs may have a specific function.

In the configuration, it may not be necessary to include she server 1 and 2. However, the server 1 and/or 2 may be, for example, an image processing apparatus providing a function (e.g., the OCR process, a translation (rendering) function, a function of converting a file format) which may be not provided by the MFPs 1 through 4.

Further, in this embodiment, the MFPs includes use limit information items, and the server 1 or the server 2 may be used when the use limit information items of users are stored. The server 1 or the server 2 may compare usable amounts of the MFPs with the corresponding data of the use limit information items, and also compare a total use amount of the MFPs 1 through 4 by the user Q with the corresponding data of the use limit information items.

Further, in LAN 1, the MFPs 1 through 3 are connected to the network using a hub, a LAN switch or the like (not shown). On the other hand, the MFP 2 and MFP 3 are connected to each other via IEEE 1394 interfaces.

As described above, in the apparatus cooperation system 200, some or all of the MFPs may be connected to each other locally (i.e., in a peer-to-peer manner). Further, as the interface for the connections, any appropriate interface providing mutual communications such as a USB (Universal Serial Bus) or LAN cable may be used. By connecting locally, the image data may not be transmitted via LANs 1 and 2, the network load may be reduced. Further, the image data are not transmitted via the LANs 1 and 2, the security degree may be improved.

In the apparatus cooperation system 200 as illustrated in FIG. 5, the following cooperation state (mode) may be generated (achieved).

Any two or more MFPs in LAN 1 perform a single (one) apparatus cooperative job.

Any one or more MFPs in LAN 1 and the MFP 4 in LAN 2 perform a single (one) apparatus cooperative job.

Further, besides the above, the apparatus cooperation may also be achieved using the servers 1 and 2.

Figure 6:
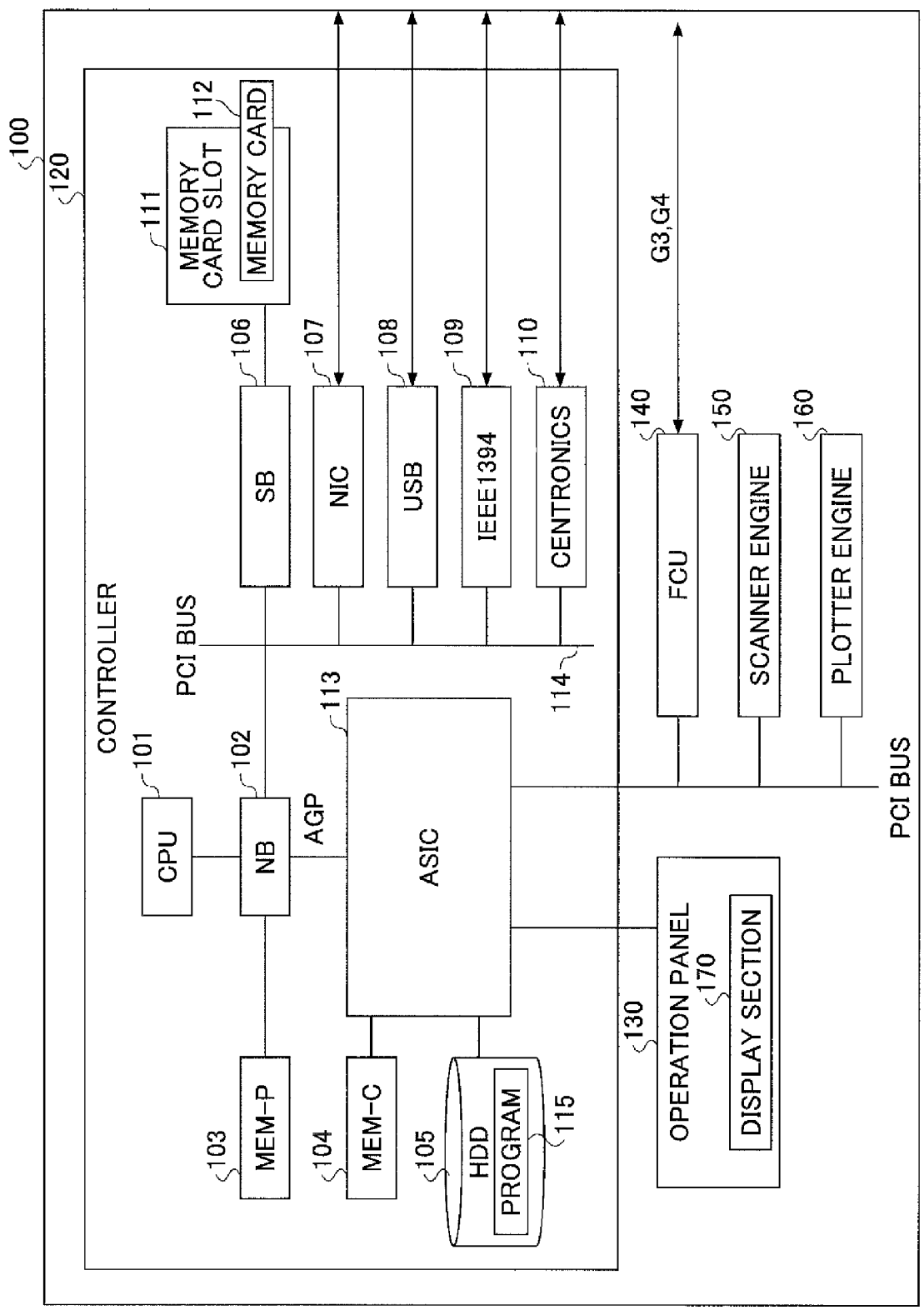
FIG. 6 is a drawing illustrating an example hardware configuration of the MFP 1 and the MFP2.

FIG. 6 illustrates an example hardware configuration of the MFPs 1 and 2. As illustrated in FIG. 6, the MFP 100 includes a controller 120, an operation panel 130, an FCU (Facsimile Control Unit) 140, a scanner engine 150, and a plotter engine 160.

The controller 120 includes a CPU (Central Processing Unit) 101, an ASIC (Application Specific Integrated Circuit) 113, an NB (North Bridge) 102, an SB (South Bridge) 106, a MEM-P (system memory) 103, a MEM-C (a local memory) 104, an HDD (Hard Disk Drive) 105, a memory card slot 111, a NIC (Network Interface Controller) 107, a USB device 108, an IEEE1394 device 109, and a Centronics device 110.

The CPU 101 is an IC (Integrated Circuit) executing various information processing. More specifically, the CPU 101 executes programs providing applications and services in parallel, using an OS (Operating System) such as UNIX (registered trademark). The ASIC 113 is an IC for image processing. The NB 102 is a bridge for connecting the CPU 101 and the ASIC 113. The SB 106 is a bridge connecting the NB 102 and peripheral devices or the like. The ASIC 113 and the NB 102 are connected to each other is an AGP (Accelerated Graphic Port).

The MEM-P 103 is a memory connected to the NB 102. The MEM-C 104 is a memory connected to the ASIC 113. The HDD 105 is a storage connected to the ASIC 113, and is used for storing image data, document data, programs, font data, form data and the like.

The memory card slot 111 is connected to the SB 106, and is used to set (insert) a memory card 112 into the memory card slot 111. The memory card 112 is a flash memory such as a USB memory, and is used for distributing a program 115. However, the program 115 may be distributed by downloading from a predetermined server.

The NIC 107 is a controller for data communications via a network using MAC (Media Access Control) addresses. The USB device 108 is a device providing a serial port compliant to USB standard. The IEEE1394 device 109 is a device providing a serial port compliant, to IEEE standard. The Centronics device 110 is a device providing a parallel port compliant to Centronics standard. The NIC 107, the USB device 108, the IEEE1394 device 109, the Centronics device 110 are connected to the NB 102 and the SB 106 via a PCI (Peripheral Component Interconnect) bus 114.

The operation panel 130 is a hardware (operation section) so that a user Q (operator) may input data to the MFP 100. Further, the operation panel 130 includes a display section 170 that is a hardware to provide visual information to the operator. The operation panel 130 is connected to the ASIC 113. The FCC 140, the scanner engine 150, and the plotter engine 160 are connected to the ASIC 113 via a PCI bus.

The scanner engine 150 optically scans a light beam onto a draft placed on a contact glass, performs an A/D conversion on the reflected light beam from the draft, and performs an image processing on the converted data to generate digital data having a predetermined resolution (hereinafter referred to as "image data").

The plotter engine 160 includes, for example, a tandem-type photosensitive drums, and form a latent image on the photosensitive drums by scanning laser beams onto the photosensitive drums, the laser beams being modulated based on the image data and PDL (Page Description Language) data received from a user PC (Personal Computer).

Further, toner is applied onto the latent image to develop the latent image, and one page of the developed image is transferred onto a sheet one by one by pressure and heat. However, the plotter engine 160 is not limited to such a electrophotographic type plotter. Namely, for example, inkjet-type plotter engine emitting ink droplets to form an image may alternatively be used.

The FCU 140 is connected to a network via the NIC 107, and transmits and receives the image data based on a communications protocol corresponding to, for example, T.37 or T 38 standard. Otherwise, for example, the FCU 140 may be connected to a public communication network, and transmits and receives the image data based on a communications protocol corresponding to, for example, G3 or G4 standard.

Further, even when the image data are received during the power being turned off, the plotter engine 160 may be activated (by the FCU 140), so that the received image data may be printed.

Figure 7:
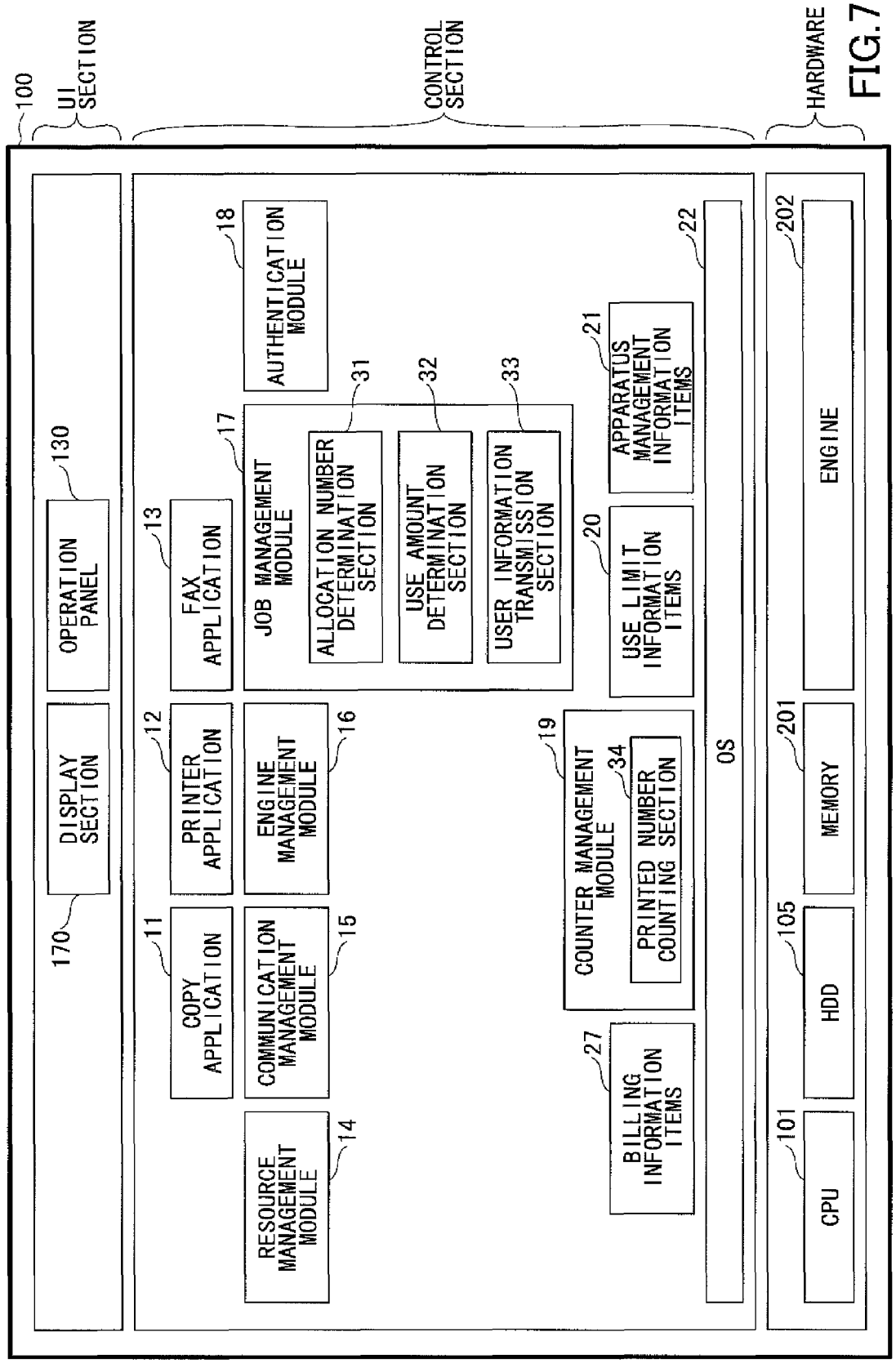
FIG. 7 is an example functional block diagram of the MFP1 and the MFP 2.

FIG. 7 illustrates an example functional block diagram of the MFP 100. As illustrated in FIG. 7, the MFP 100 includes a UI (User Interface) section, a control section, and a hardware (section). Among these, the UI section and the control section are already described. A memory 201 of the hardware section corresponds to the MEM-P 103 and the MEM-C 104. Further, an engine of the hardware section corresponds to the FCU 140, the scanner engine 150, and the plotter engine 160.

The control section includes a copy application 11, a printer application 12, a FAX application 13, a resource management module 14, a communication management module 15, an engine management module 16, a job management module 17, an authentication module 18, and a counter management module 19. Further, for example, the HDD 105 stores use limit information items 20 and apparatus management information items 21.

The copy application 11, the printer application 12, the FAX application 13 are examples of the application. In this case of FIG. 7, when a user Q operates the operation panel 130 and selects a copy button, a printer button, or a FAX button (not shown) to activate the copy application 11, the printer application 12, or the FAX application 13, respectively. An OS is a general-purpose operating system such as UNIX (registered trademark) for executing modules and software of the applications in parallel as processes.

The job management module 17 acquires job information items of the apparatus cooperative job set by the use Q from the application, and manages the execution of the job. More specifically, the job management module 17 requests the resource management module 14 to control resources.

Further, while receiving updated information from the resource management module 14, the job management module 17 controls screen display, application management, and operation panel and the like. Further, the job management module 17 detects the current number of output sheets and displays the current number on the operation panel 130.

Further, as illustrated in FIG. 7, the job management module 17 includes an allocation number determination section 31, a use amount determination section 32, and a user information transmission section 33. However, it is not essential that those sections are included in the job management module 17. The allocation number determination section 31 allocates the use amounts to cooperative apparatuses so that it becomes advantageous for the printing time period and/or the energy consumption amount.

The use amount refers to the number of (printed) pages in the copy application 11 and the printer application 12. Further, the use amount refers to the number of (FAX) destinations or the like in the FAX application 13. The use amount determination section 32 determines whether the number of pages to be output is less than or equal to (the number corresponding to) the usable amount. Details of this will be described below. The user information transmission section 33 transmits user information items to the MFP executing the apparatus cooperative job.

The resource management module 14 manages resources. Upon receiving a use request to use a hardware resource such as the FCU 140, the scanner engine 150, the plotter engine 160, the memory 201, the HDD 105, the NIC 107, she USB device 108, she IEEE1394 device 109, the Centronics device 110, the resource management module 14 adjusts and controls the request between applications. More specifically, the resource management module 14 determines whether a requested hardware resource is available (e.g., whether the requested hardware resource is currently used based on another request).

When determining that the requested hardware resource is available, the resource management module 14 reports that the requested hardware resource is available to the job management module 17. Further, upon receiving a request from the job management module 17, the resource management module 14 performs scheduling of the use of the hardware resources (i.e., determines (generates) a use schedule of the hardware resources) and controls the engine management module 16.

The engine management module 16 controls the engine based on the use schedule of the hardware resources determined and generated by the resource management module 14. Based on that, the scanner engine 150, the plotter engine 160, and the FCU 140 actually execute a job.

The communication management module 15 provides a commonly-usable service for an application requiring a network such as the apparatus cooperation. Namely, the communication management module 15 divides (sorts) the data received from the network side based on various protocols to the applications, and transmits the data received from the applications to the network side. More specifically, for example, the communication management module 15 has server daemons such as "ftpd", "httpd", "lpd", "snmpd", "telnetd", and "smtp", and client functions of the protocols.

The authentication module 18 performs user authentication. In the use limit information items 20, which will be described in detail below, not only the usable amounts of the users but also the user names, the passwords and the like are registered. The authentication module 18 authenticates the user Q (an operator) based on whether the user name and the password input by the user Q via the operation panel 130 are registered in the use limit information items 20. Alternatively, for example, the user Q may be authenticated by reading the user ID stored in the IC card carried by the user Q using an IC card reader (not shown).

Further, when the server 1 or the server 2 serves as the authentication server, it is not necessary for the MFP 1 to include the authentication module 18. The authentication of the user Q using the authentication module 18 of the MFP 100 is herein called "local authentication". On the other hand, the authentication of the user Q performed by the server 1 or the server 2 is herein called "network authentication". The authentication result of the local authentication is valid within the MFP 100 that performs the authentication. On the other hand, the authentication result of the network authentication is valid for the MFPs in a predetermined network.

Further, the authentication module 18 reports a result indicating whether the authentication is successful to the application. When determining that the authentication is successful, the application accepts a setting of the execution condition of the job. On the other hand, when determining that the authentication is not successful, the authentication module 18 causes the display section 170 to display a message such as "Authentication is not successful".

The counter management module 19 counts the use amount (i.e., the number of pages or the number of destinations), and updates (the value of) the usable amount in the use limit information items 20. Details of the use limit information items 20 are described below. As described in FIG. 7, the counter management module 19 includes a printed number counting section 34. The printed number counting section 34 counts the number of printed pages based on the counting rule described below. The counting rule corresponding to the MFP is embedded (stored) in the printed number counting section 34 of the MFP.

It should be noted that the (counting) rule applied when the counter management module 19 counts the use amount is equal to the (counting) rule applied when the printed number counting section 34 counts the number of pages. This is because otherwise, the sum of the use amount of the user may not correspond to the number of pages used for billing. However, when it is not always necessary that the sum of the use amount of the user accurately corresponds to the number of pages used for billing, those counting rules may differ from each other.

The applications and the modules of the control section are an object including one or more methods, so that the object is executed on the OS 22 as a process. The process is executed in a manner that one or more threads are executed at the same time, and the OS 22 assigns the threads to the CPU 101. The OS 22 manages the states (i.e., for example, an execution state, a standby state, and an executable state) of the threads.

Further, the OS 22 controls the priority orders in the threads in the executable state, and also controls the threads to be allocated to the CPU 101 based on a logic of round robin or the like. Therefore, in comparison with a case where the parallel execution by switching processes, the processing speed in the parallel execution may be improved. The applications and the modules transmit and receive messages using process-to-process communications by executing a method.

Use Limit Information Items

FIG. 8 illustrates an example of the use limit information items 20. As illustrated in FIG. 8, the use limit information items 20 include user information items. As the use limit information items 20, items "user name", "user ID", "login name", and "password" are registered. The "user name" refers to a name or a popular name which may be easily recognized by the user Q. The "user ID" refers to one or more figures, symbols or alphabetical letters or a combination thereof. The "user ID" is ensured to be unique at least within the apparatus cooperation system. The "login name" refers to alphanumeric identification name easily readable by a computer and used to login to the MFP. The "password" is one or more figures, symbols or alphabetical letters or a combination thereof, so that the MFP authenticates the user Q.

Further, as the use limit information items 20, items "upper limit use amount", "use amount", and "usable amount" are also registered for the applications. Further, the items "upper limit use amount", "use amount", and "usable amount" include two parts corresponding color and monochrome (printing) to meet the applied billing system.

The "upper limit use amount" refers to a use amount that the user Q may use for a certain period. Namely, the "upper limit use amount" may be determined for a period including one year, half of the year, quarter of the year, one month, and one week, and for each of the users. The "use amount" refers to a used amount that have been used by the user Q in the period same as that determined in the "upper limit use amount". The "usable amount" refers to an amount that the user Q may used in the period same as that determined in the "upper limit use amount". Namely, there is an relationship: (usable amount)=(upper limit use amount)−(use amount).

The "usable amount" is updated whenever, for example, the user Q performs printing. When the "usable amount" becomes zero, the job management module 17 prevents the printing and the like. In the example of FIG. 8, the items "upper limit use amount", "use amount", and "usable amount" are included. However, when the "usable amount" or the "upper limit use amount", and the "use amount" are included, the "usable amount" may also be managed. By doing this, when the user Q logs in the MFP and operates the operation panel 130, the use limit information items 20 may be displayed on the display section 170, so that the user Q may recognize the "usable amount" and the like.

Apparatus Management Information Items

FIG. 9 illustrates an example of the apparatus management information items 21. As illustrated in FIG. 9, the apparatus management information items 21 include functions of the MFP. As examples of the functions, in the scanning, a readable color mode settable in reading (color, monochrome, two colors, or a single color), a draft type settable in reading (character, picture, character & picture), and resolution settable in reading (100 to 600 dpi) are registered.

Further, as functions in editing, the aggregate printing of plural pages (2-in-1, 4-in-1, 8-in-1), stamp printing to print a stamp-like character or symbol on the draft, copy guard to prevent unauthorized copying, variable magnification (20-200%) reducing and enlarging in image processing, OCR to recognize characters, and PDF for converting the file format of image data are registered.

Further, as output functions, items "FAX" and "print" are registered. In item "FAX", printing speed (60 pages per minute), color printing (color, monochrome, two colors, a single color), sheet size (auto, A4, B4, A3), energy consumption (monochrome printing, color printing, start-up time), stapling, punching, and Z-folding are registered. Further, in stapling and punching, the positions on the sheet where those functions are applied may be registered.

By exchanging the apparatus management information items 21 between the MFP 1 and the MFP 2, it becomes possible for the MFP 1 to manage a process that the MFP 1 may send a request to the MFP 2 to perform the process, and also, it becomes possible for the MFP 2 to manage a process that the MFP 2 may send a request to perform the process.

The MFP 1 and the MFP 2 acquire the apparatus management information items 21 of the MFPs registered in a communicable apparatus list described below, and stored the acquired apparatus management information items 21 of the MFPs in the HDD 105 or the like.

Process of Functional Block in Cooperation

Figure 10:
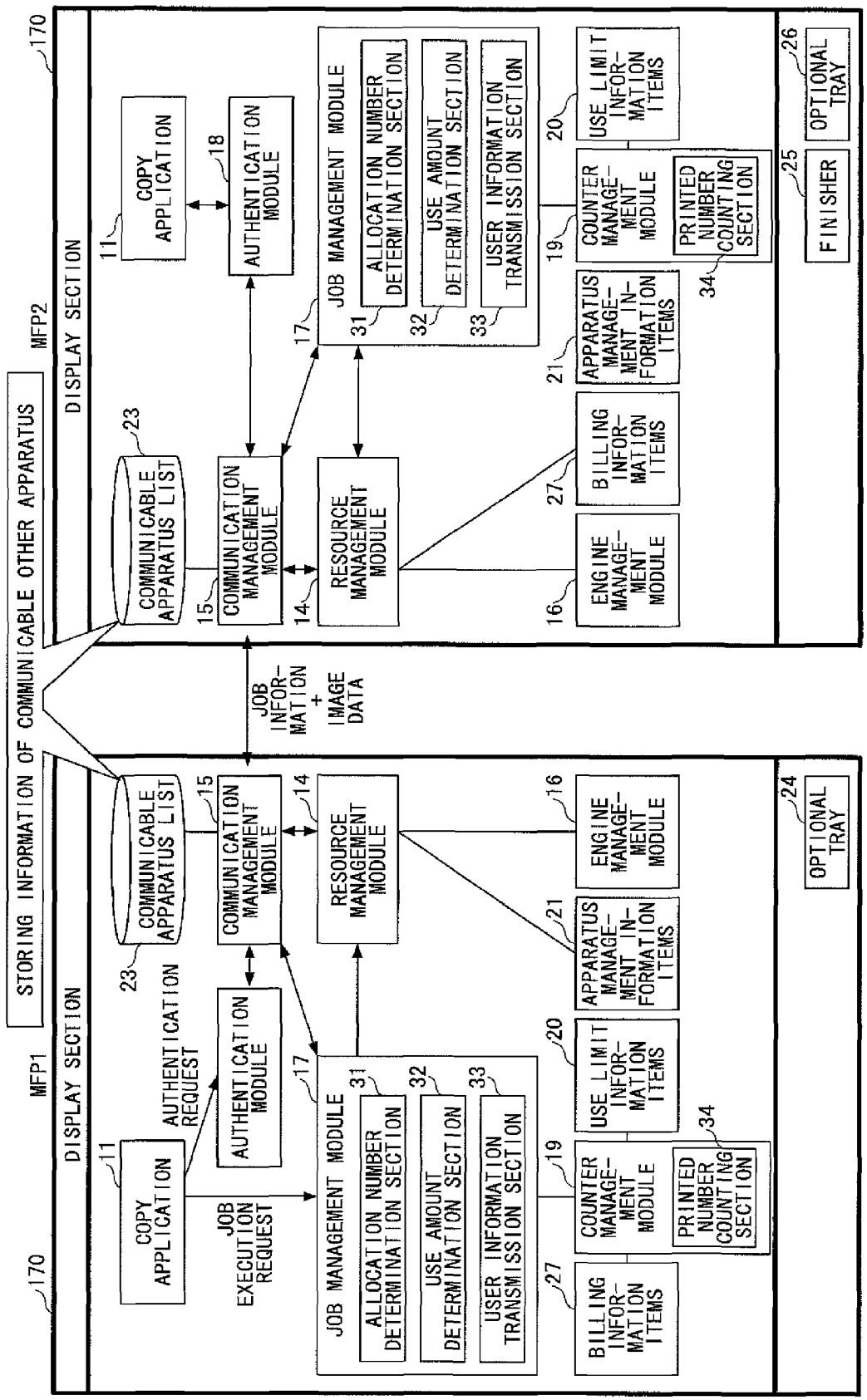
FIG. 10 is a drawing illustrating example relationships between the functional blocks when the MFP 1 and the MFP 2 are in an example processing scheme of the apparatus cooperation.

FIG. 10 schematically illustrates an example of the relationships between the functional blocks when the MFP 1 and the MFP 2 are in the apparatus cooperation. In FIG. 10, the same reference numerals as used in FIG. 7 to describe the same elements as those in FIG. 7, and the repeated descriptions thereof may be omitted. Further, optional trays 24 and 26 are sheet trays that may be additional mounted. A finisher 25 performs stapling, punching, sorting, binding and the like.

Communicable Apparatus List

The communication management module 15 includes a communicable apparatus list indicating other MFPs and servers that are determined to be started up (operated). To acquire the communicable apparatus list, there are the following two methods.

1) An administrator registers the MFPs 2 through 4 in the MFP 1 in advance, the MFPs 2 through 4 having been determined to be able to perform the apparatus cooperation with the MFP 1. Further, from among the MFPs 2 through 1, the MFP 1 registers the MFP that is communicable with the MFP 1 in the communicable apparatus list.

FIG. 11A illustrates an example of IP addresses of the MFPs that may perform the apparatus cooperation. To be able to perform the apparatus cooperation, it is necessary for the MFP to includes a function corresponding to the apparatus cooperation. In addition, for example, the it may be necessary that the administrator does not intentionally exclude the MFP from the target apparatuses that may perform the apparatus cooperation, or the administrator adds the MFP to the target apparatuses that may perform the apparatus cooperation. In the following, the apparatuses that may perform the apparatus cooperation is called an "apparatus cooperative MFP". The MFPs registers the IP addresses of the corresponding apparatus cooperative MFPs.

For example, upon being started up, the MFP 1 reports that the MFP 1 is being started up to the apparatus cooperative MFP registered in the MFP 1, By doing this, if the apparatus cooperative PEP is already stared up, the apparatus cooperative MFP may respond to the MFP 1, so that the MFP 1 may recognize that the apparatus cooperative MFP having sent the response to the MFP 1 is communicable with the MFP 1.

Therefore, the MFP 1 may register the apparatus cooperative MFP in the communicable apparatus list of the MFP 1. On the other hand, upon receipt of the report from the MFP 1 reporting that the MFP 1 is being started up, the apparatus cooperative MFP having already been stared up may register the MFP 1 in the communicable apparatus list of the apparatus cooperative MFP.

FIG. 11B illustrates an example of the communicable apparatus list. The communication management module 15 registers the IP address of the MFP or the like from among the apparatus cooperative MFPs into the communicable apparatus list, the MFP or the like having been determined to be communicable.

In this case, the IP address of the MFP or the like not having been determined to be communicable is registered using a data (symbol) "-" (see FIG. 11A) or the like. Namely, the data "-" indicates that it has not yet determined that the corresponding MFP or the like is communicable.

(2) The MFP 1 detects the MFPs 2 through 4 from the network the MFPs 2 through 4 capable of performing the apparatus cooperation with the MFP 1.

Then, for example, upon being stared up, the MFP 1 transmits broadcast packet data requesting the MFPs capable of performing the apparatus cooperation to report the respective IP addresses to the MFP 1. In this case, by using the broadcast packet data having destination address data in which each digit is 1, it becomes possible to send an inquiry asking whether it is possible to perform the apparatus cooperation with the MFP 1 to all the apparatus in LAN 1.

Further, for example, by designating the "directed broadcast address", it becomes possible to send the inquiry asking whether it is possible to perform the apparatus cooperation with the MFP 1 to the MFPs or the like having the network address beyond routers. Such a network address where the MFP capable of performing the apparatus cooperation with the MFP 1 belongs is known to the administrator, it is supposed to be easy to specify the range to be searched to that end.

It is preferable to detect the MFPs capable of performing the apparatus cooperation with the MFP 1 by combining the above two methods (1) and (2). After the detection, the MFP 1 registers the IP addresses of the MFPs 2 through 4 in the communicable apparatus list.

User Authentication

When the user Q (an operator) specifies the MFP 100 to execute the apparatus cooperative job from among the MFPs registered in the communicable apparatus list based on the operations described below, the MFPs 2 through 4 to which the MFP 1 transmits the user information items are specified. Here, it is assumed that the MFP 1 performs the apparatus cooperation with the MFP 2, and a process of authenticating the user Q by the MFP 2 is described.

Figure 12:
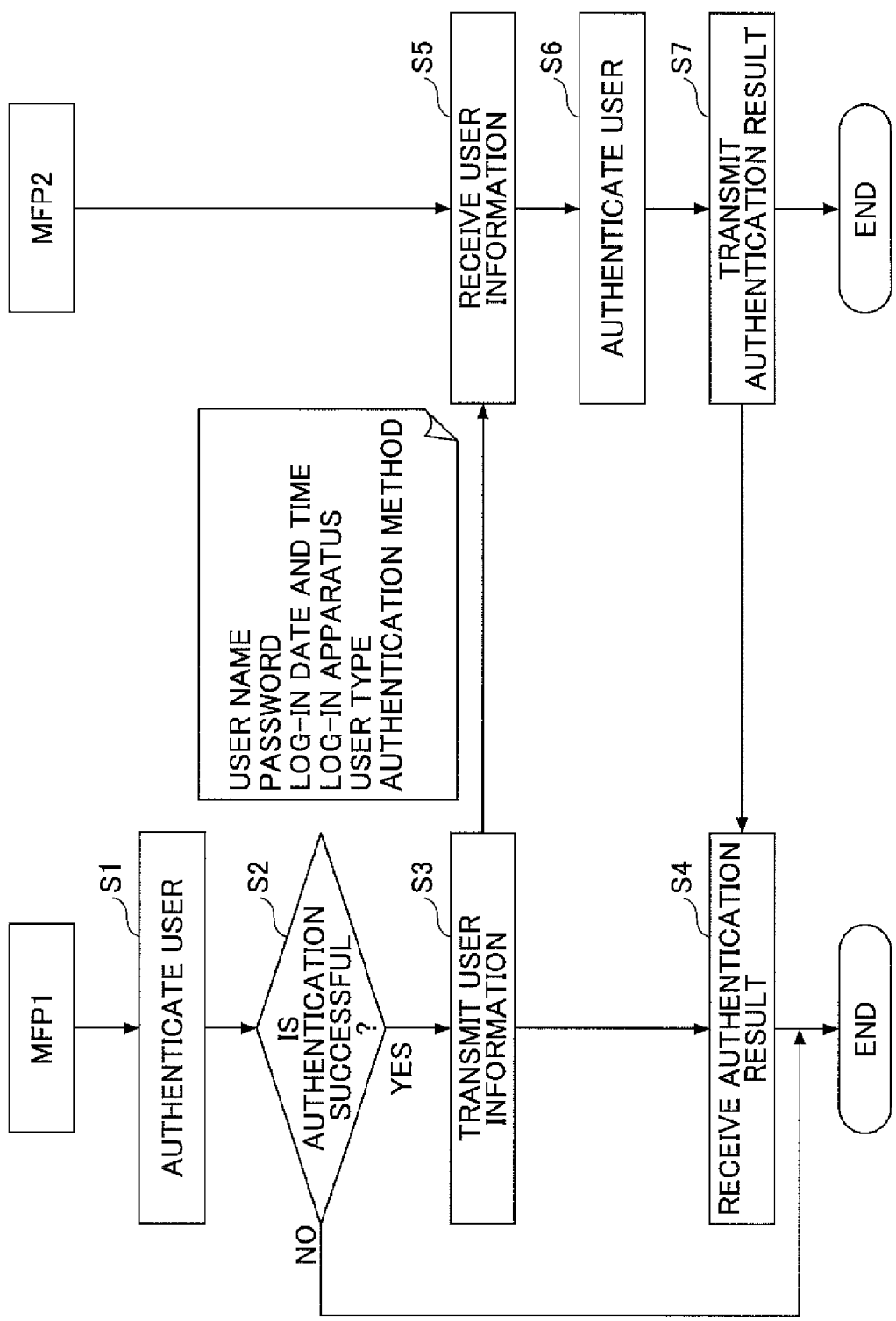
FIG. 12 is an example flowchart illustrating a process of authenticating a user Q by the MFP 1 and the MFP 2.

FIG. 12 is an example flowchart illustrating a process of authenticating the user Q by the MFP 1 and the MFP 2.

When the user Q operates the MFP 1 to perform the apparatus cooperative job, the user Q logs in the MFP 1. To that end, the copy application 11 transmits an authentication request to the authentication module 18. The authentication request includes the user name and the password input by the user Q.

The authentication module 18 determines whether the authentication is successful based on whether a pair (combination) of the user name and the password is registered in the use limit information items (steps S1 and S2).

When determining that the authentication is not successful (NO in step S2), the user Q is not authorized to use the MFP 1. Therefore, the process of FIG. 12 is terminated.

On the other hand, when determining that the authentication is successful (YES in step S2), the user information transmission section 33 of the MFP 1 transmits the user information items of the user 0 to the MFP 3 (step S3). The user information items to be transmitted include the "user name" and the "password" which are essential for the user authentication, "log-in date and time", "log-in apparatus", "user type", "authentication method" and the like. The "log-in date and time" refers to the date and time when the user Q successfully lops in the MFP 1 (i.e., when determining that the authentication is successful). The "log-in apparatus" refers to the identification information (e.g., the IP address) of the MFP 1 where the user Q logs in.

The "user type" refers to the information indicating the authority level of the user Q (e.g., the authority level as the administrator, a general user, or the like). The "authentication method" indicates whether the "local authentication" or the "network authentication" is applied. The user information items may further include the user ID, log-in name, and the like.

Further, the elapsed time from when determining that the user authentication is successful to when the user information items are transmitted is not limited. Namely, it is not always necessary that the user information items are transmitted right after the determination that the user authentication is successful. Instead, the user information items may be transmitted after the apparatus that is to execute the job is determined.

The MFP 2 receives the user information items of the user Q (step S5). The job management module 17 of the MFP 2 transmits the authentication request to the authentication module 18.

The authentication module 18 of the MFP 2 determines whether the authentication is successful based on whether a pair (combination) of the user name and the password is registered in the use limit information items (step S6).

The MFP 2 transmits the authentication result to the MFP 1 (step S7). The MFP 1 receives the authentication result (step S4).

The authentication result indicates whether the authentication is successful. When the MFP 1 receives the authentication result indicating that the authentication is successful, the MFP 1 allocates the number of pages (to be printed) to the MFP 2, and starts the execution of the apparatus cooperative job. A case where the MFP 1 receives the authentication result indicating that the authentication is not successful is described below.

In a case where the MFP 1 executes the apparatus cooperative job with two or more MFPs, the user information transmission section 33 of the MFP 1 transmits the user information items of the user Q to all the MFPs.

Job Settings

When determining that the authentication is successful, the copy application 11 accepts (receives) a setting of the execution condition of the job. FIGS. 13A through 13D illustrates example screens of the apparatus cooperative job displayed on the display section 170. For example, when the user Q performs copying based on the apparatus cooperative job, the user Q presses (touches) the copy button on the operation panel 130, and calls (displays) a setting screen of the apparatus cooperative job.

As illustrated in FIG. 13A, there are displayed an "apparatus search" button 301, a "function search" button 302 on the operation panel 130. The "apparatus search" button 301 is used for the MFP 1 to search for the MFP that is registered in the communicable apparatus list. Namely, the communication management module 15 determines (confirms) that it is possible to execute the apparatus cooperative job by communicating with the MFPs registered in the communicable apparatus list before the apparatus cooperative job is executed.

On the other hand, the "function search" button 302 is used for the MFP 1 to search for the MFPs 2 through 4 capable of providing a function that is set by the user Q from among the MFPs registered in the communicable apparatus list.

FIG. 13B illustrates an example of an "apparatus cooperative job—apparatus list" screen displayed when the "apparatus search" button 301 of FIG. 13A is pressed by the user Q. As illustrated in FIG. 13B, the MFP 1 displays a list of the MFPs 2 through 4 (two apparatuses in case of FIG. 13B) that have responded to be capable of executing the apparatus cooperative job from among the MFPs registered in the communicable apparatus list. The responding MFP transmits the apparatus name and the IP address of the MFP to the MFP 1.

In this case, the responding MFP transmits the apparatus management information items 21 of the MFP. Then, the use Q checks and confirms that a target MFP having a desired function is listed, and presses a "condition set" button 311.

Figure 13C:
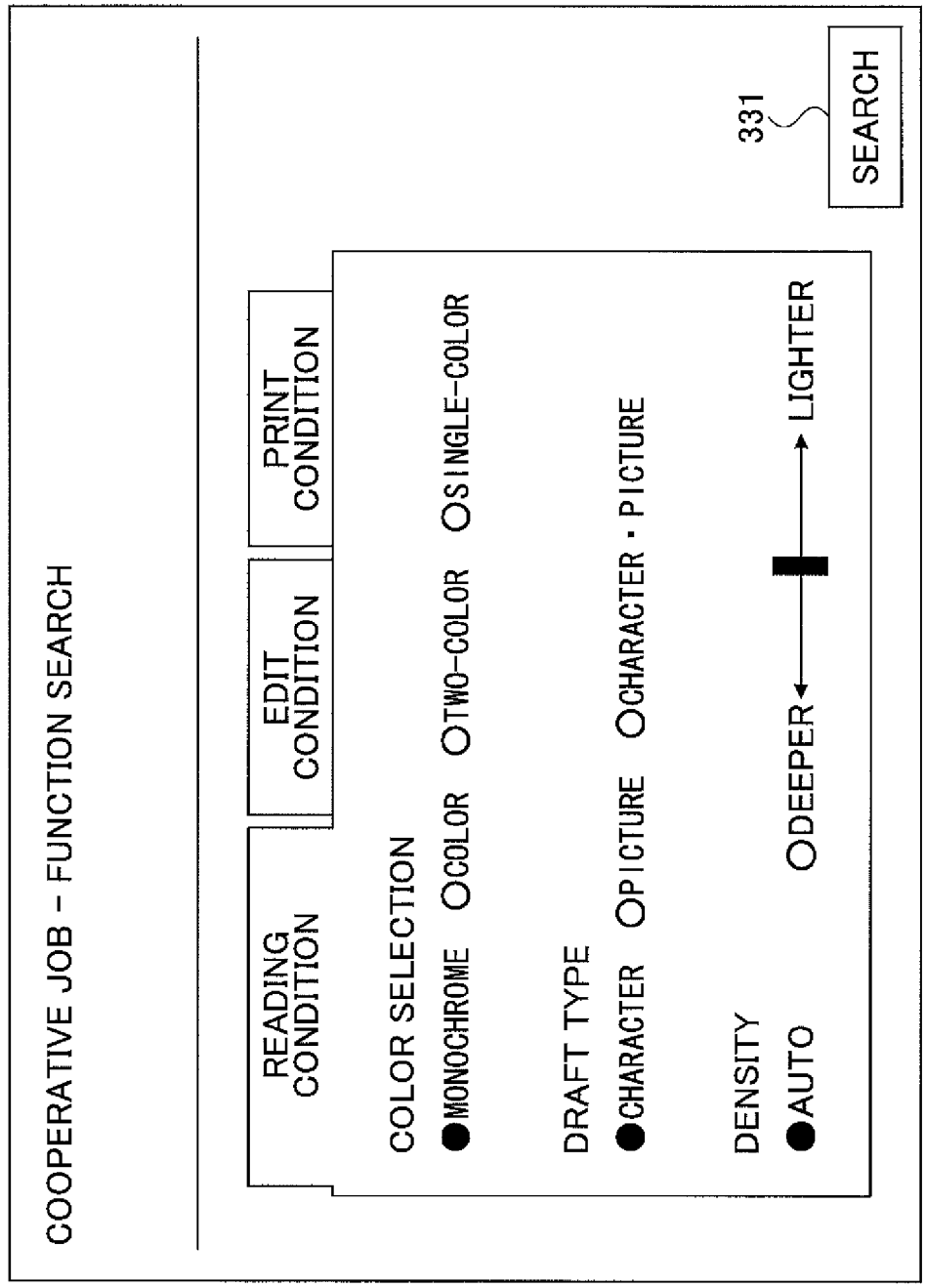
Figure 13D:
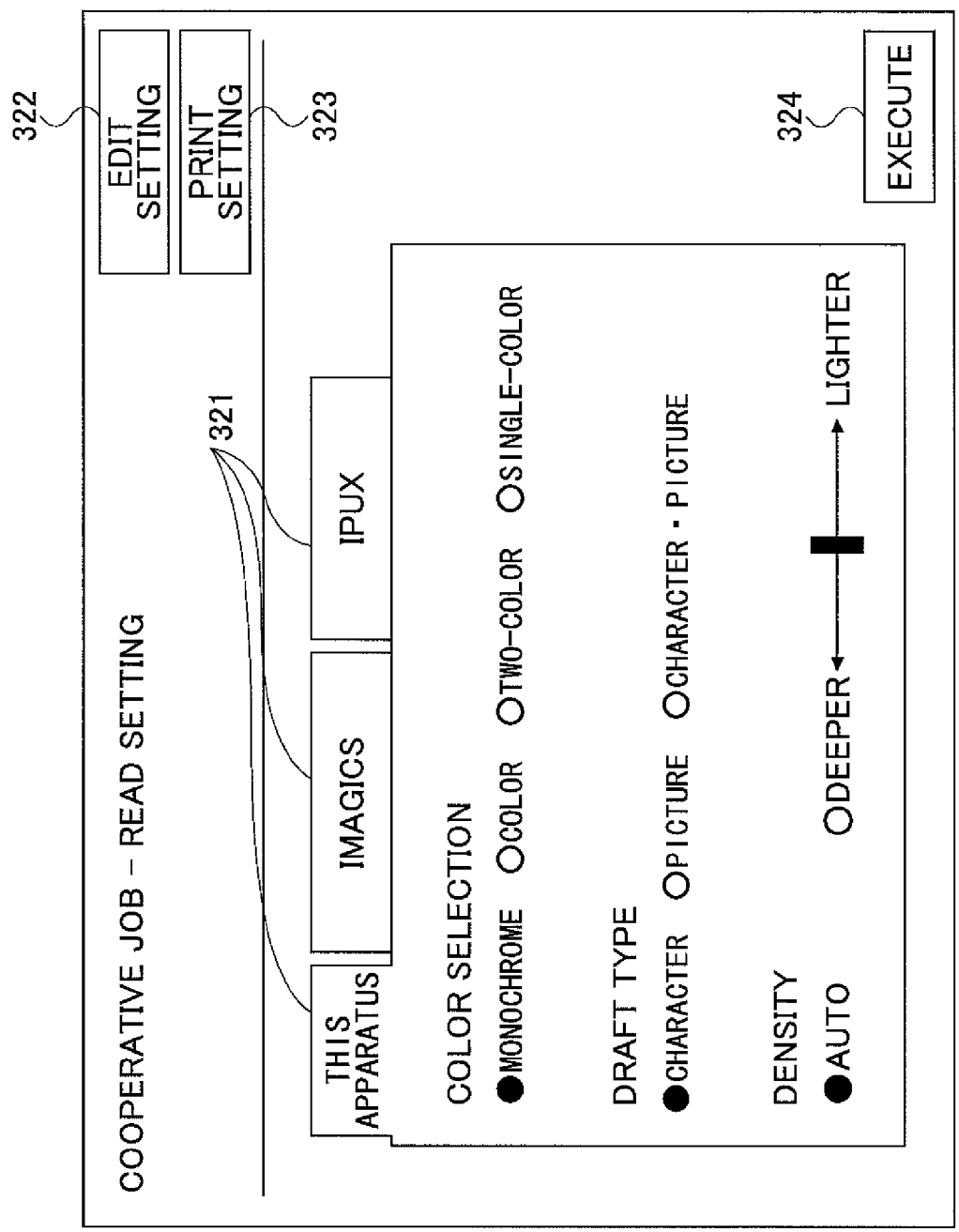

FIG. 13D illustrates an example "cooperative job—read setting" screen displayed when the "condition set" button 311 of FIG. 13B is pressed by the user Q. As illustrated in FIG. 13D, the cooperative job—read setting" screen display menus of the reading settings for each of the MFP including the MFP 1. More specifically, tabs 321 indicating the apparatus names of "this apparatus (i.e. MFP 1)", "imagics (MFP 2)", and "ipux (MFP 3)" are displayed, so that the user Q may select the MFP to set reading settings by using (selecting) the tabs 321.

When the user Q selects the tabs 321 indicating the apparatus names, the MFP 1 displays only an effective (selectable) menu of the respective MFPs based on the apparatus management information items 21.

The user Q may set reading conditions of the items of, for example, color selection, draft type, and density from the effective menu of the selected MFP. After setting the MFP to read a draft and the reading condition, the user Q sequentially selects (touches) an "edit setting" button 322 and a "print setting" button 323.

When the "edit setting" button 322 is selected, menus for selecting editing functions provided by the corresponding apparatuses (i.e., the MFP) may be displayed. At the same time, when the "print setting" button 323 is selected, menus for selecting printing functions provided by the corresponding apparatuses (i.e., the MFP) may be displayed. Further, in the reading setting, the user Q may set the condition for only one MFP. In the print setting and the edit setting, however, the user Q may set the conditions for two or more MFPs or servers. Finally, the apparatus cooperative job may be started by pressing an "execute" button 324.

Further, FIG. 13C illustrates an example "cooperative job—function search" screen displayed when the "function search" button 302 of FIG. 13A is pressed, by the user Q. As illustrated in FIG. 13D, the MFP 1 may display settable menus of the processes "read condition", "edit condition", and "print condition" based on the apparatus management information items 21 of the other MFPs acquired before. The user Q may select the tab to set the "read condition", the "edit condition", and "print condition" which become search keys.

After the user Q sets the condition and presses a "search" button 331, the MFP 1 searches the apparatus management information items 21 acquired from the other MFPs by using the "read condition", the "edit condition", and "print condition" as the search keys. By doing this, it becomes possible to specify (search for) the MFP capable of reading in accordance with the "read condition" set by the user Q, the MFP capable of editing in accordance with the "edit condition" set by the user Q, and the MFP capable of printing in accordance with the "print condition" set by the user Q.

There may be a case where more than one apparatuses that satisfy the "read condition" are searched for (hit), more than one apparatuses that satisfy the "edit condition" are searched for, and more than one apparatuses that satisfy the "print condition" area searched for. In this case, As illustrated in FIG. 13D, the MFP 1 may display all the apparatuses on the "read condition", the "edit condition", or the "print condition" basis, or may display only a predetermined (limited) number of apparatuses.

When only the predetermined (limited) number of apparatuses are displayed, the apparatuses to be displayed may be determined based on a method in which a higher priority is placed on the MFP 1 method in which the higher priority is placed on the MFP where the load of the resources is lowered, a method in which the higher priority is placed on the MFP having a closer distance (physical distance or communication distance) from the MFP 1 or the like.

The MFP 1 displays the searched-for one or more MFPs on a screen similar to that of FIG. 13D. Namely, the MFP 1 displays the MFPs satisfying the condition on the "read condition", the "edit condition", or the "print condition" basis. In this case, the "read condition", the "edit condition", and the "print condition" are set on the screen of FIG. 13G. Therefore, it is not necessary for the user Q to set those conditions again. After checking the MFPs for the processes and conditions, the user Q presses the "execute" button 324, so that the MFP starts the apparatus cooperative job.

Figure 14A:
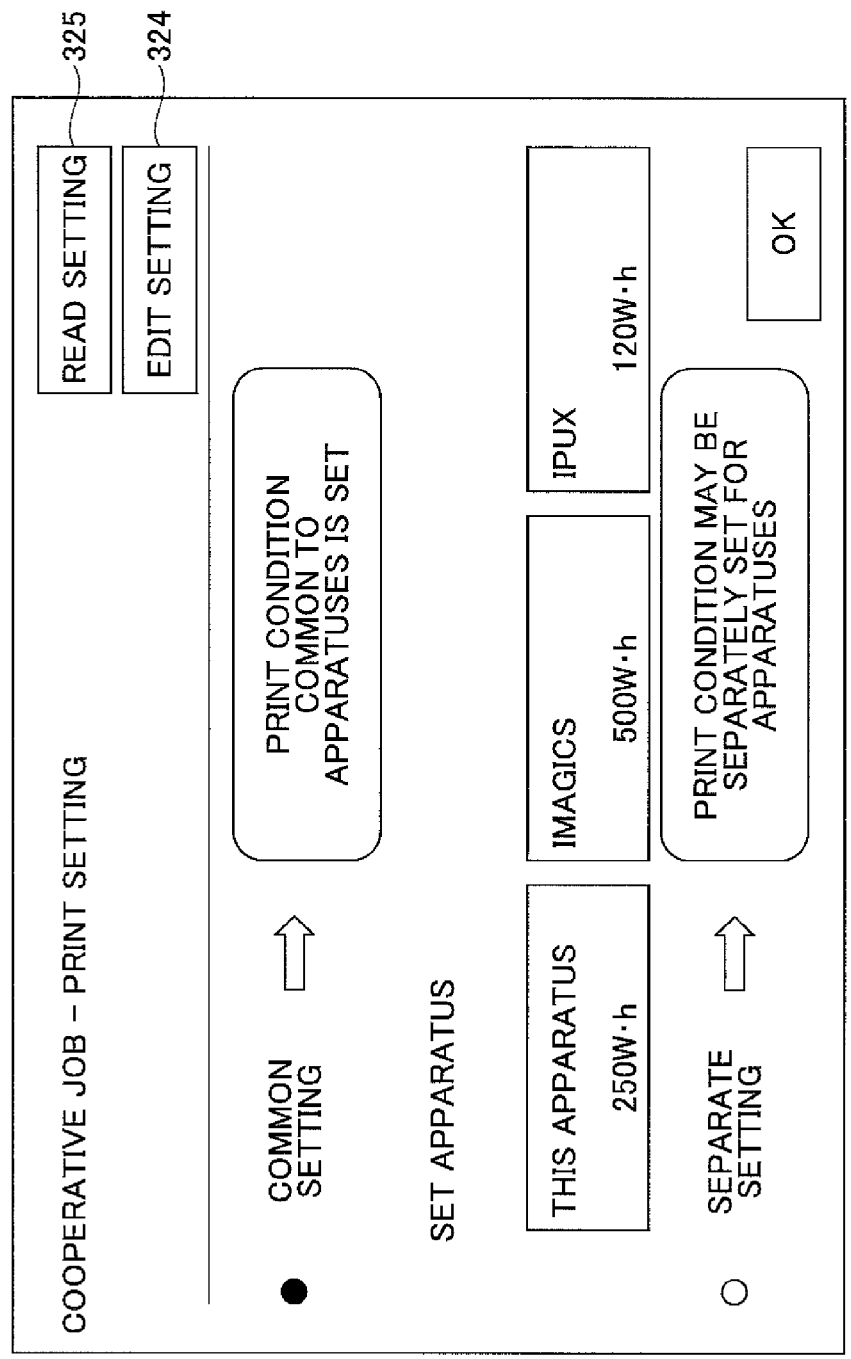
FIGS. 14A through 14C are other drawings illustrating example screens of the apparatus cooperative job displayed on the display section.

FIG. 14A illustrates an example of the first screen when the "print setting" button 323 of FIG. 13D is pressed. In the first screen of FIG. 14A, the user Q may select (determine) whether a common print condition is set to plural MFPs (common setting) or the print condition is separately set to the MFPs (separate setting). When determining that common print condition is set to plural MFPs, the user Q selects one or more MFPs. When determining that the print condition is separately set to the MFPs, the user Q set the print condition for each of the MFPs on the next screen.

In a case where the user Q selects the copy application 11 or the printer application 12, the MFP 1 may acquire information items such as the elapsed time from the last printing and energy consumption for restoring the temperature to the printable temperature or the like from the MFP registered in the communicable apparatus list, and display such information items.

In printing, a large power may be required to increase the temperature of the fixing device to the printable temperature. Therefore, it may become possible to reduce the energy consumption if the user Q may select the MFP having a smaller elapsed time or the MFP having smaller energy consumption to restore the temperature to the printable temperature.

Figure 14B:
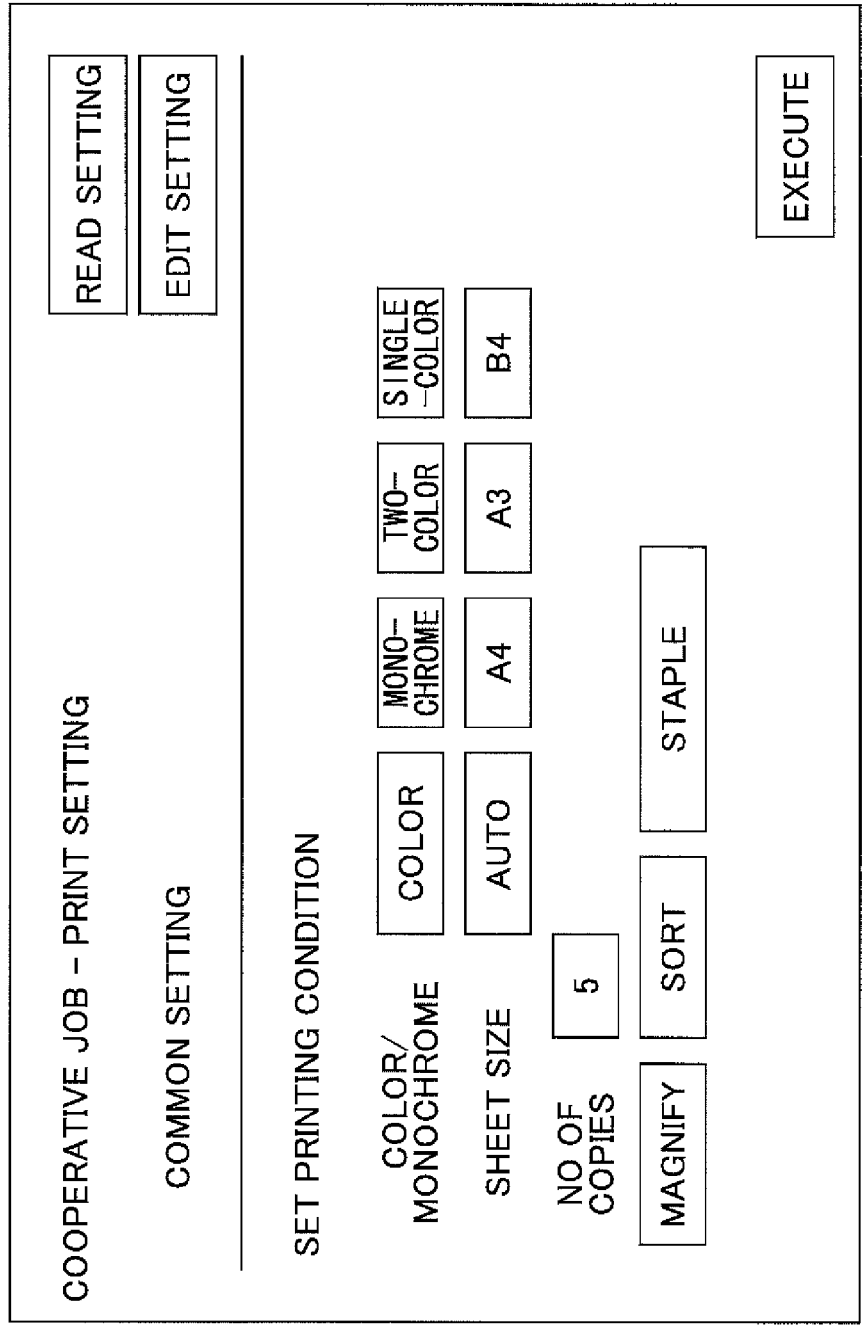

FIG. 14B illustrates an example screen for common setting of the print condition. When the common setting is selected, the user Q may set the print conditions such as color/monochrome, sheet size, number of copies, variable magnification and the like common to the MFPs.

The common print conditions are determined based on the greatest common factors of the apparatus management information items 21 received from the MFPs registered in the communicable apparatus list. For example, if the MFP 1 may print color and monochrome images but the MFP 2 may print only monochrome image, the "color" is not displayed in the "color/monochrome" part of FIG. 14B.

Similarly, in the "sheet size" part of FIG. 14B, only the sheet size supported by both the MFP 1 and the MFP 2 is displayed, and in the "variable magnification" part, only the variable magnification range commonly supported (commonly selectable) by both the MFP1 and the MFP 2 may be displayed. Further, the "sort" and the "staple" displayed only when the "sort" and the "staple", respectively, are supported by both the MFP 1 and the MFP 2.

Further, the number of copies (or the number of pages) having been set is allocated to the MFPs having been set as the targets of the common setting. The user Q may select which of the number of copies or the number of pages is to be allocated.

Figure 14C:
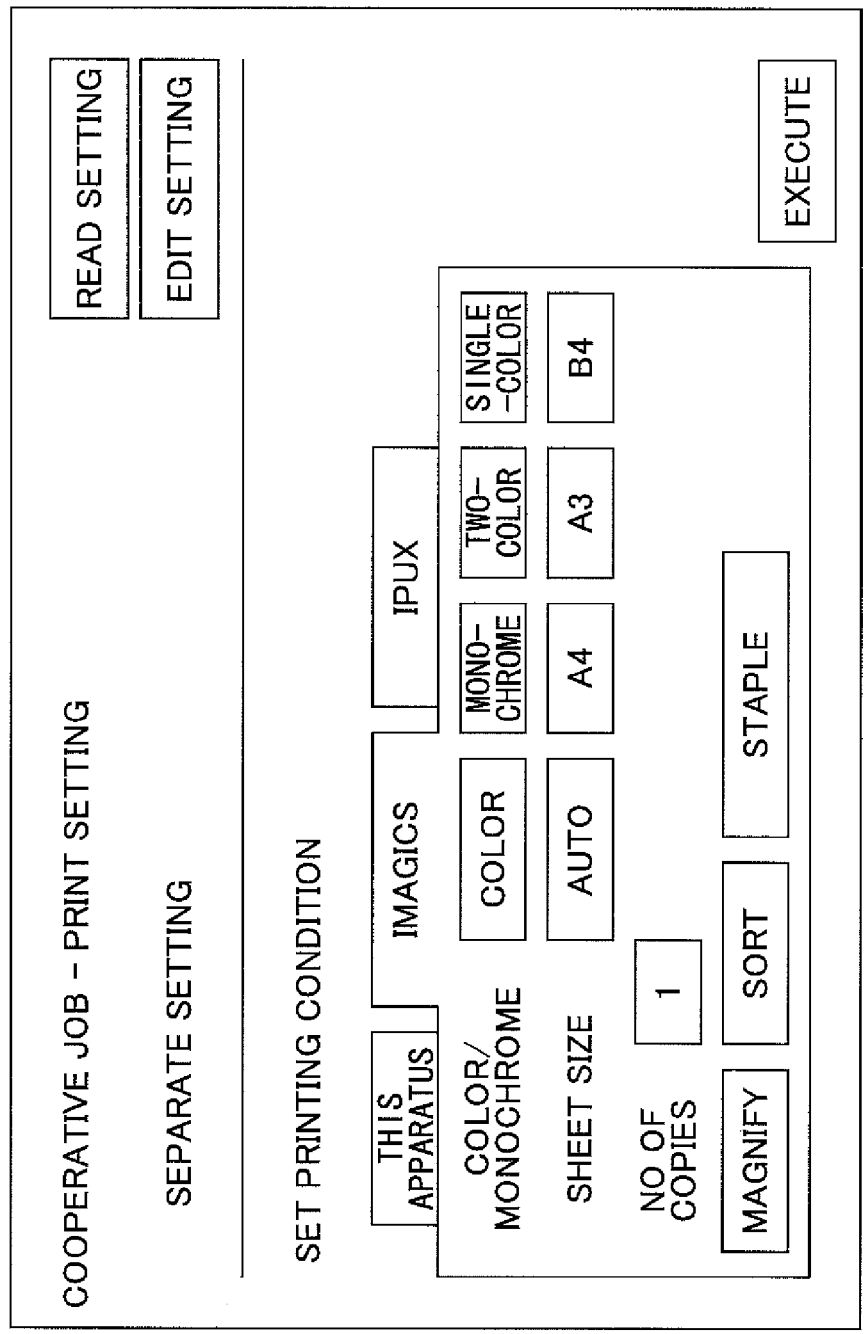

FIG. 14C illustrates an example of a screen for separate setting of the print conditions. When the separate setting is selected, the user Q may separately (differently) set general printing conditions such as sheet size, the number of copies, variable magnification for each of the MFPs. The MFP prints the number of copies set (allocated) to the MFP.

Job Information Items

When the copy application 11 receives the setting of the execution condition of the job, the copy application 11 transmits a job execution request to the job management module 17. The job management module 17 generates the job information items based on the execution condition.

FIGS. 15A through 15E illustrate examples of the job information items. The apparatus cooperative job is generally executed in the order of "1. input", "2. edit", and "3. output". Further, an "apparatus in charge" is registered for each of the processes. Further, an input condition, an edit condition, an output condition are registered.

Copy Application

FIG. 15A illustrates a comparative example of the job of the copy application 11 in which only the MFP 1 prints. As illustrated in FIG. 15A, in the copy application 11, the apparatus in charge of inputting is the MFP 1, the apparatus in charge of editing is the MFP 2, and the apparatus in charge of outputting (printing) is the MFP 1.

FIG. 15B illustrates an example of the apparatus cooperative job of the copy application 11 in which both the MFP 1 and the MFP 2 print. As illustrated in FIG. 15B, in the copy application 11, the apparatus in charge of inputting is the MFP 1, the apparatus in charge of editing is the MFP 2, and the apparatuses in charge of outputting (printing) are the MFP 1 and the MFP 2. To divide the printing between the MFP 1 and the MFP 2, the "common setting" is selected in the "print setting".

The allocation number determination section 31 allocates the number of copies (the number of prints) to each of the apparatuses in charge. A method of determining the allocated number of pages is described below. FIG. 15C illustrates an example of the apparatus cooperative job where the number of copies are allocated between the MFP 1 and the MFP 2. Compared with the case of FIG. 15B, there are generated two output processes, and the MFP 1 and the MFP 2 are set (designated) as the apparatuses in charge of outputting (printing).

The job management module 17 transmits a print request where the MFP 2 is registered as the apparatus in charge of outputting and the job information items (or the entire job information items) to the MFP 2. Further, in the "print setting", when the user selects the "separate setting", the job information items of FIG. 15C are directly generated. In the above description, the part of user authentication is omitted.

A schematic procedure of the copy application 11 in the case of FIG. 15C is described.

1. First, the job management module 17 transmits a use request of the scanner engine of the MFP 1 to the resource management module 14. The resource management module 14 checks and confirms that, for example, the use flag of the scanner engine indicates no use, and secures (reserves) the scanner engine. Next, the resource management module 14 acquires the reading conditions (double-sided reading, draft type: characters, 300 dpi, monochrome) from the job management module 17, sets the acquired reading conditions to the scanner engine, and reads the draft. The resource management module 14 detects that there is no draft by a sensor of the ADS (Automatic Document Feeder), and then, reports the completion of the draft reading to the job management module 17.

The generated image data of the draft are stored in the HDD 105. When the number of the pages of the image data is determined, the number of pages to be allocated may also be determined.

2. The apparatus in charge of editing is the MFP 2. Therefore, the job management module 17 transmits the image data and the edit condition to the MFP 2 via the communication management module 15. The MFP 2 performs a "4-in-1" aggregation process on the image data (i.e. four-page image data are aggregated into one-page image data), and transmits the aggregated image data to the MFP 1. The communication management module 15 reports the reception of the image data from the MFP 2 to the job management module 17.

The job management module 17 transmits the job information items where the apparatus in charge is the MFP 2 and the image data to the MFP 2.

3. At least before all pages are printed, the job management modules 17 of the MFPs 1 and 2 check and confirm that the allocated number of pages thereof are less than or equal to the "usable amounts" in the corresponding use limit information items 20.

More specifically, the counter management module 19 counts the number of paces to be printed, and compares the counted number with the "usable amount". When determining that the allocated number of pages is greater than the usable amount, one of the following controlling methods is performed. Which of the following control methods is selected (performed) is determined based on the setting of the MFP 1.

print until the upper limit of the usable amount.
    stop the apparatus cooperative job without printing any of the pages 4. The job management modules 17 of the MFPs 1 and 2 transmits a use request to use the plotter engines of the MFPs 1 and 2 to the resource management modules 14, of the MFPs 1 and 2, respectively. The resource management module 14 checks and confirms that, for example, the use flag of the plotter engine indicates no use, and secures (reserves) the plotter engine.

Next, the resource management module 14 acquires the printing conditions (monochrome, three copies (for the MFP 1) or two copies (for the MFP 2), A4, punching) from the job management module 17, sets the acquired printing conditions to the plotter engine, and prints the draft. The resource management module 14 reports the completion of the printing of all pages to the job management module 17.

FAX Application

FIG. 15D illustrates an example of the job information items of the apparatus cooperative job of the FAX application 13. In the example of FIG. 15D, the apparatus in charge of inputting is the MFP 1, the apparatus in charge of editing is the MFP 1, and the apparatuses in charge of outputting (FAX transmission) are the MFP 1 and the MFP 2.

To divide the FAX transmission process between the MFP 1 and the MFP 2, the user Q sets plural destinations (i.e., FAX numbers), which correspond to the number of copies in the case of the copy application 11, in "transmission setting" (not shown) in the scanner application.

When the number of the destinations is more than one (in case of broadcast transmission), the allocation number determination section 31 determines the destination of the apparatus in charge on the destination basis. For example, in a case where there are two destinations and there are two MFPs in charge of the FAX transmission, one of the MFPs is in charge of one of the destinations, and the other MFP is in charge of the rest of the destinations. Further, for example, when the number of the destinations is N and the number of the MFPs in charge of the FAX transmission. P, one MFP is in charge of N/M destinations.

Further, it may be effective when the MFP closer to the destination may be allocated. For example, in a case is considered where the MFP 1 is located in TOKYO and the MFP 2 is located in OSAKA and the area codes of the destinations are 03 (area code of TOKYO) and 06 (area code of OSAKA). In this case, by allocating the MFP 1 (in TOKYO) to the destination having the are code "03" and also allocating the MFP 2 to the destination having the area code "06", the communication cost may be reduced. In this case, for example, a table indicating the area codes that the MFP is to be in charge of may be provided in the MFP in advance.

FIG. 15E illustrates an example of the apparatus cooperative job where the destinations are allocated to the MFP 1 and the MFP 2. Compared with the case of FIG. 15D, there are generated two output processes, so that the MFP 1 is set to be in charge of one process and the MFP 2 is set to be in charge of the other process. The job management module 17 transmits (a part of) the job information items indicating that the MFP 2 is the apparatus in charge of outputting to the MFP 2. (Otherwise, the job management module 17 may transmit the entire job information items.)

A schematic procedure of the FAX application 13 in the example of FIG. 15E is described. Here, the process of the user authentication is omitted.

1. The input process of the FAX application 13 is similar to that in the copy application 11. The image data generated by scanning are stored in the HDD 105.
2. The apparatus in charge of editing is the MFP 1. Therefore, the job management module 17 performs 120% expansion process on the image data.
   The job management module 17 transmits a part of the job information items where the apparatus in charge is the MFP 2 and the image data to the MFP 2.
3. Before starting the FAX transmission, the job management modules 17 of the MFPs 1 and 2 check and confirm that the number of pages are less than or equal to the "usable amounts" corresponding use limit information items 20. When determining that the number of pages is greater than the usable amount, one of the following control methods is performed. Which of the following control methods is selected (performed) is determined based on the setting of the MFP 1.
   perform FAX transmission until the upper limit of the usable amount
   stop the apparatus cooperative job without executing the FAX transmission
4. The job management modules 17 of the MFPs 1 and 2 transmits a use request to use the FCU 140 of the MFPs 1 and 2 to the resource management modules 14, of the MFPs 1 and 2, respectively. The resource management module 14 checks and confirms that, for example, the use flag of the FCU 140 indicates no use, and secures (reserves) the FCU 140.
   Next, the resource management module 14 acquires FAX transmission conditions FAX numbers of the destinations) from the job management module 17, sets the acquired FAX transmission conditions to the FCU 140, and performs printing. The resource management module 14 reports the completion of the FAX transmission of all pages to the job management module 17.

Billing Information Items

FIG. 16 illustrates an example of billing information items. Billing information items 27 mainly include a counting method and a contracted unit price.

A: Counting Method

As the counting method, there are two methods: one is the toner kit method and the other is the counter method. In the counter method, there are some counting rules to count the number of pages. More specifically, for example, those counting rules include color-based counting rules, sheet size-based counting rules, printed side-based counting rules, toner use amount-based counting rules. The numbers "1", "2", "3", and "4" of the counting rules in FIG. 16 are for identification purposes only (used as the type numbers).

The color-based counting rules include, for example, a counting rule counting color pages and monochrome pages separately, a counting rule counting only monochrome pages because of no color printing function, a counting rule counting color pages, monochrome pages, two-color pages, single-color pages separately and the like.

The sheet size-based counting rules include, for example, a counting rule counting pages regardless of the sheet sizes, a counting rule counting the pages having the sizes greater than or equal to A3 size and the pages having the sizes less than A3 size separately, a counting rule counting the pages having the A3 size or larger, the pages having A4 size, and the pages having B4 size or smaller, a counting rule counting the pages having the A3 size or larger, the pages having A4 size, the pages having B4 size, and the pages having A5 size or smaller, and the like.

The printed side-based counting rules include a counting rule counting one (a single) side of the sheet as one page and a counting rule counting one (a single) sheet as one page regardless of whether the printing is one-sided printing or double-sided printing.

In the toner use amount-based counting rules, the counted value is increased in accordance with the accumulated toner use amount used to print pages because of the billing system (scheme) where charge (billing) amount is determined in accordance with toner use amount is employed. In this case, typically, the toner use amount may be determined based on a coverage area where toner is adhered (used) on one page. In FIG. 16, a case where the coverage is 6% or more and a case where the coverage is 5% or more are described. However, for example, the coverage may easily be determined by 1% resolution, 5% resolution, 10% resolution or the like.

According to the example of FIG. 16, a case is described where the counting rules are selected in a manner that the type number 1 is selected as the color-based counting rule, and the type number 2 is selected as the sheet size-based counting rules, the type number 1 is selected as the printed side-based counting rules, and the type number 1 is selected as the toner use amount-based counting rules.

In this case, whenever an image is formed on one side of a recording medium (sheet), the printed number counting section 34 counts the number of printed pages as follows:

(i) Color printing where the coverage is 6% or more:
   "a" pages for A3 size or larger and "b" pages for sizes smaller than A3 size;
(ii) Color printing where the coverage is less than 6%:
   "c" pages for A3 size or larger and "d" pages for sizes smaller than A3 size;
(iii) Monochrome printing where the coverage is 6% or more:
   "e" pages for A3 size or larger and "f" pages for sizes smaller than A3 size; and
(iv) Monochrome printing where the coverage is less than 6%:
   "g" pages for A3 size or larger and "h" pages for sizes smaller than A3 size.

B: Contracted Unit Price

Next, the contracted unit price is described. The contracted unit price is typically determined based on one of the following methods.

The unit price per one sheet is determined regardless of the number of printed pages Color 30 Yen (i.e., Japanese Yen(¥))/Monochrome 8 Yen The unit price per one sheet is decreased in a step-by-step manner as the number of the pages is increased.

In this scheme, for example, a fixed base cost is applied up to a predetermined number of printed pages. Beyond the predetermined number of printed pages, the contracted unit prices such as "Color 30 Yen/Monochrome 8 Yen" is applied. After that, in many cases, the contracted unit prices may be decreased in a step-by-step manner as the number of the pages is increased.

As described above, in most cases, the contracted unit prices are determined on a contract basis between a leasing company and a client. Therefore, the contracted unit prices may not be stored into the MFP. However, according to a contract rule, some leasing companies determine the contracted unit prices in a manner that the contracted unit prices changes based on the printing speed.

In this case, depending on whether the MFP belongs to a high-speed layer (here, the "layer" refers to a range (degree) of the printing speed), a middle-speed layer, or a slow-speed layer, one MFP may estimate the contracted unit prices of another MFP. Further, in most cases, the classification of the speed layer, the middle-speed layer, or the slow-speed layer of the MFP may also be estimated (determined) based on the model number of the MFP or the like. Therefore, the MFP may estimate the contracted unit prices by acquiring printing speed information or the model name.

The billing information items 27 of the MFPs are managed by, for example, the counter management module 19, and are stored in the HDD 105. Further, the Billing information items 27 may be downloaded from a server (not shown). In she billing information items 27, either the toner method or the counter method is registered.

When the counter method is registered, selected counting rules of the color-based counting rule, the sheet size-based counting rule, the printed side-based counting rule, and the toner use amount-based counting rule are registered using the numbers. Further, when the contracted unit prices are used, the contracted unit price information or the (printing) speed information are stored. When the contracted unit price information is stored, identification information items indicating, for example, "A" and "B" corresponding the contracted unit prices and the corresponding information items of the contracted unit prices are stored.

Further, in the case of the printer application 12, the counting are performed in the same manner as in the case of the copy application 11. On the other hand, in the FAX application 13, the MFP 100 generally does not count the number of pages and the number of the destinations. Therefore, in the FAX application 13, it is not necessary for the counter management module 19 to count the number of transmitted pages.

Figure 17A:
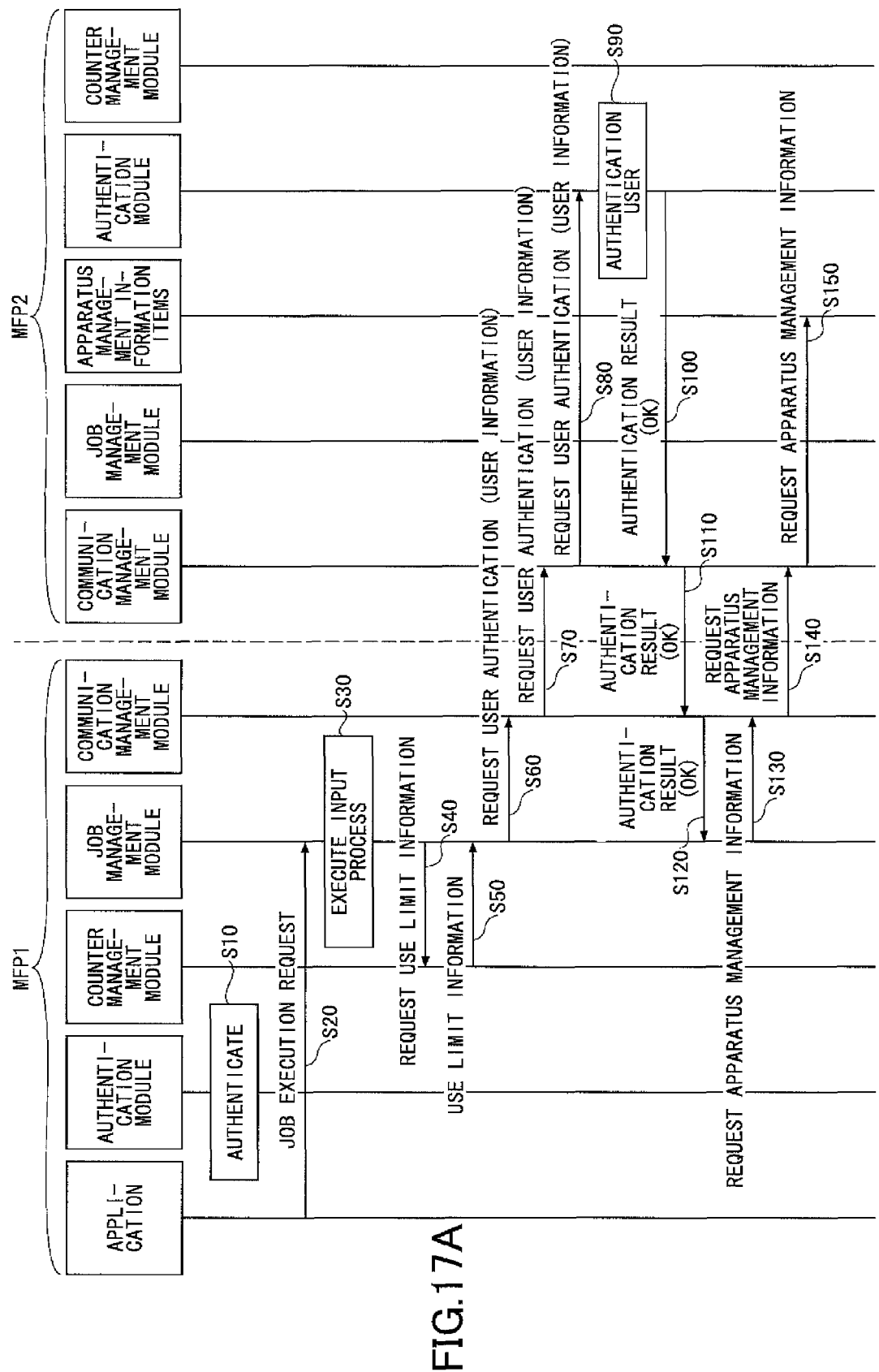
FIGS. 17A through 17C are an example sequential diagram illustrating a process of executing the apparatus cooperative job by the MFP 1 and the MFP 2.
Figure 17B:
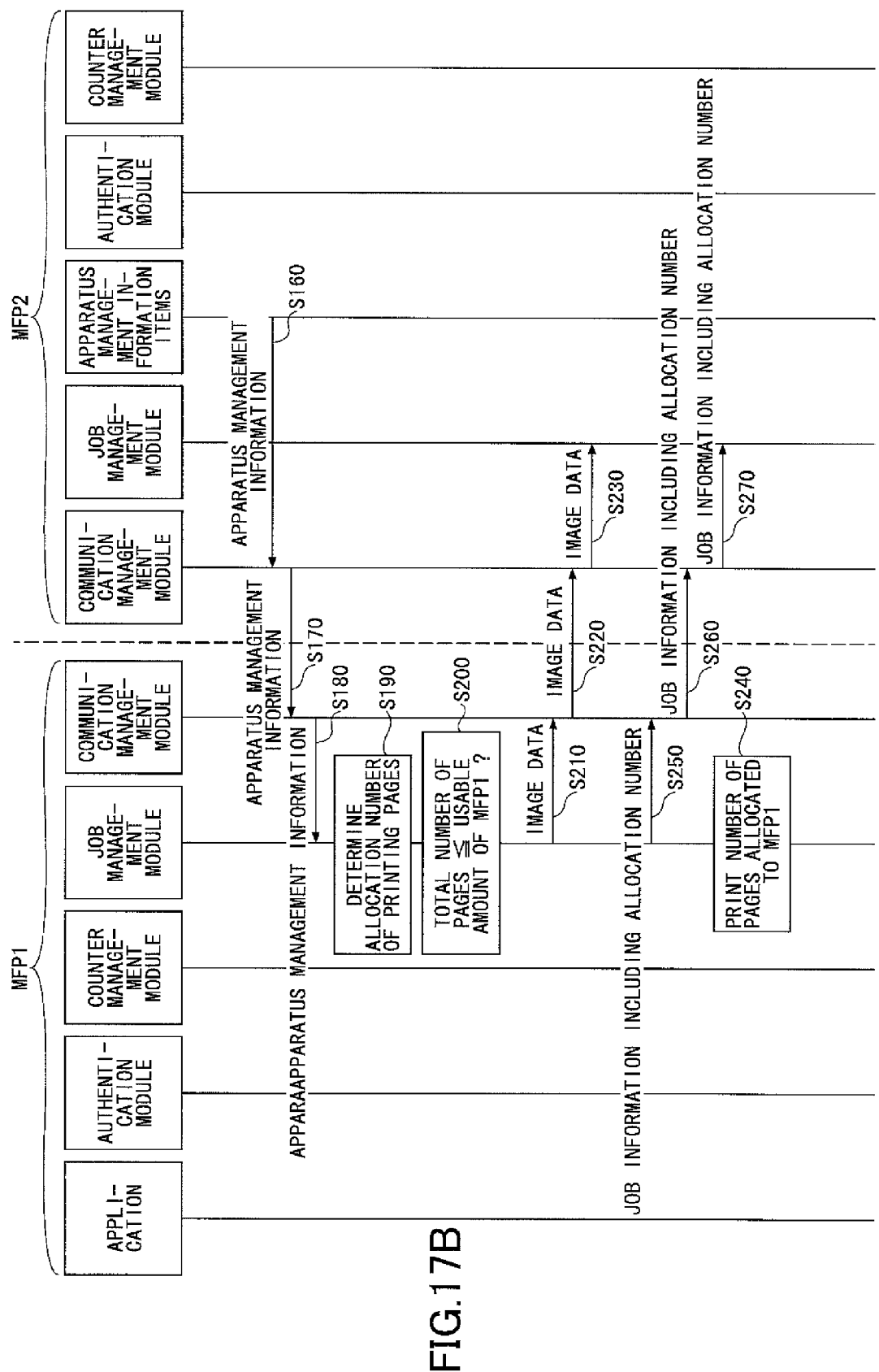
Figure 17C:
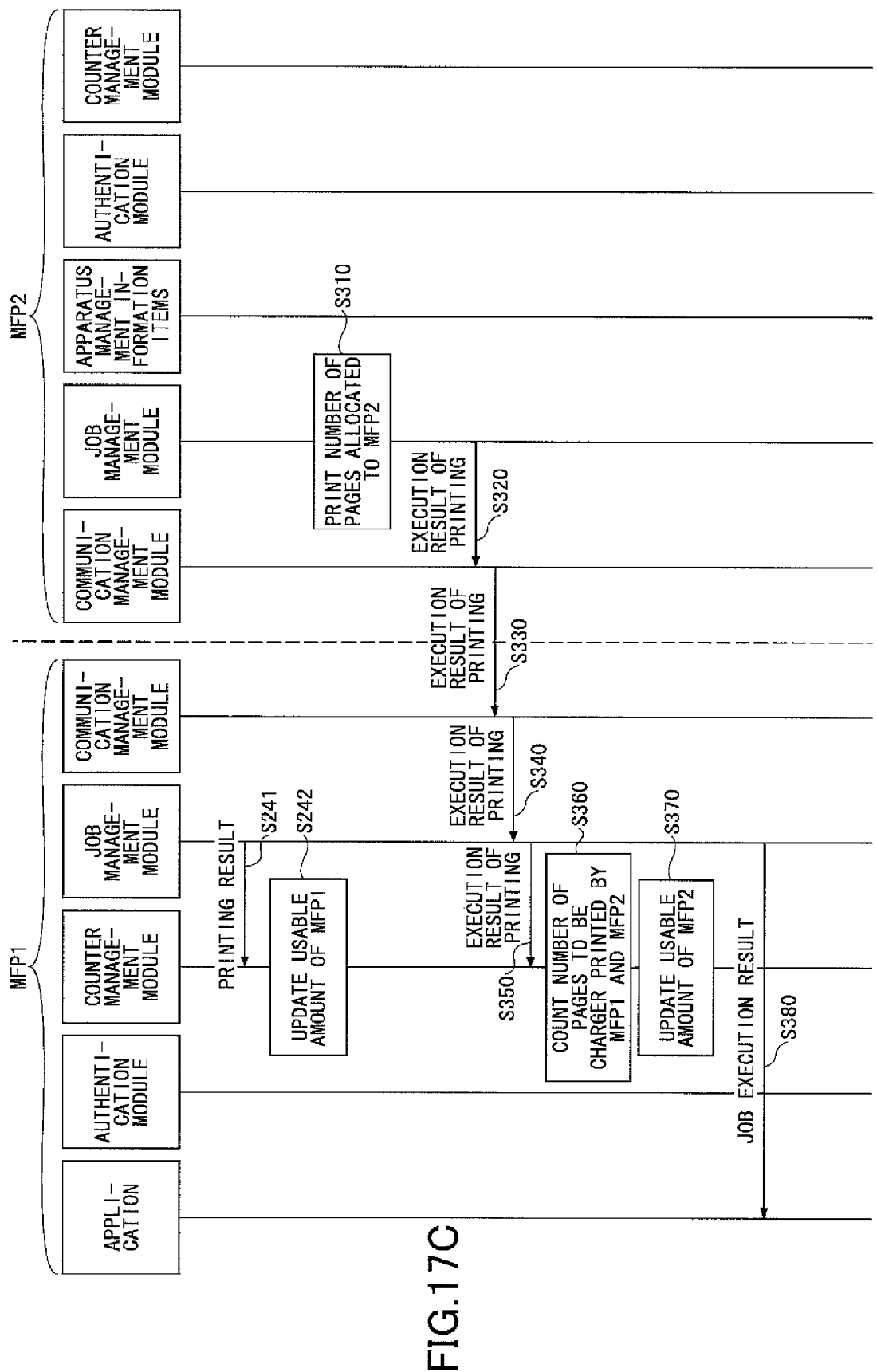

However, the transmission results are printed, on one page. Therefore, the page is counted as the printed page to be charged. Operational procedure when MFP 1 and MFP 2 execute apparatus cooperative job FIGS. 17A through 17C are an example sequential diagram illustrating a procedure when the MFP 1 and the MFP 2 execute the apparatus cooperative job. In the following, a case of the copy application 11 is exemplarily described.

The authentication module 18 authenticates the user Q, and reports the authentication result to the copy application 11 (step S10). When determining that the authentication is successful, the user Q sets an execution condition of job. The copy application 11 transmits a job execution request to execute the apparatus cooperative job to the job management module 17 (step S20).

The job management module 17 cooperates with the resource management module 14 and the engine management module 16 to execute the input process (step S30). By reading a draft and generating the image data, the number of the pages of the image data is clarified. Specifically, in a case of the number of the pages of the draft being 50, double-sided reading, 4-in-1 aggregate printing, one-side printing, and the number of copies being five, the pages per copy is determined as follows: 50×2 (double-sided) ÷4=25 (pages).
Therefore, the number of pages for five copies is determined as follows: 25×5 (copies)=125 (pages).

Next, the job management module 17 sends a request to the counter management module 19 so as to acquire the use limit information items 20 (step S40).

The counter management module 19 reads (extracts) the usable amount from the use limit information items 20, and transmits the usable amount to the job management module 17 (step S50).

Next, the user information transmission section 33 of the job management module 17 sends a request to the communication management module 15 to send a request to the MFP 2 to authenticate the user Q (step S60). The request includes the user information items. The communication management module 15 of the MFP 1 sends a request to the communication management module 15 of the MFP 2 to authenticate the user Q (step S70). The communication management module 15 of the MFP 2 sends a request to the authentication module 18 to authenticate the user Q (step S80).

The authentication module 18 of the MFP 2 authenticates the user Q (step S90). The authentication module 18 reports the authentication result to the job management module 17 of the MFP 1 (steps 100 through 120). Here, it is assumed that the authentication is successful (i.e., the user Q is authenticated).

Next, the job management module 17 of the MFP 1 sends a request to the communication management module 15 to acquire the apparatus management information items 21 from the MFP 2 (step S130). The communication management module 15 communicates with the communication management module 15 of the MFP 2 (step S140). The communication management module 15 of the MFP 2 sends a request to the resource management module 14 so as to acquire the apparatus management information items 21 (step S150). Here, the resource management module 14 is omitted in FIGS. 17A through 17C.

The resource management module 14 reads and transmits the apparatus management information items 21 to the communication management module 15 (step S160). The communication management module 15 of the MFP 2 transmits the apparatus management information items 21 to the communication management module 15 of the MFP 1 (step S170). The communication management module 15 of the MFP 1 transmits the apparatus management information items 21 of the MFP 2 to the job management module 17 (step S180).

Here, when necessary, the job management module 17 determines the number of pages to be allocated to the MFP 1 and the MFP 2. The term "when necessary" refers to the case where the user selects the "common setting" in FIG. 14A. On the other hand, when the "separate setting" is selected, the user sets the number of copies for the MFP 1 and the MFP 2. Therefore, it is not necessary for the user to determine the number of pages to be allocated to the MFP 1 and the MFP 2.

When the number of pages to be allocated are determined, the allocation number determination section 31 of the allocation number determination section 31 determines the number of pages to be allocated to the MFP 2 based on the apparatus management information items 21 of the MFP 1 and the MFP 2 (step S190). To determine the number of the pages to be allocated, there may be the following three method ("a", "b", and "c").

a): number of pages to be printed is determined based on printing speed

The allocation number determination section 31 determines the number of the pages to be allocated to the MFP 2 so that the time period necessary to complete printing is minimized. To minimize the time period to complete the printing, it is desirable for the MFP 1 and the MFP 2 to complete the printing almost at the same time.

From this point of view, the number of the pages to be allocated to the MFP 2 is determined based on the following formula. Here, the printing speed of the MFP 1 is given as "n1" (sheets/minute), the printing speed of the MFP 2 is given as "n2" (sheets/minute), and the total pages to be printed is given as "N". Further, fractional amounts are rounded up.

The number of pages to be allocated to the MFP $2=N\times\{n2/(n1+n2)\}$

In some printings, it may be assumed that N=the number of pages (25 pages as described above). In printing where the number of copies is two or more, it may be assumed that N=the number of copies (5 copies as described above), and "N" is divided by the number of MFPs to be cooperated together.

In this case, the fractional amount is rounded up so that the round-up copy is printed by the MFP having faster printing speed. Namely, for example, 5÷2=2.5. Therefore, two copies are allocated to the MFP 1 and three copies are allocated to the MFP 2 (when the printing speed of the MFP 2 is faster than that of the MFP 1).

Further, in the case where the number of copies is more than one, it is also possible to assume that N=the number of pages (125 pages as described above), and if the number of pages to be allocated to the MFP 2 is not equal to an integral multiple of 25 pages, 25 pages corresponding to one copy may be allocated to the MFP 1 and the MFP 2. Namely, the following calculations are made.

The quotient and the remainder of the calculation (the number pages allocated to MFP 2)÷25 (pages) are obtained. Also, the quotient and the remainder of the calculation (the number pages allocated to MFP 1)÷25 (pages) are obtained. Then, the MFP 2 prints the corresponding quotient number of copies and the corresponding remainder number of pages (e.g., pages having smaller numbers), and the MFP 1 prints the corresponding quotient number of copies and the corresponding remainder number of pages (e.g., pages having large numbers).

As described above, by determining (allocating) the number of pages to be allocated based on the printing speeds, it may become possible to minimize the time period of executing the job.

When the number of the apparatus for printing is three (or more), the number of pages to be allocated to the apparatuses may be determined based on as follows:
the number of pages to be allocated to MFP $1=N\times\{n1/(n1+n2+n3)\}$;
the number of pages to be allocated to MFP $2=N\times\{n2/(n1+n2+n3)\}$; and
the number of pages to be allocated to MFP $3=N\times\{n3/(n1+n2+n3)\}$.

b): number of pages to be printed is determined based on energy consumption

When the energy consumption of the MFP 1 differs from that of the MFP 2 in printing, the total energy consumption is minimized if all the pages are printed by the MFP having lower energy consumption. In this case, however, the pages to be printed are not divided. Therefore, the time period to complete the printing becomes long. However, for example, when it is necessary to switch between (perform) the color printing and monochrome printing, it may minimise the total energy consumption if it is possible to arrange that the color printing is performed by the MFP having lower energy consumption for color printing and the monochrome printing is performed by the MFP having the lower energy consumption for monochrome printing.

For example, if the energy consumption of color printing and monochrome printing of the MFP 1 are 40 W·h and 10 W·h, respectively, and the energy consumption of color printing and monochrome printing of the MFP 2 are 30 W·h and 13 W·h, respectively, it is preferable for the allocation number determination section 31 allocates the copies to be printed in color to the MFP 2 and the copies to be printed in monochrome to the MFP 1.

Further, the number of pages to be allocated to the MFP 2 may be determined based on the printing speeds which are weighted using the energy consumptions. For example, when assuming that the energy consumption in color or monochrome printing of the MFP 1 is "w1" W·h, and the energy consumption in color or monochrome printing of the MFP 2 is "w2" W·h, the printing speeds weighted using the energy consumptions are given as follows:
printing speed of MFP $1=n1\{w1/(w1+w2)\}$; and
printing speed of MFP $2=n2\{w2/(w1+w2)\}$.

c): number of pages to be printed is determined based on equal allocation

When the pages are equally allocated, it may not be necessary to acquire apparatus information of the MFP 1 and the MFP 2, and the total number of the pages is divided by the number of the MFPs.

When the number of pages to be allocated is determined, the use amount determination section 32 of the job management module 17 determines whether the total pages is less than or equal to the usable amount of the MFP 1 (step 2200). The reason of the comparison is to further subtract the number of the pages printed by the MFP 2 from the usable amount of the MFP 1.

When determining that the total pages is less than or equal to the usable amount of the MFP 1 (YES in step S200), the job management module 17 sends a request to the communication management module 15 to transmit the image data (step S210). The communication management module 15 of the MFP 1 transmits the image data to the communication management module 15 of the MFP 2 (step S220). The communication management module 15 of the MFP 2 transmits the image data to the job management module 17 (step S230).

On the other hand, when determining that the total pages is not less than or equal to the usable amount of the MFP 1 (NO in step S200), for example, the job management module 17 displays an error message on the display section 170, prompting to select whether to perform the printing halfway or stop printing.

The job management module 17 of the MFP 1 cooperates with the resource management module 14 and the engine management module 16 to print the allocated (the number of) pages (step S240). The job management module 17 reports the printing results per each output to the counter management module 19 (step S241).

The printed number counting section 34 counts the number of printed pages in accordance with the counting rule of the MFP 1. By using the number of the printed pages, the counter management module 19 updates (reduces) the usable amount of the MFP 1 per each output (step S242).

Before printing or along with the printing, the job management module 17 of the MFP 1 sends a request to the communication management module 15 to transmit the job information items related to the output process along with the number of pages allocated to the MFP 2 (step S250). The communication management module 15 transmits the job information items to the communication management module 15 of the MFP 2 (step S260). The communication management module 15 of the MFP transmits the job information items to the job management module 17 (step S270).

It is not necessary for the job management module 17 of the MFP 2 to determine whether the number of pages allocated to the MFP 2 is less than or equal to the usable amount of the MFP 2. The job management module 17 cooperates with the resource management module 14 and the engine management module 16 to print the allocated number of pages (step S310).

Here, the job management module 17 does not count the pages to be charged. This is because the MFP 1 counts the pages to be charged. Further, the job management module 17 does not reduce (update) the usable amount.

After the completion of the printing of the allocated pages, the job management module 17 of the MFP 2 transmits an execution result of the printing to the communication management module 15 (step S320). The execution result of the printing includes the number of pages by counting one side surface printed by the MFP 2 as one page and the coverage (area). By using the information items, based on the job information items and the counting rules, it becomes possible to count the number of pages to be charged.

The communication management module 15 transmits the execution result of the printing by the MFP 2 to the communication management module 15 of the MFP 1 (step S330). The communication management module 15 of the MFP 1 transmits the execution result of the printing to the job management module 17 (step S340). The job management module 17 transmits the execution result of the printing to the counter management module 19 (step S350).

Then, the printed number counting section 34 of the counter management module 19 collectively counts the number of pages to be charged of the MFP 1 and the number of pages to be charged of the MFP 2 (step S360). Namely, the printed number counting section 34 counts the number of pages to be charged of the MFPs 1 and 2 as the number of pages to be charged of the MFP 1 (based on the billing information items 27 of the MFP 1). By doing this, it becomes possible to integrally manage the number of pages printed by the apparatus cooperative job.

Further, the counter management module 19 of the MFP 1 subtracts the number of pages to be charged of the MFP 2 from the usable amount of the MFP 1 (step S370). By doing this, the MFP 1 subtracts the total number of the pages from the usable amount of the MFP 1.

FIG. 18 illustrates an example of the counted results of the number of pages to be charged. More specifically, FIG. 18 illustrates the counted results of the number of pages to be charged having been printed by the apparatus cooperative job. The number of pages to be charged having been printed by the MFP 1 alone (the number of pages to be charged standalone) is separately counted. In this case, the number of pages to be charged standalone may include or may not include "a1" described below.

For example, the number of pages to be charged, the pages having the coverage greater than or equal to 6% and having A3 or greater sizes, is given as "a' (a1, a2, . . . )". The symbol "a1" refers to the number of pages to be charged of the MFP 1, and the symbol "a2" refers to the number of pages to be charged of the MFP 2. As described, in the apparatus cooperative job, when the MFP 1 and the MFP 2 count the respective numbers of the pages to be charged, it is possible to separately count the number of pages to be charged of the MFP 1 and she MFP 2.

Further, by summing up the values of "a1", "a2", . . . , it becomes possible to clarify the total number of pages to be charged of the apparatus cooperation system of the apparatus cooperative job executed by the MFP 1.

After the number of the pages of the MFP 2 is counted, the job management module 17 of the MFP 1 transmits the execution result to the copy application 11 (step S380).

As described above, in the apparatus cooperation system 200, the MFP 1 counts and sets the number of pages printed by the MFP 1 as a target to be charged, it becomes possible to integrally manage the number of pages printed in the apparatus cooperative job.

In the above description, a case of the copy application 11 is exemplarily described. In the FAX application 13, the FAX transmission result is printed in one page. Therefore, the MFP 1 and the MFP 2 count the respective number of pages. However, similar to the above, the MFP 1 may count the number of pages of the MFP 2. Further, the MFP 1 and the MFP 2 count the respective use amounts of the FAX transmissions.

A case where MFP 1 counts the number of pages of MFP 2 but the use amount is counted by the MFP 2

In FIGS. 17A through 17C, the MFP 1 counts the number of pages printed by the MFP 2, so as to counts the number of pages to be charged and the use amount. However, the use amount may be charged by the MFP 2. By doing this, the use amount of the MFP 1 is decreased by the number of pages printed by the MFP 1. Therefore, it may become possible to reduce the possibility to decrease the usable amount for the user Q to zero in the MFP 1.

Figure 19A:
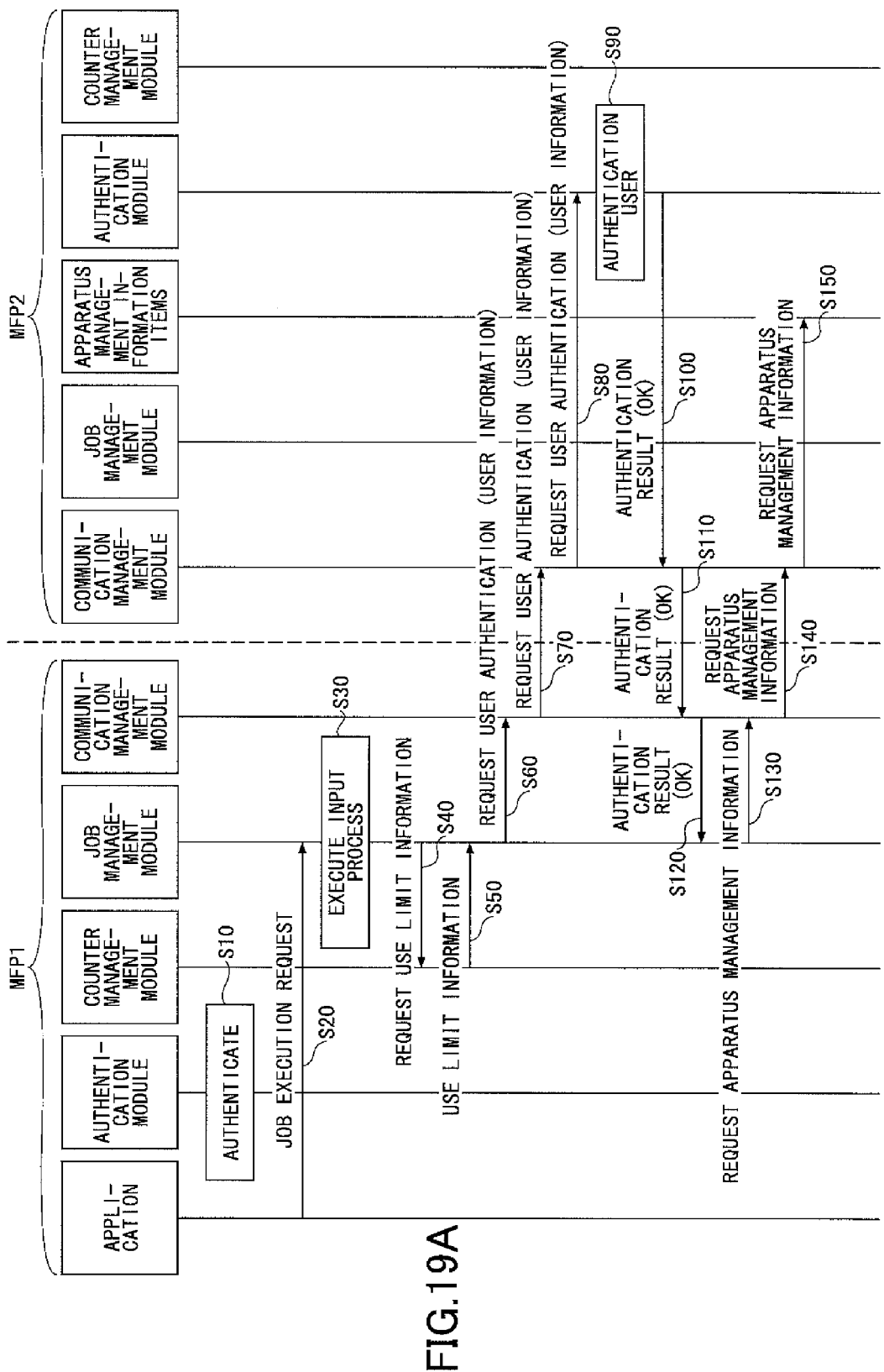
FIGS. 19A through 19C are another example sequential diagram illustrating the process of executing the apparatus cooperative job by the MFP 1 and the MFP 2.
Figure 19B:
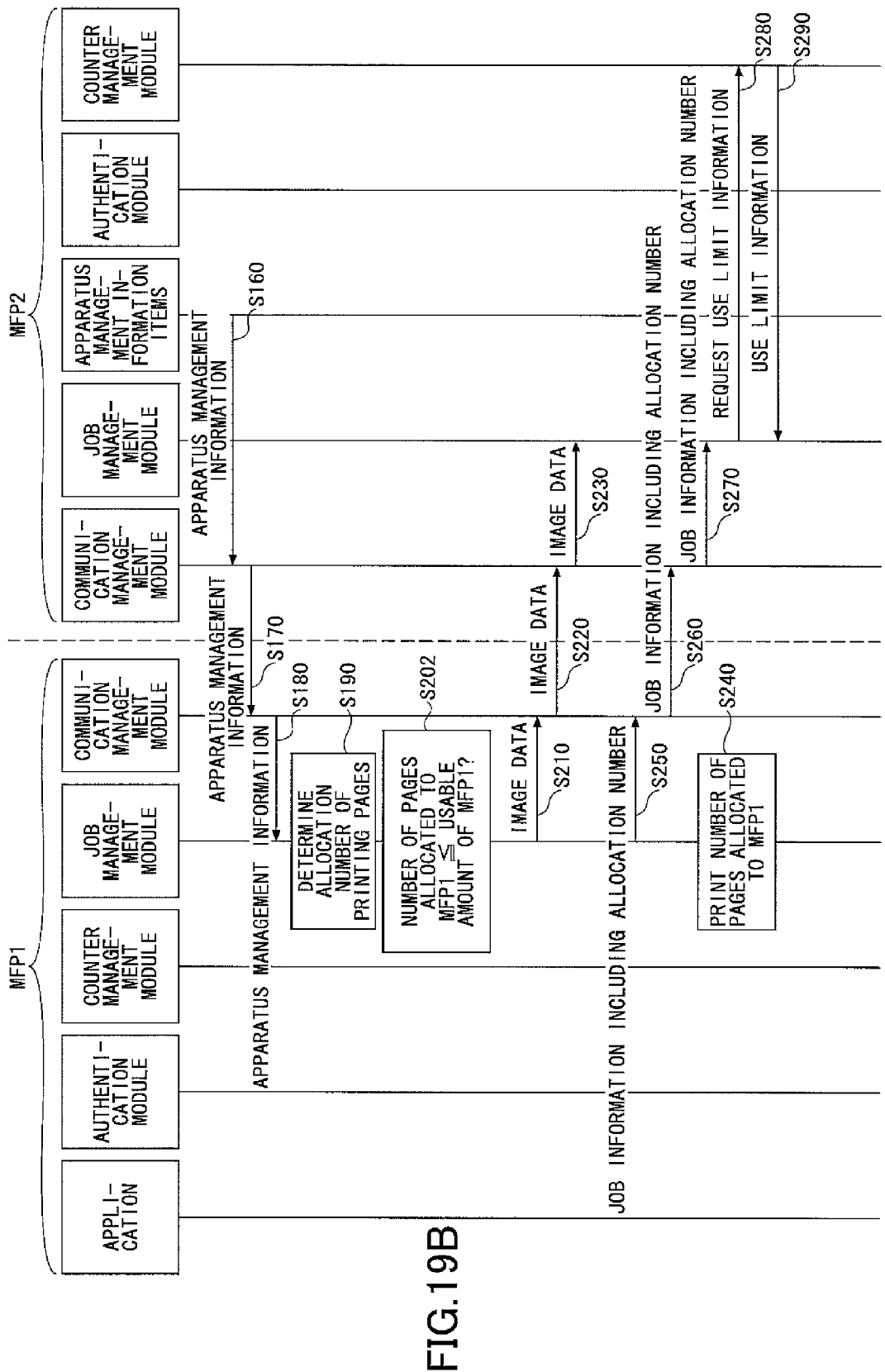
Figure 19C:
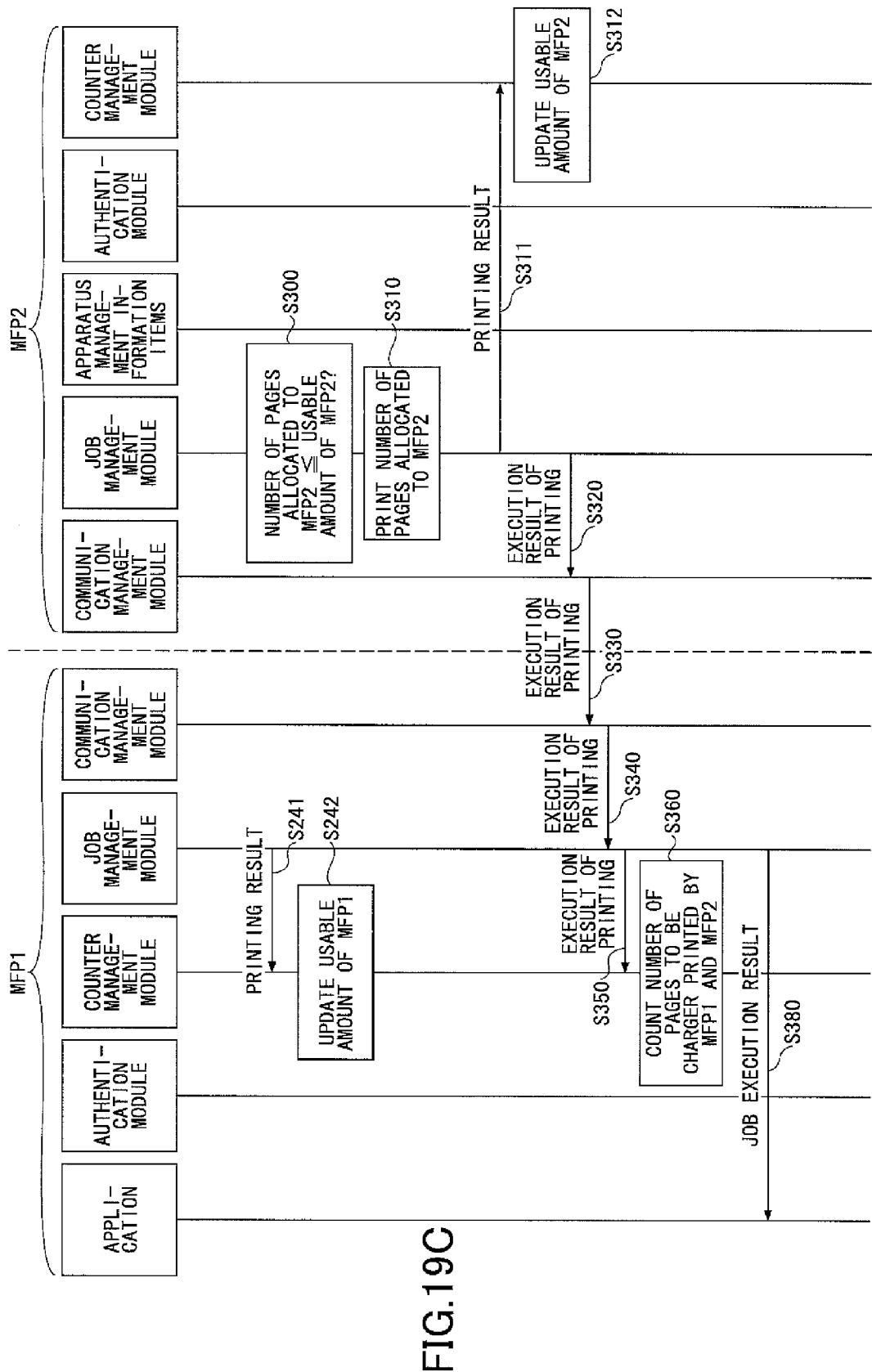

FIGS. 19A through 19C are a sequence diagram illustrating an example process of executing the apparatus cooperative job by the MFP 1 and the MFP 2. In FIGS. 19A through 19C, the process until step S190 is similar to that in FIGS. 17A through 17C.

After the allocated numbers of pages are determined, the use amount determination section 32 of the job management module 17 determines whether the allocated number of pages allocated to the MFP 1 is less than or equal to the usable amount of the MFP 1 (step S202).

When determining that the allocated number of pages allocated to the MFP 1 is less than or equal to the usable amount of the MTP 1, the job management module 17 sends a request to the communication management module 15 to transmit the image data (step S210). The communication management module 15 transmits the image data to the communication management module 15 of the MFP 2 (step S220). The communication management module 15 of the MFP 2 transmits the image data to the job management module 17 (step S230).

Before or during the printing, the job management module 17 of the MFP 1 sends a request to the communication management module 15 to add (include) the number of allocated pages allocated to the MFP 2 to the information item of the output process in the job information items and then transmit the job information items (step S250).

The communication management module 15 transmits the job information items to the communication management module 15 of the MFP 2 (step S260). The communication management module 15 of the MFP 2 transmits the job information items to the job management module 17 (step S270).

The job management module 17 of the MFP 2 sends a request to the counter management module 19 so acquire the use limit information items 20 (step S280). The counter management module 19 reads the usable amount in the use limit information items 20, and transmits the usable amount to the job management module 17 (step S290).

The use amount determination section 32 of the job management module 17 of the MFP 2 determines whether the allocated number of pages allocated to the MFP 2 is less than or equal to the usable amount of the MFP 2 (step S300).

When determining that the allocated number of pages allocated to the MFP 2 is less than or equal to the usable amount of the MFP 2, the job management module 17 cooperates with the resource management module 14 and the engine management module 16 to print the allocated number of pages (step S310).

The job management module 17 of the MFP 2 reports the printing results per each output to the counter management module 19 (step S311). The counter management module 19 updates (reduces) the usable amount of the MFP 2 per each output based on the billing information items 27 of the MFP 2 (step S312).

Similar to the example of FIGS. 17A through 17C, the printed number counting section 34 of the job management module 17 of the MFP 2 does not count the number of pages to be charged.

When the printing of the allocated number of pages is completed, the job management module 17 of the MFP 2 transmits the execution result of the printing to the communication management module 15 (step S320). The execution result of the printing includes the number of printed pages. The communication management module 15 transmits the execution result of the printing to the communication management module 15 of the MFP 1 (step S330).

The communication management module 15 of the MFP 1 transmits the execution result of the printing to the job management module 17 (step S340). The job management module 17 transmits the execution result of the printing to the counter management module 19 (step S350).

Then, the printed number counting section 34 of the counter management module 19 collectively counts the number of pages to be charged of the MFP 1 and the number of pages to be charged of the MFP 2 (step S360). Namely, the printed number counting section 34 counts the number of pages to be charged of the MFPs 1 and 2 as the number of pages to be charged of the MFP 1 (based on the billing information items 27 of the MFP 1). By doing this, it becomes possible to integrally manage the number of pages printed by the apparatus cooperative job.

After counting the number of pages of the MFP 2, the job management module 17 of the MFP 1 transmits the execution result of the job to the copy application 11 (step S380).

As described above, the apparatus cooperation system 200 of FIGS. 19A through 19C may integrally manage the number of pages printed in the apparatus cooperative job. Further, the number of pages printed by the MFP 2 is subtracted from the usable amount of the MFP 2. Therefore, it becomes possible to reduce the possibility to decrease the usable amount of the MFP 1 to zero.

Embodiment 2

In the above Embodiment 1, the MFP 1 counts the number of pages to be charged of the MPF 2 as well. However, if the billing information items 27 of the MFP 1 differs from those of the MFP 2, the amount to be paid by the client may differ depending on whether the MFP 1 or the MFP 2 counts the number of pages to be charged. For example, if the printing cost of she MFP 2 is less expensive than that of the MFP 1, it is unbeneficial to the client.

To resolve the problem, in this embodiment, an apparatus cooperation system is described capable of preventing the apparatus cooperative job when the billing information items 27 of the MFP 1 differs from those of the MFP 2. By doing this, it becomes possible to prevent the payment unintended for the client by preventing the MFP 1 from counting all the number of pages to be charged.

Figure 20A:
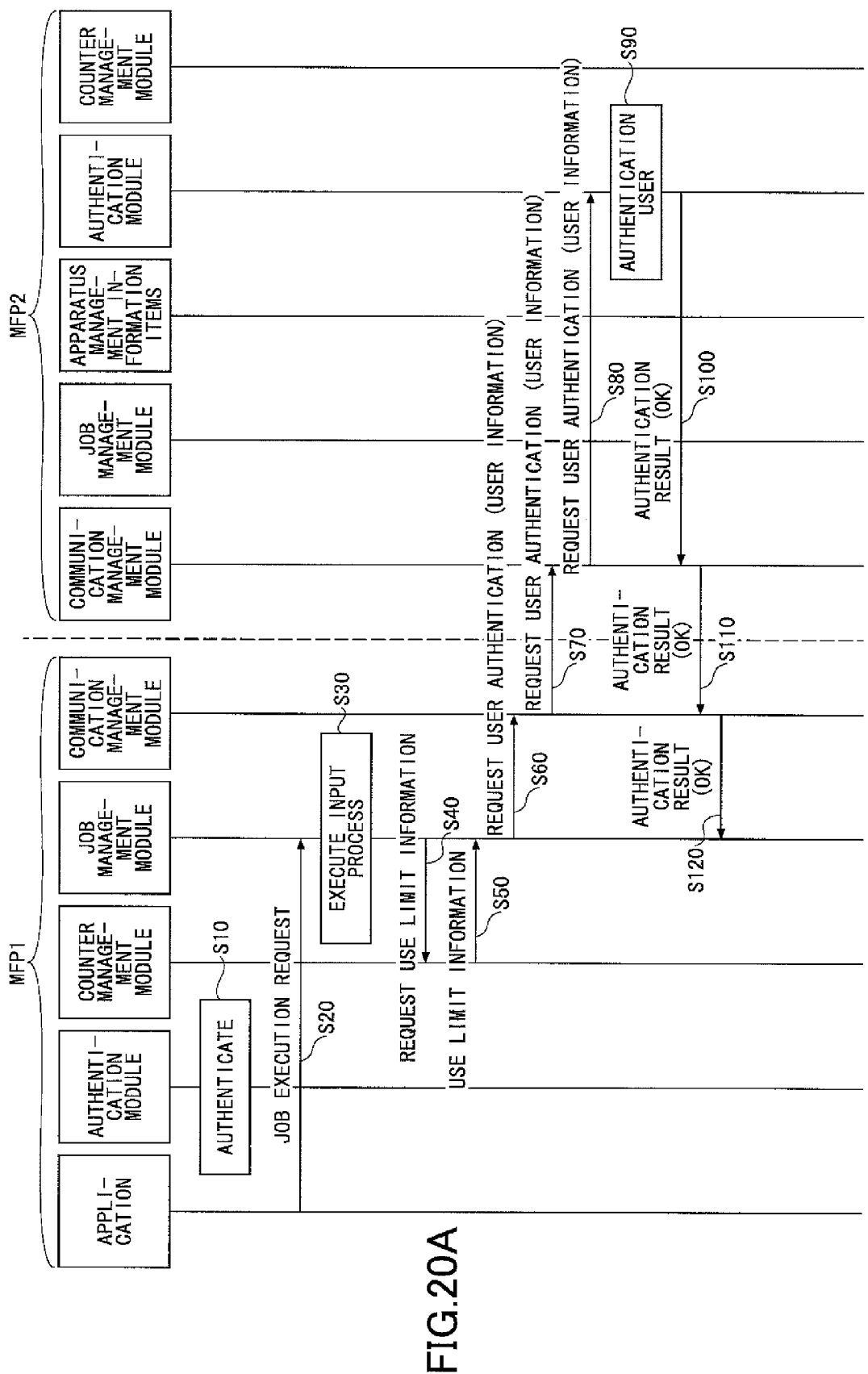
FIGS. 20A and 20B are still another example sequential diagram illustrating the process of executing the apparatus cooperative job by the MFP 1 and the MFP 2.
Figure 20B:
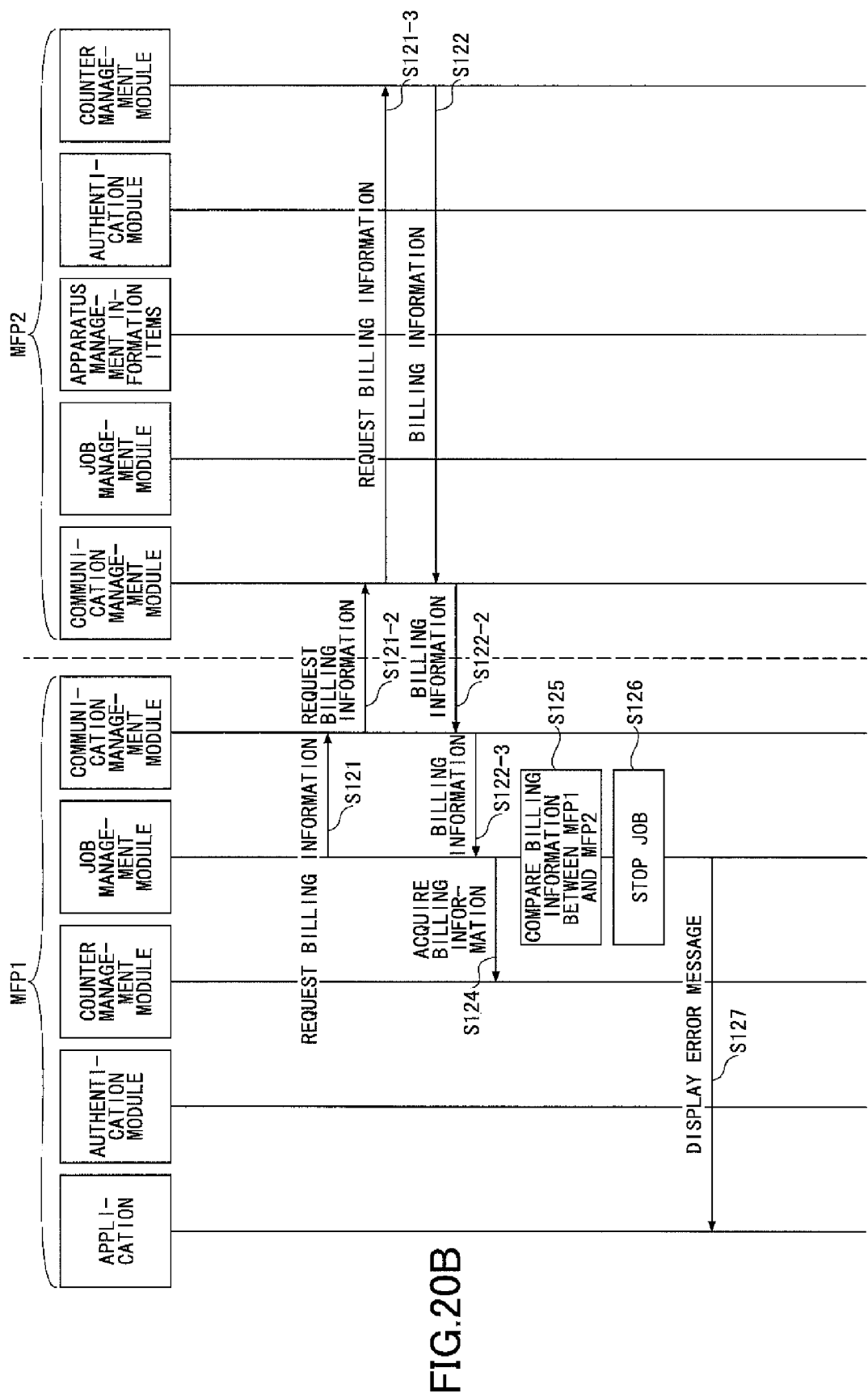

FIGS. 20A and 20B are a sequence diagram illustrating an example process of executing the apparatus cooperative job by the MFP 1 and the MFP 2. In FIGS. 20A and 20B, the process until step S120 is similar to that in FIGS. 17A through 17C.

The authentication module 18 of the MFP 2 authenticates the user Q (step S90). When determining that the authentication is not successful, the authentication module 18 transmits an NG authentication result (indicating unsuccessful authentication) to the job management module 17 of the MFP 1 (steps S100 through S120).

When determining that the authentication is successful, the job management module 17 sends a request to the communication management module 15 to acquire the billing information items 27 from the MFP 2 (step S121). The communication management module 15 communicates with the communication management module 15 of the MFP 2 (step S121-2). The communication management module 15 of the MFP 2 sends a request to the counter management module 19 so as to acquire the billing information items 27 (step S121-3).

The counter management module 19 reads and transmits the billing information items 27 to the communication management module 15 (step S122). The communication management module 15 of the MFP 2 transmits the billing information items 27 to the communication management module 15 of the MFP 1 (step S122-2). The communication management module 15 of the MFP 1 transmits the billing information items 27 of the MFP 2 to the job management module 17 (step S122-3).

Further, the job management module 17 acquires the billing information items 27 of the MFP 1 from the counter management module 19 (step S124).

The job management module 17 compares the billing information items 27 of the MFP 1 with the billing information items 27 of the MFP 2, and determines whether those billing information items 27 correspond to each other (step S125). As described above the billing information items 27 may include the counting methods and the contracted unit prices. However, generally, the contracted unit prices may not be stored in the MFPs. In such a case, the job management module 17 may compare the billing information item 27 of the MFP 1 with the billing information item 27 of the MFP 1, the billing information item 27 being commonly included in both the MFP 1 and the MFP 2

For example, specifically, even when the counting method of the MFP 1 is compared with the counting method of the MFP 2 alone, if the counting methods are different from each other, the charges to be paid by the client may differ. Similarly, in a case where both the MFP 1 and the MFP 2 includes the respective contracted unit prices, even when the same counting method is used in the MFP 1 and the MFP 2, if the contracted unit prices of the MFP 1 differs from that of the MFP 2, the charge to be paid by the client may also differ.

Therefore, if the MFP 1 and the MFP 2 include respective contracted unit prices, it is desired to compare those contracted unit prices.

Even a part of the billing information item 27 differs between the MFP 1 and the MFP 2, the charges no be paid by the client may differ. Therefore, the job management module 17 compares the billing information items 27 of the MFP 1 with the billing information items 27 of the MFP 1 to determine whether the data of billing information items 27 of the MFP 1 are completely identical to those of the MFP 2. In a case the number of the MFPs that cooperate together to perform the apparatus cooperative job is three or more it is determined whether the data of the billing information items 27 are the same as each other among those three or more MFPs.

When determining a part of the billing information item 27 differs between the MFP 1 and the MFP 2, the job management module 17 stops the apparatus cooperative job (step S126). Further, the job management module 17 causes the display section 170 to display an error message (step S127). For example, the message tells that "job is terminated due to different billing information between cooperative apparatuses". The user Q sees the message, so that the user Q may select the MFP 3 or execute the job with only MFP 1.

In the apparatus cooperation system 200 according to this embodiment, it may become possible to prevent undesired charges for the user by stopping the apparatus cooperative job when determining that the billing information item 27 is different between the MFP 1 and the MFP 2.

Embodiment 3

In the above Embodiment 2, the apparatus cooperative job is stopped when the billing information item 27 is different between the MFP 1 and the MFP 2. However, there may be a case where the user would like to executed the apparatus cooperative job even when the billing information item 27 is different between the MFP 1 and the MFP 2. Namely, the user may choose to execute the apparatus cooperative job so as to place a higher priority on printing even when the cost becomes higher to some extent.

Figure 21A:
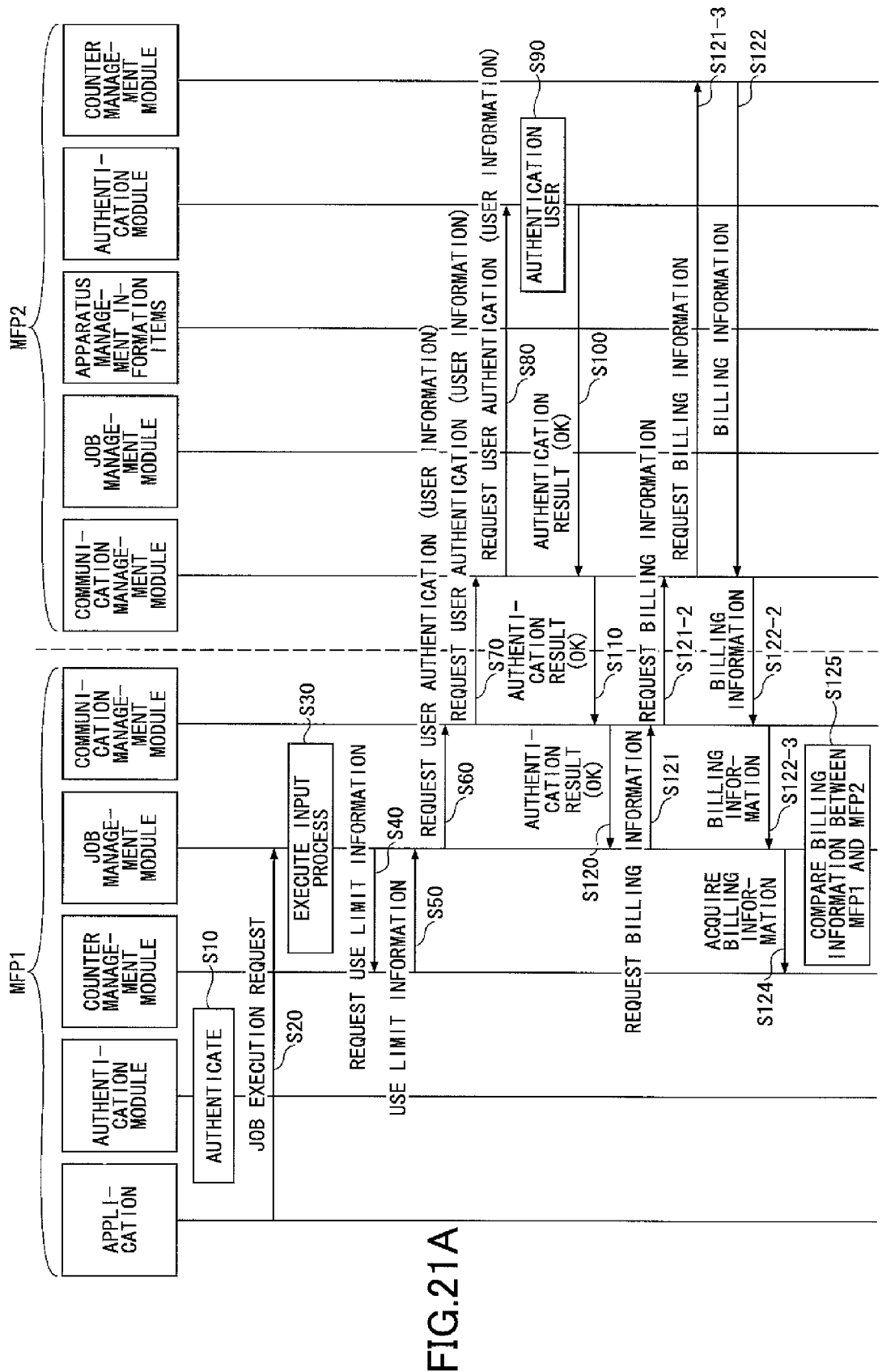
FIGS. 21A through 21C are still another example sequential diagram illustrating the process of executing the apparatus cooperative job by the MFP 1 and the MFP 2.
Figure 21B:
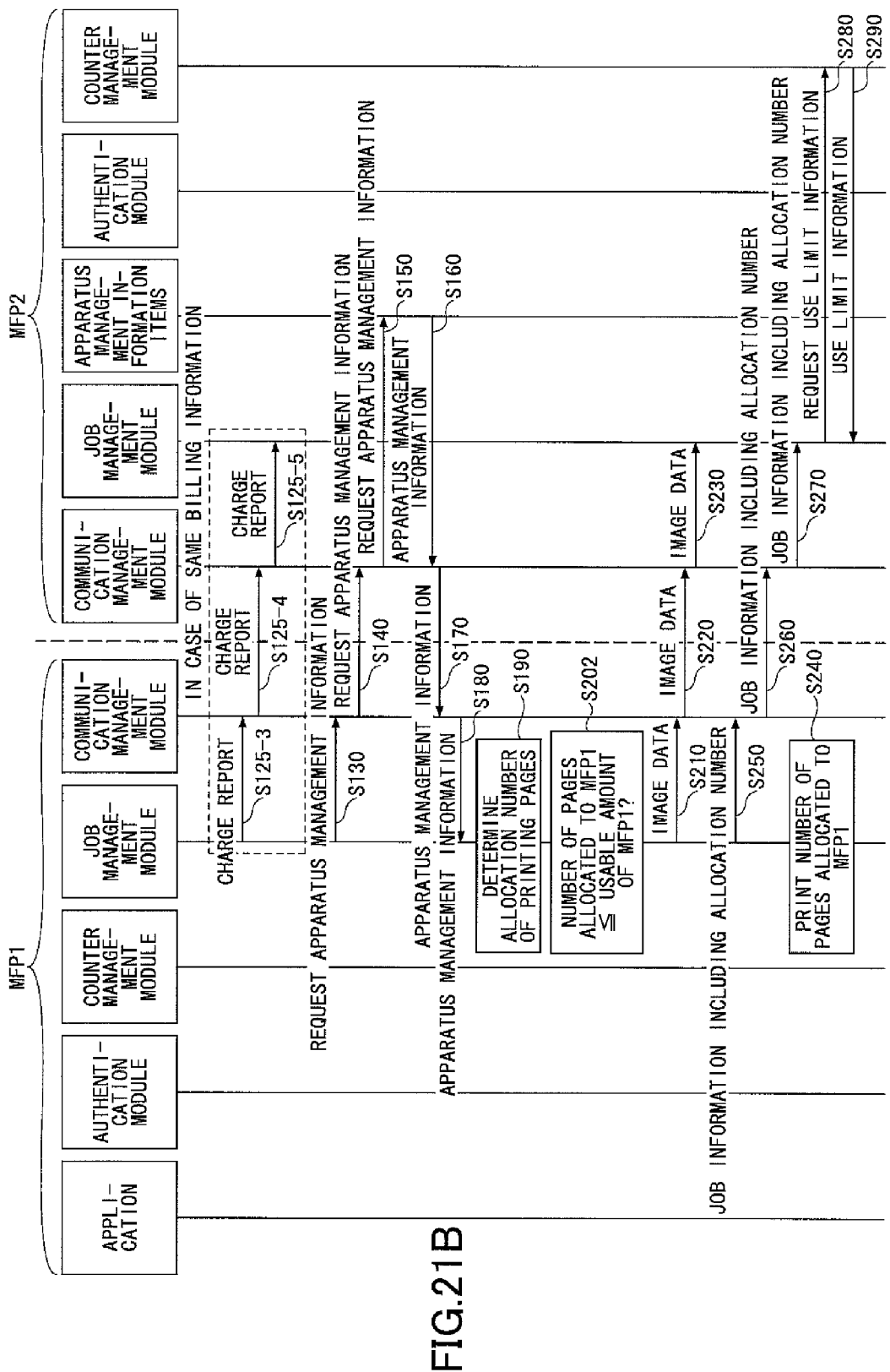
Figure 21C:
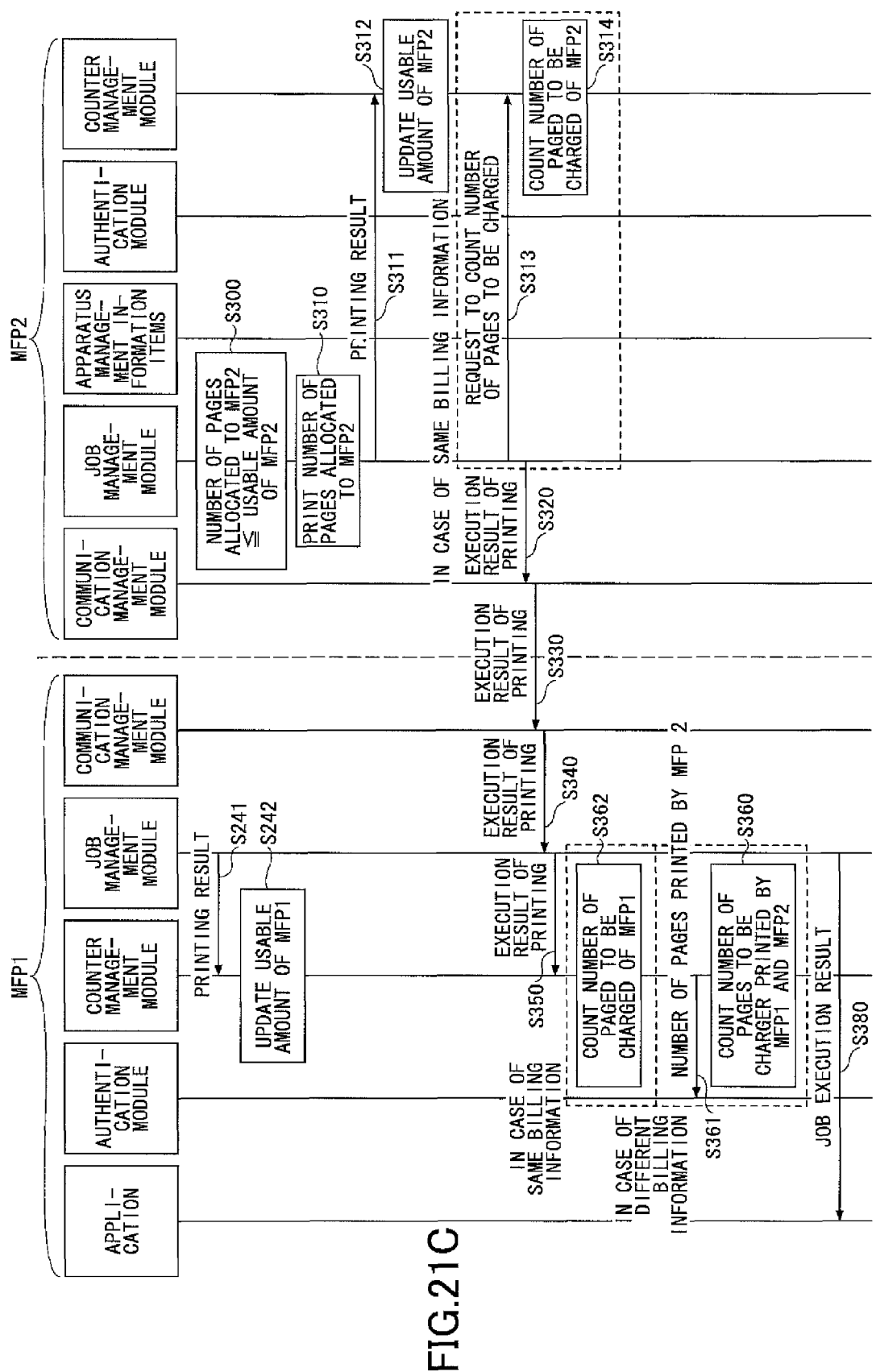

FIGS. 21A through 21C are a sequence diagram illustrating an example process of executing the apparatus cooperative job by the MFP 1 and the MFP 2. In FIGS. 21A through 21C, the process until step S125 is similar to that in FIGS. 19A through 19C. The reason why the process in FIGS. 21A through 21C is similar to that in FIGS. 19A through 19C rather than in FIGS. 17A through 17C is that it is preferable to update the usable amount of the MFP 2 rather than to count the number of pages to be charged of the MFP 2. Similar to FIGS. 17A through 17C, the MFP 1 may subtract the use amount of the MFP 2 from the usable amount of the MFP 1.

When determining that the data of the billing information items 27 of the MFP 1 are the same as those of the MFP 2, the job management module 17 in this embodiment transmits a charge report to the MFP 2. The "charge report" herein refers to a report to the MFP 2 requesting to count the number of pages printed by the MFP 2 as the number of pages to be charged. On the other hand, when determining that the data of the billing information items 27 of the MFP 1 are not the same as those of the MFP 2, the job management module 17 does not transmit the charge report to the MFP 2.

Therefore, the job management module 17 of the MFP 1 transmits the charge report to the communication management module 15 (step S125-3). The communication management module 15 communicates with the communication management module 15 of the MFP 2 (step S125-4). The communication management module 15 of the MFP 2 transmits the charge report to the job management module 17 (step S125-5).

The process of printing in FIGS. 21A through 21C is similar to that in FIGS. 17A through 17C. Namely, regardless of whether the data of the billing information items 27 of the MFP 1 are the same as those of the MFP 2, the MFP 1 and the MFP 2 prints the respective allocated number of pages (steps S130 though S300).

The job management module 17 of the MFP 2 reports the printing results per each output in step S310 to the counter management module 19 (step S311). The counter management module 19 updates the usable amount of the MFP 2 based on the billing information items 27 of the MFP 2 (step S312).

Further, only when the charge report is received from the MFP 1, the job management module 17 of the MFP 2 requests the counter management module 19 to count the number of pages to be charged (step S313). The printed number counting section 34 of the counter management module 19 counts and stores the number of pages to be charged based on the number of pages printed by the MFP 2 in accordance with the job management module 17 of the MFP 2.

The usable amount is calculated by subtracting only the number of pages to be charged. Therefore, the process in S312 and the process in S314 may be performed in the same step.

After the printing of the allocated number of pages is completed, the job management module 17 of the MFP 2 transmits the execution result of the printing to the communication management module 15 (step S320). The execution result of die printing includes the number of pages by counting one side surface printed by the MFP 2 as one page and the coverage (area).

The communication management module 15 transmits the execution result of the printing to the communication management module 15 of the MFP 1 (step S330). The communication management module 15 of the MFP 1 transmits the execution result of the printing to the job management module 17 (step S340). The job management module 17 transmits the execution result of the printing to the counter management module 19 (step S350).

Then, when determining that the data of the billing information items 27 of the MFP 1 are the same as those of the MFP 2, the printed number counting section 34 of the counter management module 19 counts only the number of pages to be charged of the MFP 1 (step S362).

Further, when determining that the data of the billing information items 27 of the MFP 1 are not the same as those of she MFP 2, the printed number counting section 34 of the counter management module 19 collectively counts the number of pages to be charged of the MFP 1 and the number of pages to be charged of the MFP 2 (step S360).

The billing information items 27 of the MFP 1 transmits the execution result of the oh to the copy application 11 (step S380).

FIGS. 22A through 22C illustrate examples of the number of pages to be charged. FIG. 22A illustrates an example of the number of the pages to be charged of the MFP 1 when the data of the billing information items 27 of the MFP 1 are the same as those of the MFP 2. When determining that the data of the billing information items 27 of the MFP 1 are the same as those of the MFP 2, the MFP 1 does not count the number of pages to be charged of the MFP 2. Therefore, the number of the pages to be charged with respect to "a2" though "h2" are zero. Therefore, a'=a1, . . . , h'=h1.

FIG. 22B illustrates an example of the number of the pages to be charged of the MFP 2 when the data of the billing information items 27 of the MFP 1 are the same as those of the MFP 2. When determining that the data of the billing information items 27 of the MFP 1 are the same as those of the MFP 2, the MFP 2 counts the number of pages to be charged of the MFP 2. Therefore, the number of the pages to be charged with respect to "a2" though "h2" are stored.

FIG. 22C illustrates an example of the number of the pages to be charged of the MFP 1 when the data of the billing information items 27 of the MFP 1 are not the same as those of the MFP 2. When determining that the data of the billing information items 27 of the MFP 1 are not the same as those of the MFP 2, the MFP 1 collectively counts the number of pages to be charged of the MFP 1 and the number of pages to be charged of the MFP 2.

Therefore, the number of the pages to be charged with respect to "a1", "a2" and the like are stored. The number of the pages to be charged in this case is the same as that in the above embodiment 1. Further, when determining that the data of the billing information items 27 of the MFP 1 are not the same as those of the MFP 2, the MFP 2 does not count the number of pages to be charged.

As described above, when determining that the data of the billing information items 27 of the MFP 1 are the same as those of the MFP 2, the MFP 1 and the MFP 2 count the respective number of the pages to be charged. On the other hand, when determining that the data of the billing information items 27 of the MFP 1 are not the same as those of the MFP 2, the MFP 1 collectively count the number of the pages to be charged of the MFP 1 and the number of the pages to be charged of the MFP 2.

Therefore, in the latter case, it becomes possible to execute printing without stopping the apparatus cooperative job. Also, it become possible to integrally manage the number of pages to be charged.

Embodiment 4

In the case where there is a difference between the billing information items 27 of the MFP 1 and the MFP 2, the apparatus cooperative job is stopped in embodiment 2, and the MFP 1 collectively counts the number of the pages to be charged of both the MFP 1 and the MFP 2. However, in this case (i.e., when there is a difference between the billing information items 27 of the MFP 1 and the MFP 2), it may be convenient if the user may select the apparatus (MFP) that counts the number of the pages to be charged. This is because the user may select the MFP to count where the cost of the printing is less expensive.

Figure 23A:
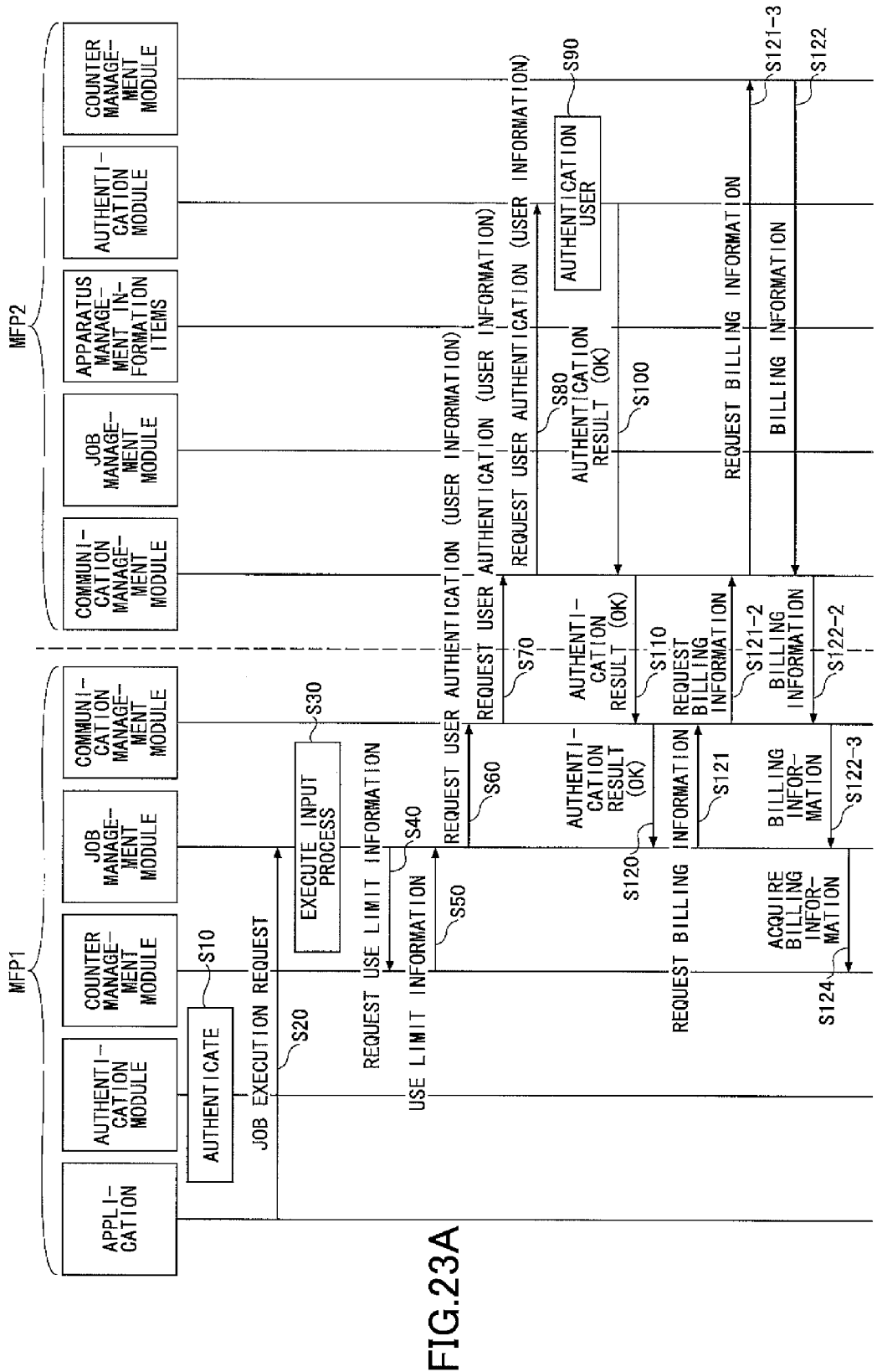
FIGS. 23A through 23C are still another example sequential diagram illustrating the process of executing the apparatus cooperative job by the MFP 1 and the MFP 2.
Figure 23B:
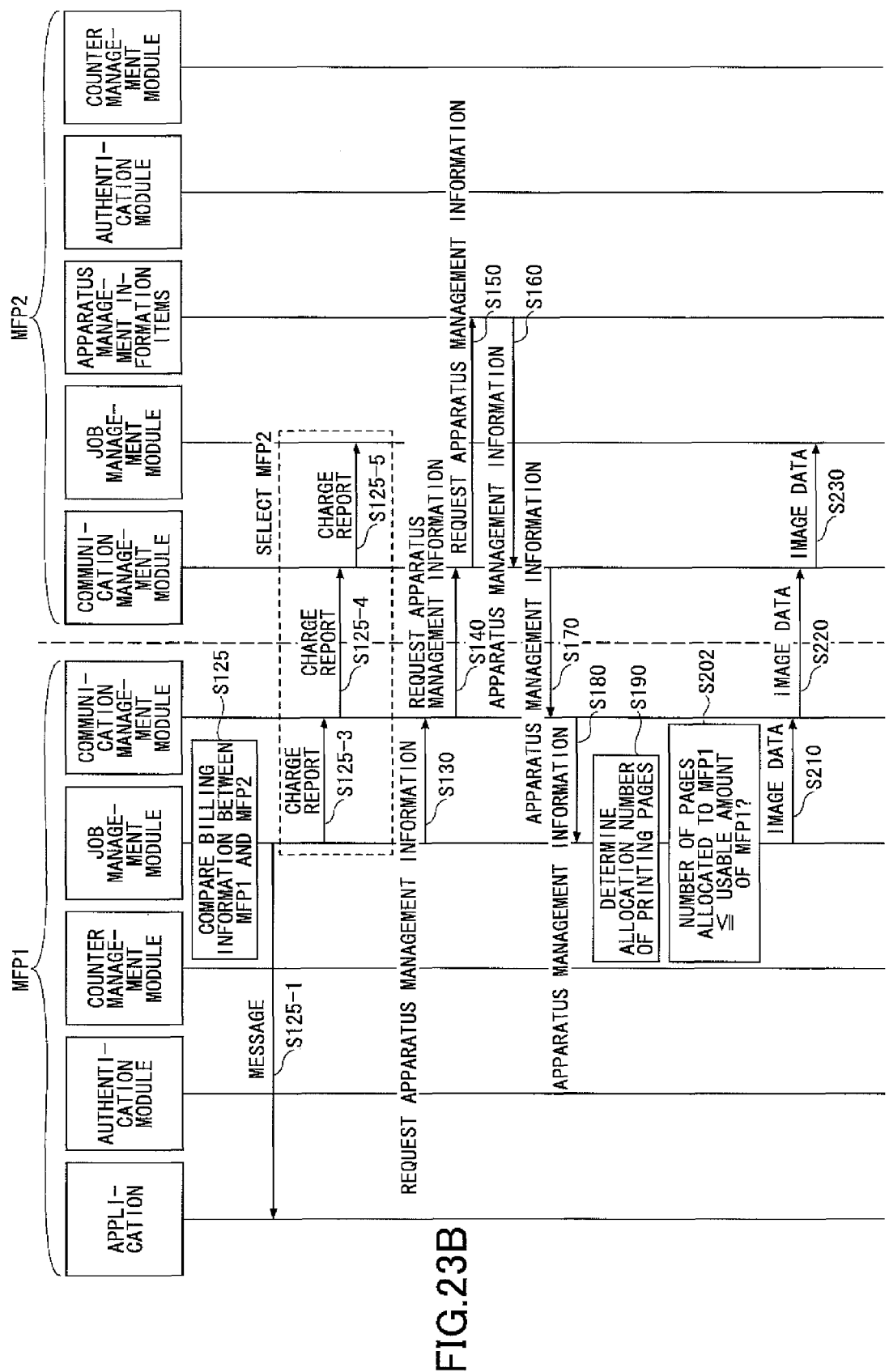
Figure 23C:
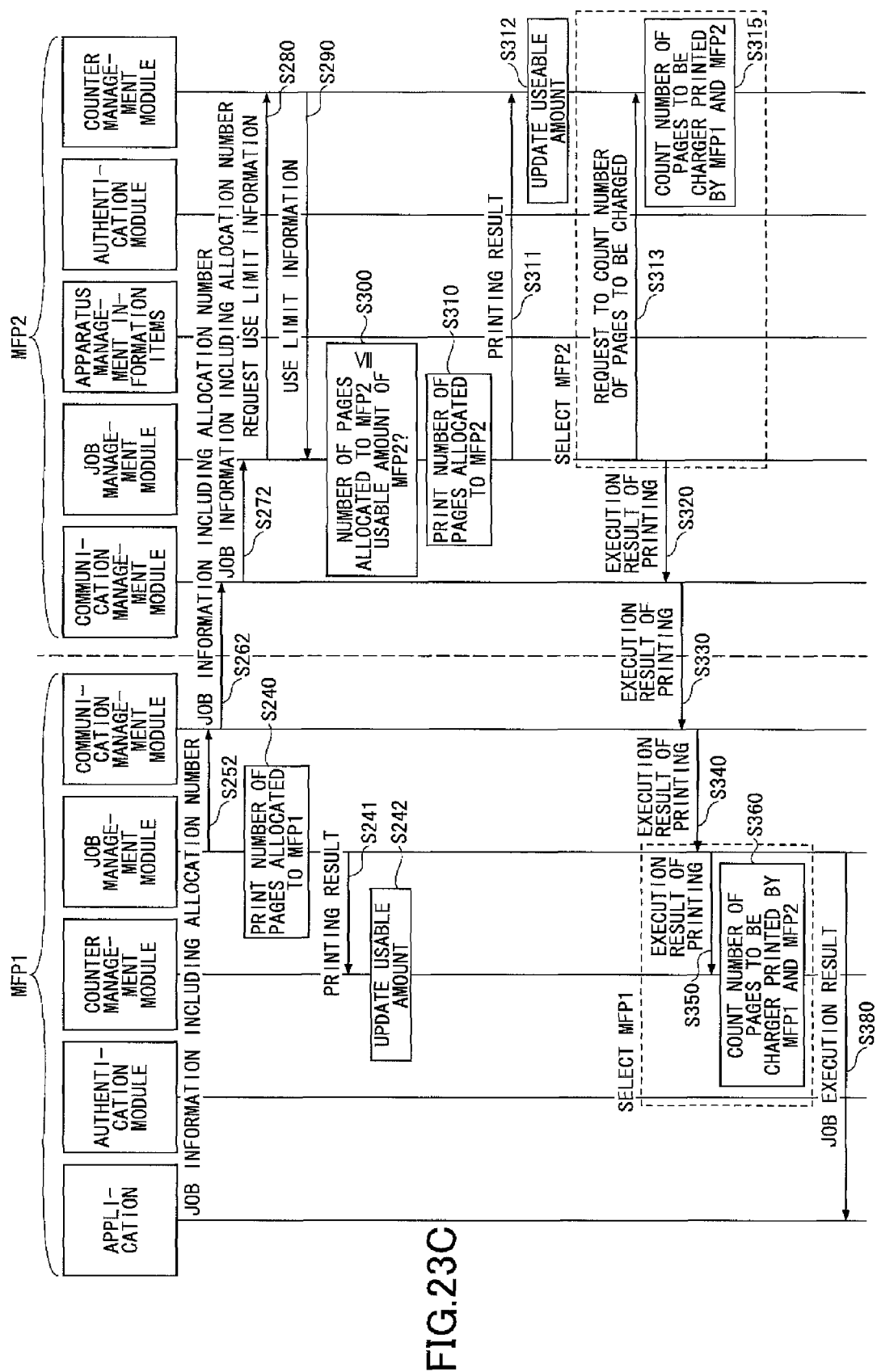

FIGS. 23A through 23C are a sequence diagram illustrating an example process of executing the apparatus cooperative job by the MFP 1 and the MFP 2. The process until step S125 in FIGS. 23A through 23C is similar to that in FIGS. 21A through 21C.

When the billing information items 27 are different from each other between, the job management module 17 in this embodiment prompts a user to select one MFP that collectively counts the number of pages to be charged (step S125.1).

Figure 24:
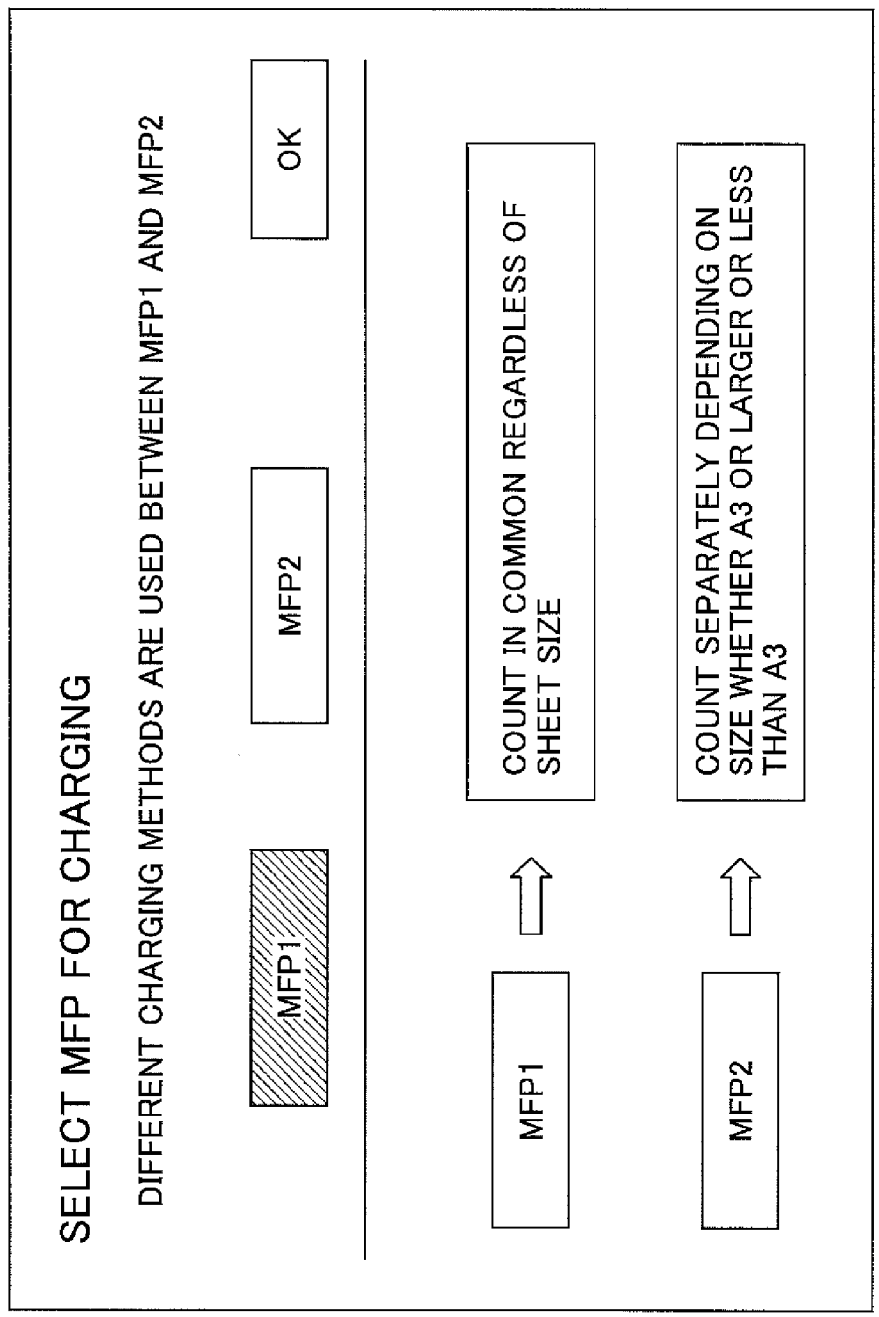
FIG. 24 is a drawing illustrating an example billing apparatus selection screen displayed on the display section.

FIG. 24 illustrates an example of a billing apparatus screen to be displayed on the display section 170. In the billing apparatus screen, for example, the following messages "select MFP to charge" and "counting (charging) methods differ between MFP 1 and MFP 2" are displayed. Further, in the billing apparatus screen, a difference in the billing information items 27 between the MFP 1 and the MFP 2 is displayed. For example, the MFP 1 commonly counts the number of pages to be charged regardless of the sizes of the sheet, and the MFP 2 separately counts the number of the pages to be charged depending on whether the size of the sheet is greater than A3 size or less than or equal to the A3 size.

When the user sees the description displayed on the screen and if the user selects the sheet having the A3 size as the recording medium, the user may select MFP 1 which is less expensive when using the A3-size sheet in printing. When the user presses (selects) either "MFP 1" or "MFP 2" button, the display of the selected button is reversed. Then to confirm the selection, the user presses the "OK" button. The job management module 17 accepts the selection result of the user.

The job management module 17 stores the selection result when the user selects the MFP 1. On the other hand, when the user selects the MFP 2, the job management module 17 transmits the charge report to the MFP 2. To that end, the job management module 17 of the MFP 1 transmits the charge report to the communication management module 15 (step S125-3). The communication management module 15 communicates with the communication management module 15 of the MFP 2 (step S125-4). The communication management module 15 of the MFP 2 transmits the charge report to the job management module 17 (step S125-5).

The charge report in this embodiment refers to a report that requests the MFP 2 to count the number of pages printed by both the MFP 1 and the MFP 2 as the number of pages to be charged.

After that, the MFP 1 determines the number of pages to be allocated to the MFP 1 and the MFP 2. Further, when determining that the allocated number of pages allocated to the MFP 1 is less than the usable amount of the MFP 1, the MFP 1 transmits the image data to the MFP 2.

When the user selects the MFP 2, the MFP 1 transmits the number of pages to be allocated to not only the MFP 2 but also the MFP 1 to the MFP 2. Namely, the job management module 17 of the MFP 1 requests the communication management module 15 to add (include) the number of allocated pages allocated to both the MFP 1 and the MFP 2 to the information item of the output process in the job information items and then transmit the job information items (step S252).

The communication management module 15 transmits the job information items to the communication management module 15 of the MFP 2 (step S262). The communication management module 15 of the MFP 2 transmits the job information items to the job management module 17 (step S272). By doing this, MFP 2 may count the number of pages printed by the MFP 1 as the number of pages to be charged. Alternative instead, of transmitting the allocated number of pages, the number of pages having been printed may be transmitted.

When the user selects the MFP 1, similar to the above Embodiments 1 through 3, the MFP 1 may transmit the allocated number of pages to be allocated to the MFP 2 only.

Further, regardless of whether there is a difference in the billing information items 27 between the MFP 1 and the MFP 2, the MFP 1 and the MFP 2 print the respective allocated number of pages (steps S240 and S310). Further, the MFP 1 and the MFP 2 update the respective usable amounts (steps S242 and S312).

Next, when the user selects the MFP 2 (i.e., when the charge report is received from the MFP 1), the job management module 17 requests the counter management module 19 to count the number of pages to be charged of the MFP 1 and the MFP 2 (step S313). The printed number counting section 34 of the counter management module 19 collectively counts the number of pages to be charged of the MFP 1 and the number of pages to be charged of the MFP 2 (step S315).

More specifically, the printed number counting section 34 collectively counts the number of pages to be charged of the MFP 1 and the number of pages to be charged of the MFP 2 as the number of the pages to be charged of the MFP 2 (based on the billing information items 27 of the MFP 2). By doing this, it becomes possible to integrally manage the number of pages printed in the apparatus cooperative job.

After the completion of the printing the allocated number of pages, the job management module 17 of the MFP 2 transmits the execution result of the printing to the communication management module 15 (step S320). The execution result of the printing includes the printed number of pages.

The communication management module 15 transmits the execution result of the printing to the communication management module 15 of the MFP 1 (step S330). The communication management module 15 of the MFP 1 transmits the execution result of the printing to the job management module 17 (step S340).

When the user select the MFP 1, the job management module 17 transmits the execution result of the printing to the counter management module 19 (step S350). The printed number counting section 34 of the counter management module 19 collectively counts the number of pages to be charged of the MFP 1 and the number of pages to be charged of the MFP 2 (step S360).

The job management module 17 transmits the execution result of the job to the copy application 11 (step S380).

FIGS. 25A and 25B illustrate examples of the number of pages to be charged of the MFPs. More specifically, FIG. 25A illustrates an example of the number of pages to be charged of the MFP 1 when the user selects the MFP 1. FIG. 25B illustrates an example of the number of pages to be charged of the MFP 2 when the user selects the MFP 2.

When the MFP 1 commonly counts regardless of the sheet size and the MFP 2 separately counts depending on whether the sheet size is greater than A size, the number of pages to be charged of the MFP 1 will the sum of the number of pages to be charged separately counted depending on the size difference of the MFP 2.

For example, in color printing with coverage of 6% or more, the number of pages to be charged of the MFP 1 (a'+b') corresponds to the sum of the number of pages to be charged (a' and b') separately counted depending on the sheet sizes of the MFP 2. Further, the allocated number of pages (a1) of the MFP 1 counted as A3 size or greater by the MFP 2 and the allocated number of pages (b1) of the MFP 1 counted as the size less than the A1 size by the MFP 2 are counted as a1+b1 by the MFP 1.

By considering the differences in the counting results, the user may select the MFP that counts the number of pages to be charged in the apparatus cooperative job.

According to an embodiment, when the billing information items 27 differ between the MFP 1 and the MFP 2, the user may select an MFP.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus cooperation system including plural apparatuses connected via a network to share a function among the plural apparatuses, the apparatus cooperation system comprising:
a first apparatus; and
a second apparatus,
wherein the first apparatus includes
an acquisition unit configured to acquire image data to be output;
an output condition acceptance unit configured to accept an output condition to be applied when the first apparatus and the second apparatus output the image data,
a first operation control unit configured to control an output operation of the first apparatus based on the output condition and transmit an output request to the second apparatus to output,
a first output unit configured to output one or more output objects,
a first counting unit configured to count a number of the output objects output by the first output unit based on a selected first counting rule from a plurality of counting rules, and
a data communication unit configured to transmit the image data and the output condition to the second apparatus,
wherein the second apparatus includes
a second operation control unit configured to receive the output request from the first apparatus and control an output operation of the second apparatus,
a second output unit configured to output one or more output objects, and
a second counting unit configured to count a number of the output objects output by the second output unit based on a selected second counting rule from a plurality of counting rules, the second counting unit sends the counted number of output objects to the first counting unit without storing the counted number of output objects in the second output unit, and
a printed number counting unit configured to count a number of pages to be charged of both the first apparatus and the second apparatus as the number of pages to be charged of the first apparatus,
wherein when the output condition acceptance unit accepts an output condition to output the image data by the first apparatus and the second apparatus, the first counting unit is configured to count a total number of the output objects output by the first output unit and the second output unit based on the selected first counting rule, and
the first apparatus and the second apparatus store an upper limit information and compares usable amounts of the first apparatus and the second apparatus with corresponding data of the upper limit information.

2. The apparatus cooperation system according to claim 1, wherein the first operation control unit is configured to acquire the selected second counting rule from the second apparatus,
wherein when determining that the selected first counting rule does not correspond to the selected second counting rule, the first operation control unit is configured to count and accumulate the total number of the output objects output by the first output unit and the second output unit based on the selected first counting rule, and
wherein when determining that the first counting rule corresponds to the selected second counting rule, the first operation control unit is configured to count and accumulate a number of the output objects output only by the first output unit based on the selected first counting rule, and the second operation control unit is configured to count and accumulate a number of the output objects output only by the second output unit based on the selected second counting rule.

3. The apparatus cooperation system according to claim 1, wherein the first operation control unit is configured to acquire the selected second counting rule from the second apparatus, wherein when determining that the selected first counting rule does not correspond to the selected second counting rule, the first operation control unit is configured to prevent the first apparatus and the second apparatus from outputting the output objects.

4. The apparatus cooperation system according to claim 1, wherein the first operation control unit is configured to acquire the selected second counting rule from the second apparatus, wherein when determining that the selected first counting rule does not correspond to the selected second counting rule, the first operation control unit is configured to accept whether the total number of the output objects output by the first output unit and the second output unit is to be counted by the first apparatus or the second apparatus.

5. The apparatus cooperation system according to claim 4, wherein the first operation control unit is configured to display a different counting rule from among the selected first counting rule and the second counting rule on a display unit.

6. The apparatus cooperation system according to claim 4, wherein when determining that the selected first counting rule does not correspond to the selected second counting rule and when the first operation control unit accepts a setting that the total number of the output objects output by the first output unit and the second output unit is to be counted by the second apparatus, the second counting unit is configured to count the total number of the output objects output by the first output unit and the second output unit based on the selected second counting rule.

7. The apparatus cooperation system according to claim 1, wherein when the output condition acceptance unit accepts the output condition to output the image data by the first apparatus and the second apparatus, the first counting unit is configured to count the number of the output objects output by the first output unit alone and the total number of the output objects output and shared by the first output unit and the second output unit based on the selected first counting rule.

8. The apparatus cooperation system according to claim 1, wherein when the acquisition unit is a scanner device configured to image a draft so as to acquire the image data or a data communication device configured to acquire the image data from a terminal.

9. The apparatus cooperation system according to claim 8, wherein the first output unit and the second output unit are printing devices configured to form an image on a recording medium or FAX transmission devices transmitting the image data via a telephone network or an IP network.

10. An image forming apparatus comprising:
an acquisition unit configured to acquire image data to be output;
an output condition acceptance unit configured to accept an output condition to be applied when the image forming apparatus and the apparatus output the image data;
a first operation control unit configured to control an output operation of the image forming apparatus based on the output condition and transmit an output request to the apparatus to output;
a first output unit configured to output one or more output objects;
a first counting unit configured to count and accumulate a number of the output objects output by the image forming apparatus based on a selected first counting rule; and
a data communication unit configured to transmit the image data and the output condition to the apparatus,
wherein the image forming apparatus is configured to be connected to an apparatus including
a second operation control unit configured to receive the output request from the image forming apparatus and control an output operation of the apparatus,
a second output unit configured to output one or more output objects, and
a second counting unit configured to count a number of the output objects output by the apparatus based on a selected second counting rule, the second counting unit sends the counted number of output objects to the first counting unit without storing the counted number of output objects in the second output unit, and
a printed number counting unit configured to count a number of pages to be charged of both the first apparatus and the second apparatus as the number of pages to be charged of the first apparatus,
wherein when the output condition acceptance unit accepts an output condition to output the image data by the image forming apparatus and the apparatus, the first counting unit is configured to count and accumulate a total number of the output objects output by the image forming apparatus and the apparatus based on the selected first counting rule, and
the first apparatus and the second apparatus store an upper limit information and compares usable amounts of the first apparatus and the second apparatus with corresponding data of the upper limit information.

11. A function providing method for providing functions of a first apparatus and a second apparatus connected to each other via a network so as to share the functions among the apparatuses, the function providing method comprising:
acquiring, by the first apparatus, image data to be output;
accepting, by the first apparatus, an output condition to be applied when the first apparatus and the second apparatus output the image data;
controlling, by the first apparatus, an output operation of the first apparatus based on the output condition and transmitting, by the first apparatus, an output request to the second apparatus to output;
outputting, by the first apparatus, one or more output objects;
selecting a first counting rule from a plurality of counting rules;
counting, by the first apparatus, a number of the output objects output by the first apparatus based on the selected first counting rule;
transmitting, by the first apparatus, the image data and the output condition to the second apparatus;
receiving, by the second apparatus, the output request from the first apparatus and controlling, by the second apparatus, an output operation of the second apparatus;
outputting, by the second apparatus, one or more output objects;
selecting a second counting rule from a plurality of counting rules;
counting, by the second apparatus, a number of the output objects output by the second output unit based on the selected second counting rule;
sending the counted number of output objects to the first apparatus without storing the counted number of output objects in the second apparatus;
counting, by the first apparatus, a total number of the output objects output by the first output unit and the second output unit based on the selected first counting rule upon accepting, by the first apparatus, an output condition to output the image data by the first apparatus and the second apparatus;

counting a number of pages to be charged of both the first apparatus and the second apparatus as the number of pages to be charged of the first apparatus; and storing an upper limit information in the first apparatus and the second apparatus and comparing usable amounts of the first apparatus and the second apparatus with corresponding data of the upper limit information.

12. The image forming apparatus of claim 10, wherein the first operation control unit is configured to acquire the selected second counting rule from the second apparatus, wherein when determining that the selected first counting rule does not correspond to the selected second counting rule, the first operation control unit is configured to count and accumulate the total number of the output objects output by the first output unit and the second output unit based on the selected first counting rule, and wherein when determining that the first counting rule corresponds to the selected second counting rule, the first operation control unit is configured to count and accumulate a number of the output objects output only by the first output unit based on the selected first counting rule, and the second operation control unit is configured to count and accumulate a number of the output objects output only by the second output unit based on the selected second counting rule.

13. The image forming apparatus of claim 10, wherein the first operation control unit is configured to acquire the selected second counting rule from the second apparatus, wherein when determining that the selected first counting rule does not correspond to the selected second counting rule, the first operation control unit is configured to accept whether the total number of the output objects output by the first output unit and the second output unit is to be counted by the first apparatus or the second apparatus.

14. The function providing method of claim 11, wherein if the selected first counting rule does not correspond to the selected second counting rule, counting and accumulating the total number of the output objects output by the first output unit and the second output unit based on the selected first counting rule; and if the first counting rule corresponds to the selected second counting rule, counting and accumulating a number of the output objects output only by the first output unit based on the selected first counting rule, and the second operation control unit is configured to count and accumulate a number of the output objects output only by the second output unit based on the selected second counting rule.

15. The function providing method of claim 11, further comprising:

acquiring the selected second counting rule from the second apparatus; and if the selected first counting rule does not correspond to the selected second counting rule, accepting whether the total number of the output objects output by the first output unit and the second output unit is to be counted by the first apparatus or the second apparatus.

* * * * *